(12) United States Patent
Moon et al.

(10) Patent No.: US 6,674,910 B1
(45) Date of Patent: Jan. 6, 2004

(54) APPARATUS AND METHOD FOR IMAGE-COMPRESSION ENCODING AND DECODING USING ADAPTIVE TRANSFORM

(75) Inventors: Joo Hee Moon, Seoul (KR); Cheol Soo Park, Suwon-shi (KR); Joon Ho Song, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/448,820

(22) Filed: Nov. 24, 1999

(30) Foreign Application Priority Data

Nov. 24, 1998 (KR) ............................................ 98-51131

(51) Int. Cl.⁷ ................................................ G06K 9/36
(52) U.S. Cl. ...................... 382/239; 382/242; 382/243; 382/250
(58) Field of Search ................................ 382/243, 239, 382/242, 250; 375/240.14, 240.13; 348/411.1; 386/95, 111, 112, 125

(56) References Cited

U.S. PATENT DOCUMENTS 5,010,402 A    4/1991   Nishino ...................... 358/138
5,978,514 A  * 11/1999   Yamaguchi et al. ......... 382/243

* cited by examiner

*Primary Examiner*—Anh Hong Do
(74) *Attorney, Agent, or Firm*—J. Harold Nissen; Lackenbach Siegel LLP

(57) ABSTRACT

An apparatus and method for image-compression encoding and decoding using an adaptive transform in which, where different transform coefficients are outputted in accordance with a change of the transform direction order for an input image signal block, encoding and decoding procedures are conducted, based on the transform direction order selected in accordance with the characteristics of the input image signal block. In accordance with the present invention, an orthogonal transform and a inverse orthogonal transform for blocks are controlled, based on a determination made about whether signals within a block, to be currently encoded, have a higher correlation in a vertical direction or in a horizontal direction, using information about blocks encoded or both information about blocks encoded and information about the current block. In accordance with the present invention, the orthogonal transform is conducted in a direction associated with a higher correlation and then in a direction associated with a lower correlation. The inverse orthogonal transform is conducted in the order inverse to that of the orthogonal transform. Accordingly, the present invention provides an enhancement in compression coding efficiency.

39 Claims, 20 Drawing Sheets

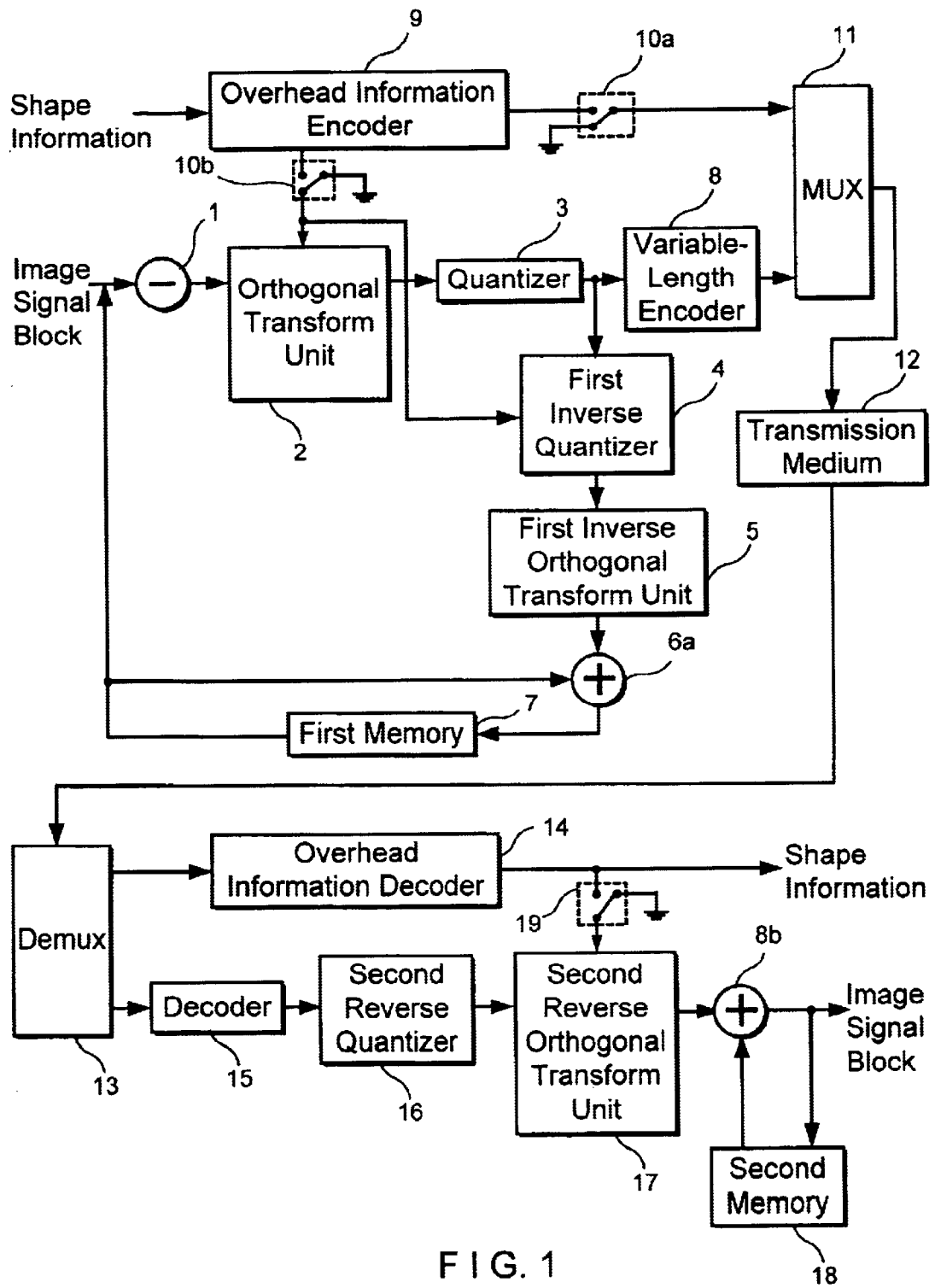
F I G. 1

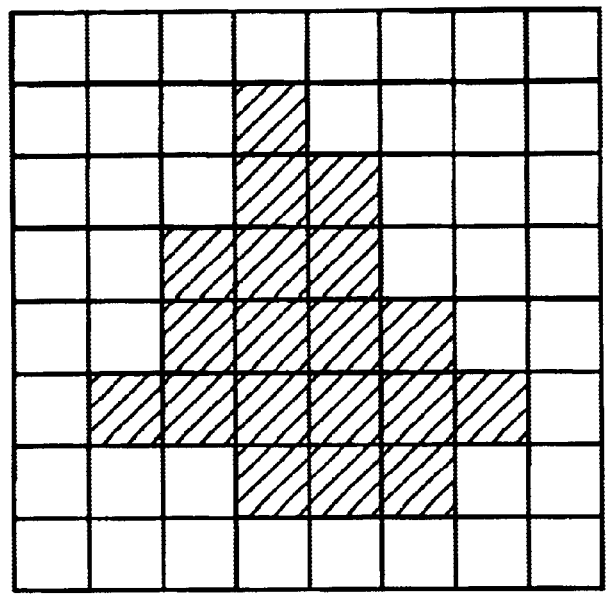
F I G. 2a
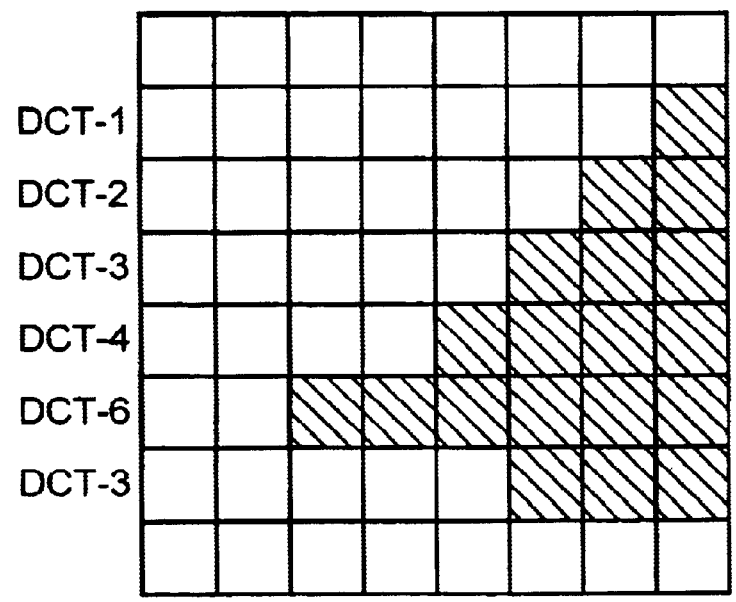
F I G. 2b

DCT-6
DCT-5
DCT-4
DCT-2
DCT-1
DCT-1

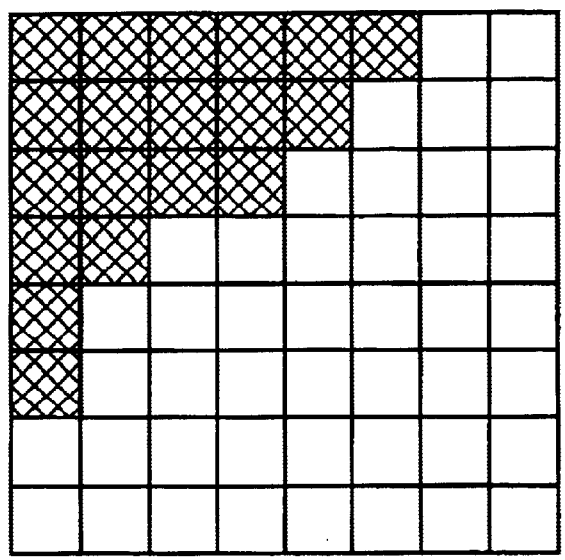
F I G. 2e
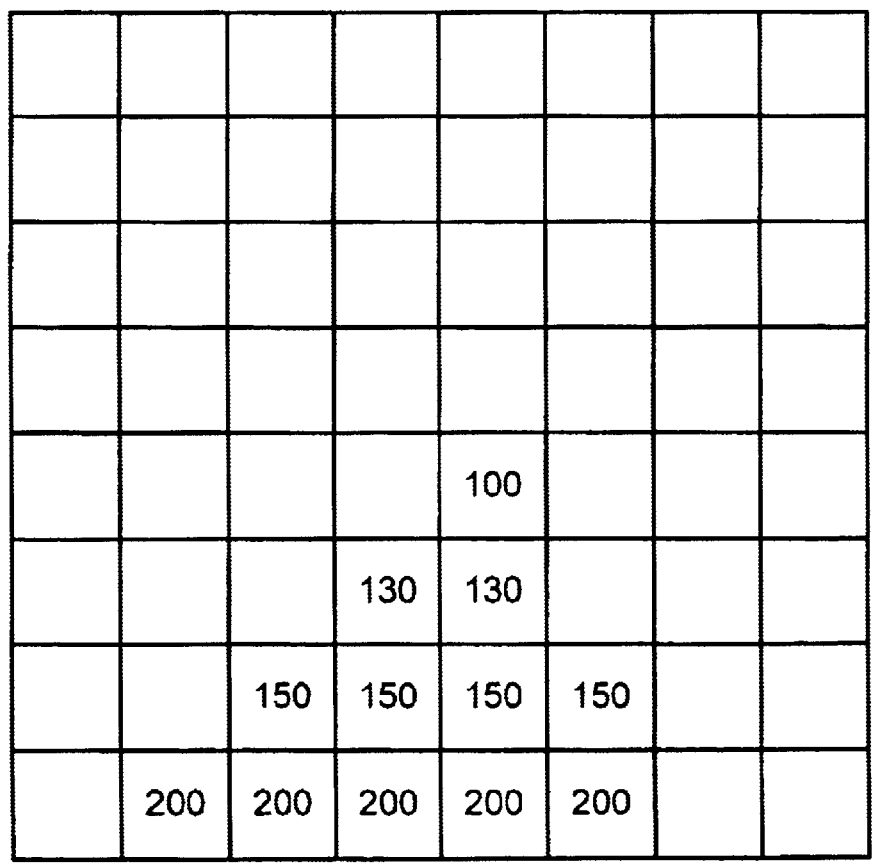
F I G. 3a

| 1304 | 32 | 35 | -24 | 17 | | | |
|------|-----|----|-----|----|--|--|--|
| 95 | 6 | 25 | -14 | | | | |
| 16 | 2 | | | | | | |
| -14 | | | | | | | |
| | | | | | | | |
| | | | | | | | |
| | | | | | | | |
| | | | | | | | |

F I G. 3b

| 1304 | 0 | 0 | 0 | 0 | | | |
|------|---|---|---|---|--|--|--|
| -101 | 0 | 0 | 0 | | | | |
| 45 | 0 | | | | | | |
| 26 | | | | | | | |
| | | | | | | | |
| | | | | | | | |
| | | | | | | | |
| | | | | | | | |

F I G. 3c

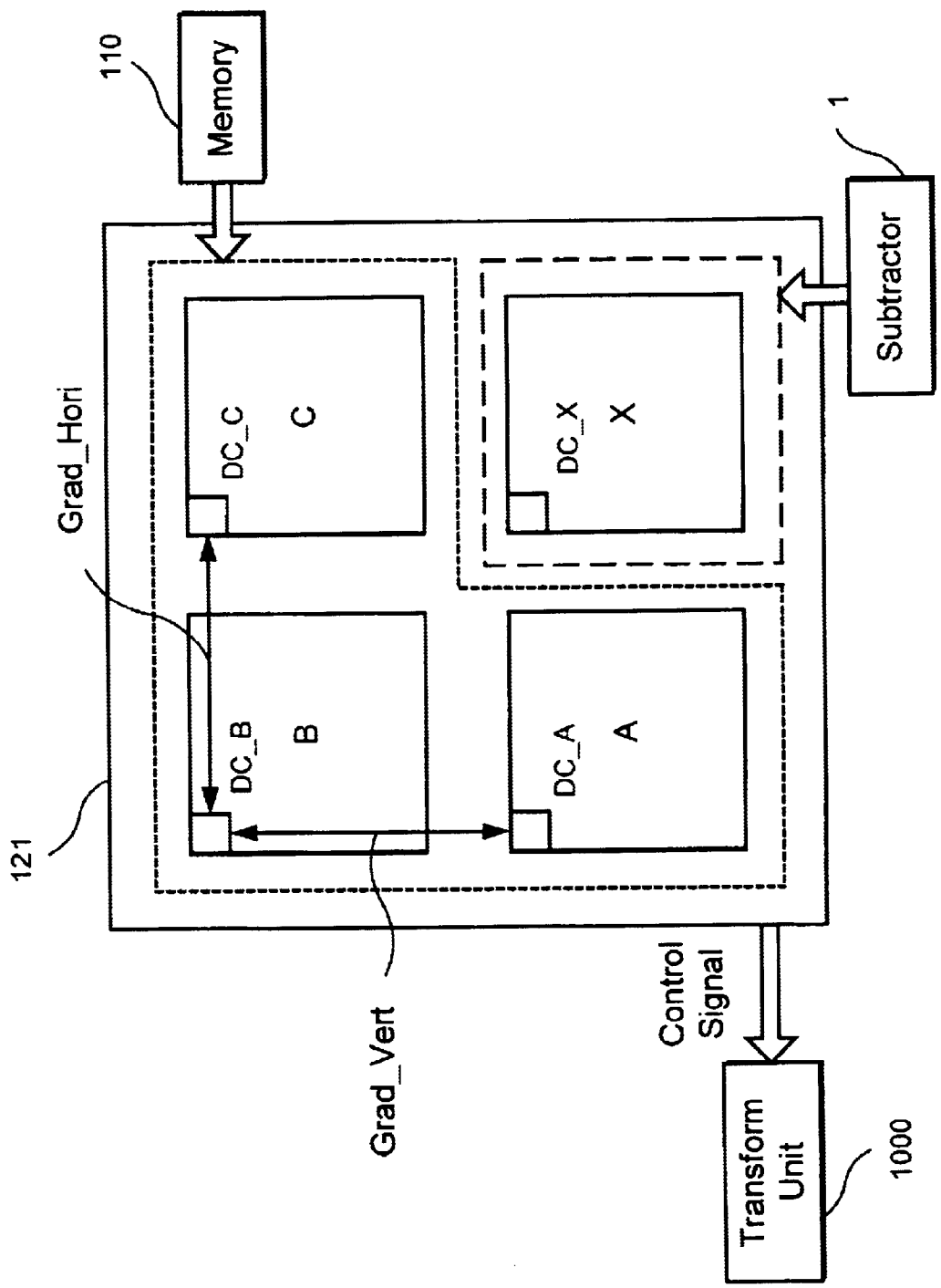
F I G. 7

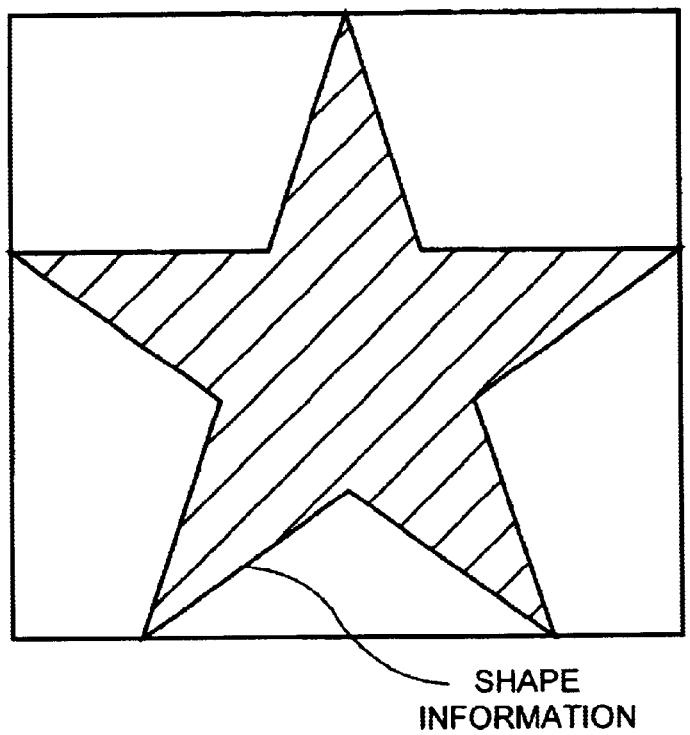
SHAPE INFORMATION
F I G. 9
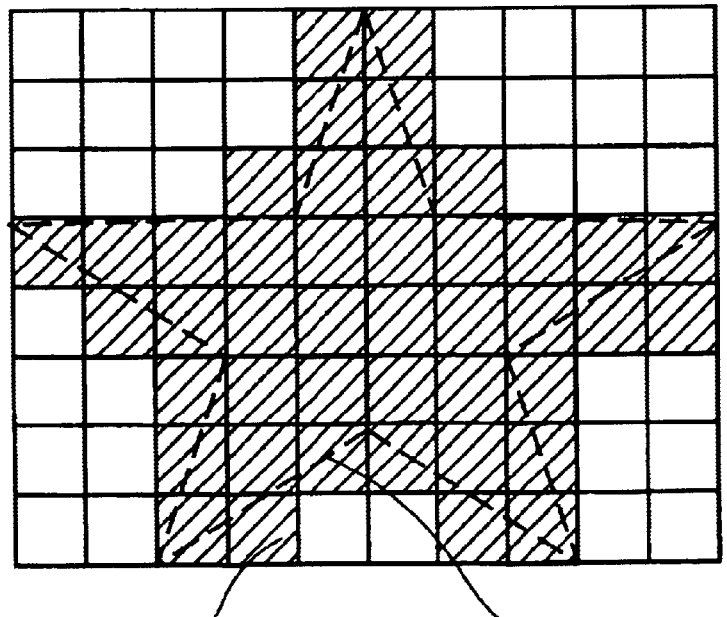
BLOCK TO BE ENCODED
SHAPE INFORMATION
F I G. 10

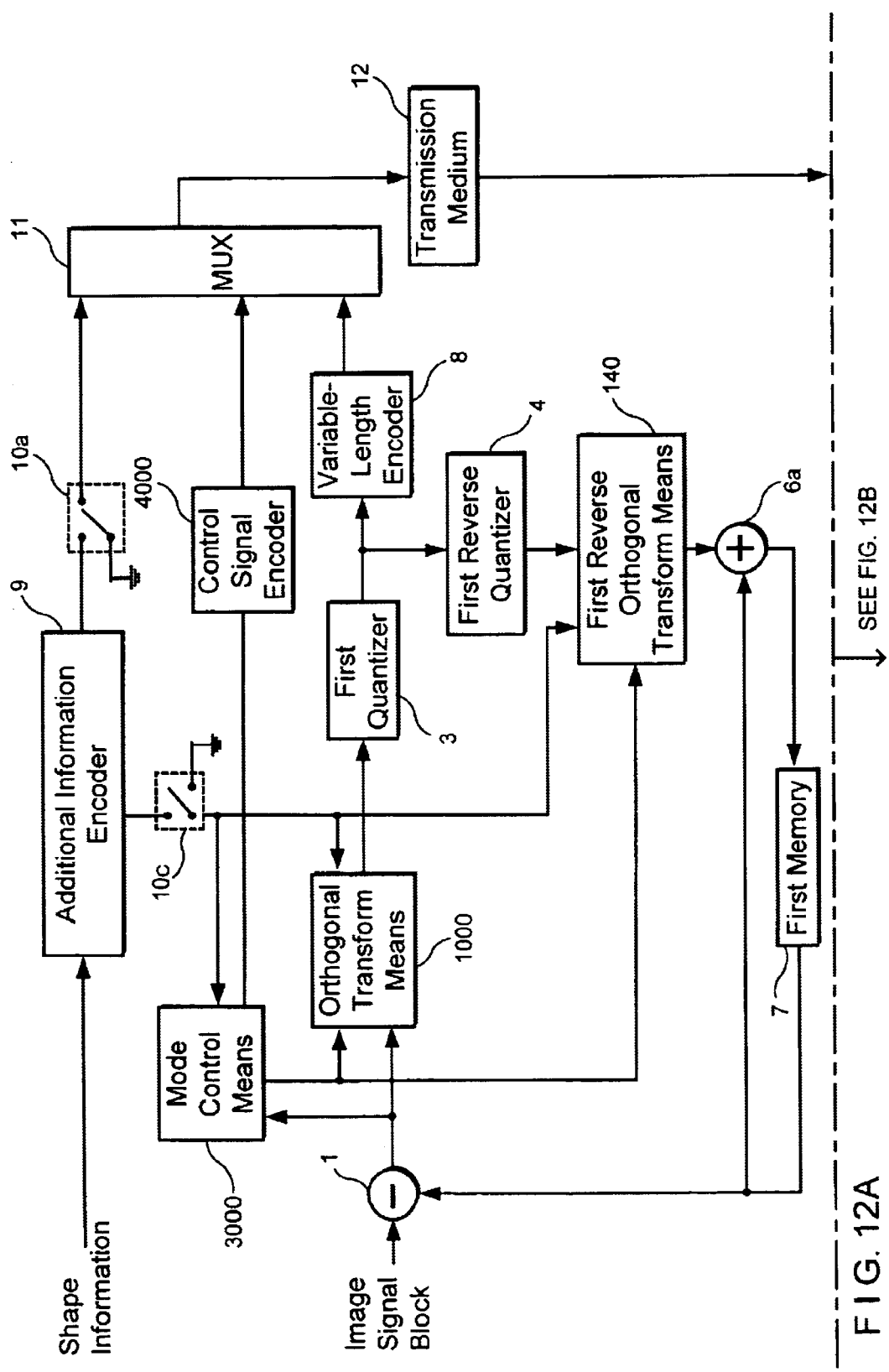
F I G. 12A

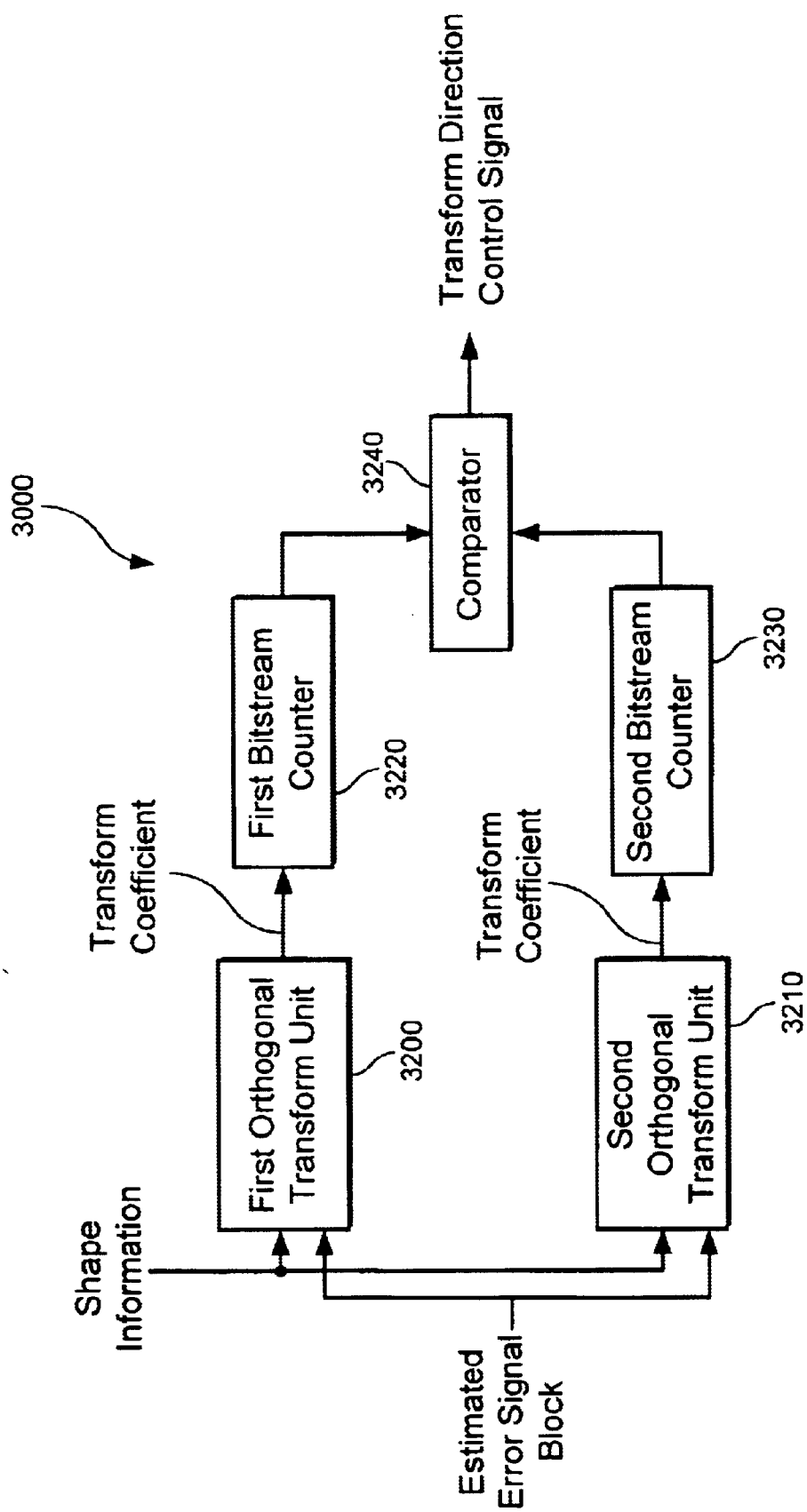
F I G. 14

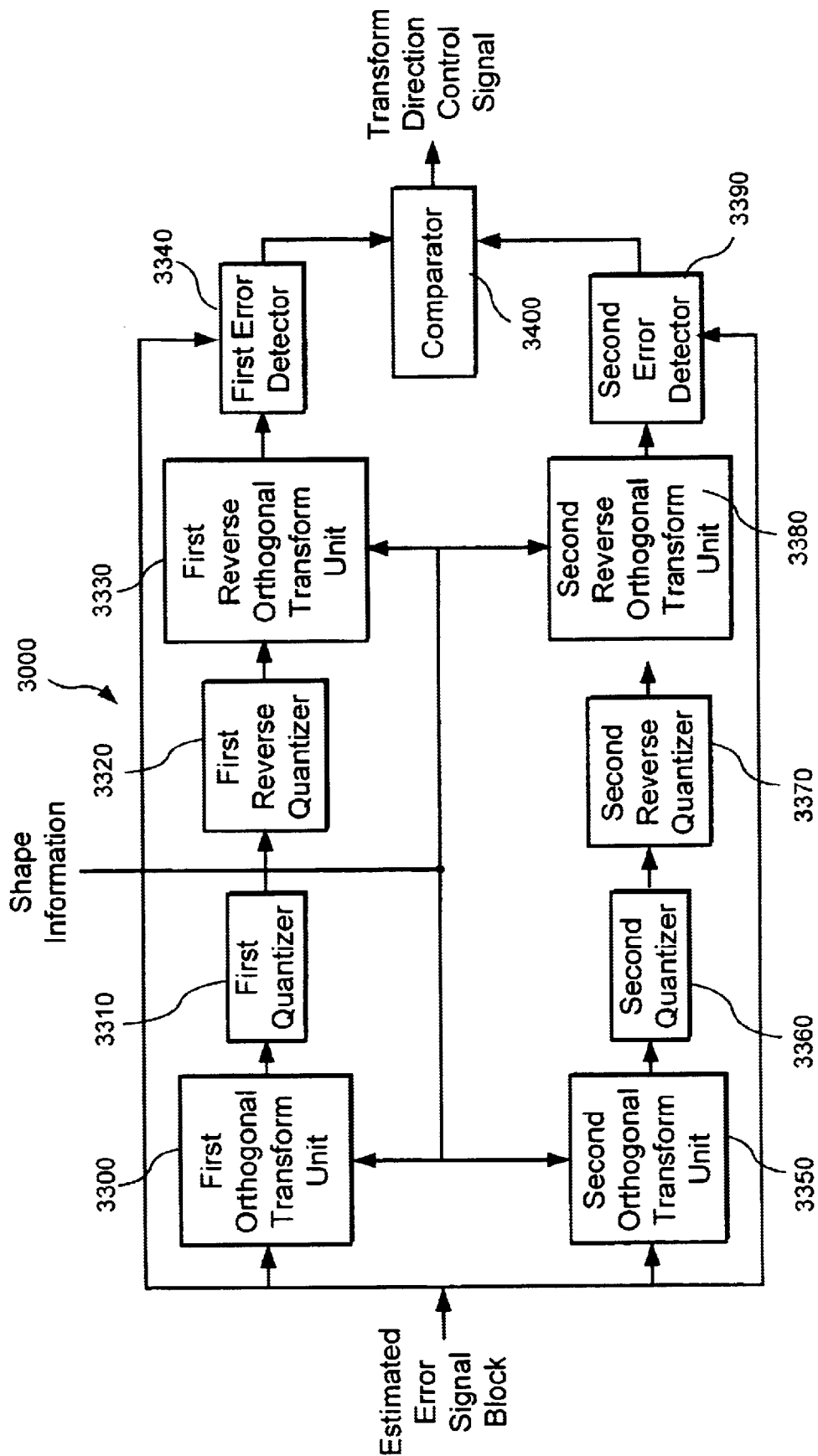
F I G. 15

APPARATUS AND METHOD FOR IMAGE-COMPRESSION ENCODING AND DECODING USING ADAPTIVE TRANSFORM

BACKGROUND OF THE INVENTION

1. Field of the Invention

The present invention relates to an apparatus and method for image-compression encoding and decoding using an adaptive transform, and more particularly to an apparatus and method for image-compression encoding and decoding using an adaptive transform in which, where different transform coefficients are outputted in accordance with a change of the transform direction order for an input image signal block, encoding and decoding procedures are conducted, based on the transform direction order selected in accordance with the characteristics of the input image signal block.

2. Description of the Prior Art

Among compression encoding schemes for digital images, the scheme most commonly used is a scheme in which every block of an image signal is transformed into a block having transform coefficients in accordance with an orthogonal transform method, and the transform coefficients are encoded. This scheme is widely used in a scheme proposed by Joint Technical Committee Joint Photographic Coding Experts Group (JPEG) of International Standardization Organization/International Electrotechnical Commission (ISO/IEC) JTC1/SC29/WG1, which is a compression encoding standardization scheme for still images, a scheme proposed by Moving Picture Experts Group (MPEG) of ISO/IEC, which is a compression encoding standardization scheme for moving images, and other international standardization schemes for digital compression encoding such as H.261 of International Telecommunication Union—Telecommunication Standardization Sector (ITU-T) and H.263 of ITU-T.

In accordance with conventional transform-based image signal compression techniques, every block of an input image signal is transformed into a block having transform coefficients in accordance with an orthogonal transform method. The transform coefficients are quantized, and then processed in accordance with a variable-length encoding method. The resultant signal is then transmitted to a decoder unit. In the decoder unit, the transmitted signal is decoded in accordance with processes inverse to those used in the encoding method, thereby recovering the original image signal. Referring to FIG. 1, a conventional image compression encoding and decoding system is illustrated. As shown in FIG. 1, the system mainly includes an encoding unit for encoding blocks of an input image signal using a compression technique, and a decoding unit for receiving an encoded signal outputted from the encoding unit, and conducting a decoding procedure, inverse to the encoding procedure, for the encoded signal, thereby recovering the original image signal.

The encoding unit includes a subtractor 1 for conducting a subtraction between an input image signal block and an image signal block, previously recovered, thereby outputting an residual signal block, and an overhead information encoder 9 for outputting an overhead information signal (for example, shape information) and a variable-length-coded shape information signal, which are to be used in the encoding procedure. The encoding unit also includes an orthogonal transform unit 2 for receiving the residual signal block from the subtractor 1 while selectively receiving the shape information from the overhead information encoder 9 in accordance with a switching operation conducted by a switch 10b, and performing a transform for the residual signal block based on the shape information in accordance with a specific transform method, thereby outputting a transform coefficient block, and a quantizer 3 for receiving the transform coefficient block from the orthogonal transform unit 2, and quantizing the received transform coefficient block into a quantized transform coefficient block. The encoding unit further includes a variable-length encoder 8 for receiving the quantized transform coefficient block from the quantizer 3, and encoding the received quantized transform coefficient block into a variable-length-coded transform coefficient signal, and a multiplexer 11 for receiving the variable-length-coded signal from the variable-length encoder 8 while selectively receiving the shape information from the overhead information encoder 9 in accordance with a switching operation conducted by a switch 10a, multiplexing the received signals together, and transmitting the resultant signal to a transmission medium 12.

The encoding unit also includes a first inverse quantizer 4 for receiving the quantized transform coefficient block from the quantizer 3, and conducting a inverse quantization for the received block, a inverse orthogonal transform unit 5 for receiving the inverse-quantized transform coefficient block from the first inverse quantizer 4 while selectively receiving the shape information from the overhead information encoder 9 in accordance with a switching operation of the switch 10b, and transforming the received block into a inverse-orthogonal-transformed signal block based on the shape information, an adder 6a for adding the previously recovered image signal block to the inverse-orthogonal-transformed signal block outputted from the inverse orthogonal transform unit 5, thereby recovering the input image signal block, and a first memory 7 for receiving the recovered image signal block outputted from the adder 6a, and outputting it to the subtractor 1 as the previously recovered image signal block.

On the other hand, the decoding unit includes a demultiplexer (DEMUX) 13 for receiving the variable-length-encoded signal from the multiplexer 11 via the transmission medium 12, thereby outputting a variable-length-encoded shape information signal and a variable-length-encoded input transform coefficient signal, a decoder 15 for decoding the variable-length-encoded coefficient signal into a quantized transform coefficient block, and a second inverse quantizer 16 for receiving the quantized transform coefficient block from the decoder 154, and inverse quantizing the received block into a inverse-quantized transform coefficient block. The decoding unit also includes an overhead information decoder 14 for receiving the variable-length-encoded shape information from the demultiplexer 13, and decoding the received shape information, thereby outputting recovered shape information, and a inverse orthogonal transform unit 17 for receiving the inverse-quantized transform coefficient block from the second inverse quantizer 16 while selectively receiving the shape information from the overhead information decoder 14 in accordance with a switching operation conducted by a switch 19, and performing a inverse orthogonal transform for the received transform coefficient block based on the received shape information, thereby outputting a inverse-orthogonal-transformed signal block. The decoding unit further includes an adder 6b for adding an image signal block, previously recovered, to the inverse-orthogonal-transformed signal block outputted from the inverse orthogonal transform unit 17, thereby outputting a recovered image signal block, and a second memory 18 for receiving the recovered image signal block outputted from the adder 6b, and outputting it to the adder 6b as the previously recovered image signal block.

The shape information is information for sorting an image into an object field and a background field. Such shape information makes it possible to allow a signal processing, associated with signal encoding and decoding, to be conducted based on the object field of an image, instead of the entire field of the image. Generally, shape information has the form of a binary mask consisting of pixels including object pixels and non-object pixels, that is, background pixels, having a value different from that of the object pixels.

Now, operations of the convention image compression-encoding and decoding system having the above mentioned configuration will be described.

When the subtractor 1 outputs an residual signal block after conducting a subtraction between an input image signal block and a recovered image signal block, the residual signal block is applied to the orthogonal transform unit 2 which also selectively receives shape information from the overhead information encoder 9. Based on the shape information, the orthogonal transform unit 2 performs a transform for the residual signal block in accordance with a specific transform method, thereby outputting a transform coefficient block. The subtractor 1 may output the same signal as the input image signal, instead of the residual between the predicted signal outputted from the first memory 7 and the current input signal. In other words, the subtractor 1 may output the current input signal, as it is, without any prediction based on the output signal from the first memory 7. This may be achieved by initializing the value stored in the first memory 7 in such a fashion that it corresponds to "0".

The quantizer 3 receives the transform coefficient block from the orthogonal transform unit 2, and quantizes the received transform coefficient block into a quantized transform coefficient block which is, in turn, sent to the variable-length encoder 8. In the variable-length encoder 8, the quantized transform coefficient block is transformed into a variable-length-coded transform coefficient signal which is, in turn, applied to the multiplexer 11.

The multiplexer 11 receives the variable-length-coded signal while selectively receiving the shape information from the overhead information encoder 9, and multiplexes the received signals together. The resultant signal from the multiplexer 11 is transmitted to the transmission medium 12.

The demultiplexer 13 receives the variable-length-encoded signal from the transmission medium 12, thereby outputting a variable-length-encoded shape information signal and a variable-length-encoded input transform coefficient signal.

The decoder 15 receives the variable-length-encoded coefficient signal from the demultiplexer 13, and decodes the received signal into a quantized transform coefficient block. This quantized transform coefficient block is applied to the second inverse quantizer 16 which, in turn, inverse quantizes the quantized transform coefficient block into a inverse-quantized transform coefficient block.

The inverse orthogonal transform unit 17 receives the inverse-quantized transform coefficient block from the second inverse quantizer 16 while selectively receiving the shape information from the overhead information decoder 14, thereby outputting a inverse-orthogonal-transformed signal block. The adder 6b receives the inverse-orthogonal-transformed signal block along with an image signal block, previously recovered, from the second memory 18, and performs an addition of those received signals, thereby outputting a recovered image signal block.

On the other hand, the quantized transform coefficient block outputted from the quantizer 3 is also applied to the first inverse quantizer 4 which, in turn, outputs a inverse-quantized transform coefficient block. This inverse-quantized transform coefficient block is applied to the inverse orthogonal transform unit 5.

The inverse orthogonal transform unit 5 also selectively receives the shape information from the overhead information encoder 9. Based on the received signals, the inverse orthogonal transform unit 5 outputs a inverse-orthogonal-transformed signal block. The adder 6a adds the previously recovered image signal block outputted from the first memory 7 to the inverse-orthogonal-transformed signal block, thereby outputting a recovered image signal block. This recovered image signal block is stored in the first memory 7 which, in turn, applies the stored image signal block to the subtractor 1 when a next image signal block is inputted.

The overhead information decoder 14 outputs recovered shape information. Meanwhile, the second memory 18 is stored with the recovered image signal block therein for a next prediction.

Now, the transform method used in the orthogonal transform unit 2 will be described in conjunction with FIGS. 2a to 2e. In FIG. 2a, the shaded pixels of an image signal block are object pixels to be encoded. In accordance with the transform method, only these object pixels are transformed so that they are encoded. When an image signal block of FIG. 2a is inputted, a pixel rearrangement is carried out for the input image signal block in accordance with the transform method. That is, the object pixels of the input image signal block are vertically shifted to the upper border of the block, thereby filling that border, as shown in FIG. 2b. In this state, a discrete cosine transform (DCT) is performed in a vertical direction, as shown in FIG. 2c.

Thereafter, a pixel rearrangement is carried out again for the image signal block of FIG. 2c by shifting again the object pixels to the left border of the block. Thereafter, DCT is performed in a horizontal direction, thereby obtaining a finally transformed signal as shown in FIG. 2e.

FIGS. 3a to 3c are views illustrating a transform conducted in the orthogonal transform unit 2 for an input image signal block. FIG. 3a shows the input image signal block applied to the orthogonal transform unit 2. In FIG. 3a, the portions bearing no numeric value correspond to pixels having no object to be encoded, that is, background pixels, whereas the portions bearing numeric values correspond to object pixels to be transformed, that is, to be encoded.

FIG. 3b shows transform coefficients obtained after orthogonal-transforming the input image signal block in a vertical direction, and then in a horizontal direction. On the other hand, FIG. 3c shows transform coefficients obtained after orthogonal-transforming the input image signal block in a horizontal direction, and then in a vertical direction.

After a comparison of FIGS. 3b and 3c, it can be found that different transform results, that is, different transform coefficients, are obtained in accordance with different orthogonal transform directions, respectively.

Referring to FIGS. 3a to 3c, it can be found that when an orthogonal transform is conducted for an input image signal block exhibiting an higher similarity in a horizontal direction, as shown in FIG. 3a, the result of FIG. 3c obtained after an orthogonal transform conducted for the input image signal block in a horizontal direction and then in a vertical direction exhibits a high energy concentration effect, as compared to the result of FIG. 3b obtained after an orthogonal transform conducted for the input image signal block in a vertical direction and then in a horizontal direction. In other words, the orthogonal transform method of FIG. 3c exhibits an increased compression performance because of a reduction in the number of transform coefficients to be encoded.

Where the input image signal block is orthogonal-transformed in a vertical direction and then in a horizontal direction, as shown in FIG. 3b, it is necessary to encode 12 different transform coefficients. However, where the input image signal block is orthogonal-transformed in a horizontal direction and then in a vertical direction, as shown in FIG. 3c, it is necessary to encode only 5 different transform coefficients. Accordingly, it is possible to obtain an increased encoding efficiency in the latter case.

In conventional orthogonal transform methods, an input image signal is simply orthogonal-transformed in a horizontal direction and then in a vertical direction, or in a vertical direction and then in a horizontal direction, without taking into consideration the characteristics thereof, that is, the similarity. As a result, these conventional orthogonal transform methods have disadvantages in that it is impossible to obtain optimum transform results.

SUMMARY OF THE INVENTION

The present invention has been made in view of the above mentioned problems, and, therefore, an object of the invention is to provide an image compression-encoding and decoding apparatus and method using an adaptive transform which are capable of obtaining a high compression-encoding efficiency.

In accordance with one aspect, the present invention provides an image compression-encoding apparatus for performing an orthogonal transform for blocks of an input image signal in accordance with an adaptive transform method, thereby compressing the input image signal blocks, comprising: transform mode control means for selectively receiving transform coefficients, obtained after an orthogonal transform for blocks of an input image signal, and an image signal block to be currently encoded, determining correlations of the input values in horizontal and vertical directions, and generating a transform direction control signal based on the determined correlations, the transform direction control signal being adapted to control an orthogonal transform for the current image signal block in such a fashion that the current image signal block is orthogonal-transformed in a direction involving a higher correlation, and then in a inverse direction; orthogonal transform means for receiving the transform direction control signal from the transform mode control means, and performing an orthogonal transform based on the received transform direction control signal.

In accordance with another aspect, the present invention provides an image compression-encoding apparatus for performing an orthogonal transform for blocks of an input image signal in accordance with an adaptive transform method, thereby compressing the input image signal blocks, comprising: transform mode control means for receiving a recovered image signal block while selectively receiving an image signal block to be currently encoded and selectively receiving shape information associated with the image signal blocks, determining correlations of the input values in horizontal and vertical directions, and generating a transform direction control signal based on the determined correlations, the transform direction control signal being adapted to control an orthogonal transform for the current image signal block in such a fashion that the current image signal block is orthogonal-transformed in a direction involving a higher correlation, and then in a inverse direction; and orthogonal transform means for receiving the transform direction control signal from the transform mode control means, and performing an orthogonal transform based on the received transform direction control signal. In accordance with another aspect, the present invention provides An image compression-encoding apparatus using an adaptive transform method comprising: a subtractor for conducting a subtraction between an input image signal block, to be encoded, and an image signal block, previously recovered, thereby outputting an residual signal block; an overhead information encoder for outputting shape information to be used in an encoding procedure; transform mode control means for receiving a quantized transform coefficient while selectively receiving the residual signal block from the subtractor, thereby outputting an associated transform direction control signal; orthogonal transform means for receiving the residual signal block from the subtractor while selectively receiving the shape information from the overhead information encoder, and performing an orthogonal transform for the residual signal block while being controlled in transform direction by the transform mode control means, thereby outputting a transform coefficient; a quantizer for receiving the transform coefficient from the orthogonal transform means, quantizing the received transform coefficient, and outputting the quantized transform coefficient to the transform mode control means and other elements of the apparatus; a variable-length encoder for receiving the quantized transform coefficient from the quantizer, and transforming the received quantized transform coefficient into a variable-length-coded signal; and a multiplexer for receiving the variable-length-coded signal from the variable-length encoder while selectively receiving the shape information from the overhead information encoder, multiplexing the received signals together, and transmitting the resultant signal to a transmission medium. In accordance with another aspect, the present invention provides an image compression-decoding apparatus for decoding a compression-encoded image signal transmitted thereto comprising: inverse transform mode control means for selectively receiving a signal block currently processed by a variable length decoding procedure after being transmitted while receiving a signal block previously variable-length-decoded, determining correlations of the received blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction; and inverse orthogonal transform means for receiving the inverse transform direction control signal from the inverse transform mode control means, and performing a inverse orthogonal transform for the currently-variable-length-decoded signal block based on the received inverse transform direction control signal.

In accordance with another aspect, the present invention provides an image compression-decoding apparatus using an adaptive transform method comprising: a demultiplexer for demultiplexing an input encoded signal received from an encoding unit, thereby outputting an encoded image signal block and encoded shape information; a decoder for receiving the encoded image signal block from the decoder, and variable-length-decoding the received image signal block; a inverse quantizer for receiving the variable-length-decoded signal block from the decoder, and inverse-quantizing the received signal block; an overhead information decoder for selectively receiving the encoded shape information from the demultiplexer, and recovering original shape information from the received shape information; inverse transform mode control means for selectively receiving a current variable-length-decoded signal block from the decoder while receiving a previous variable-length-decoded signal block, determining correlations of the received signal blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction; inverse orthogonal transform means for receiving the inverse-quantized signal from the inverse quantizer while selectively receiving the recovered shape information from the overhead information decoder, and performing a inverse orthogonal transform for the inverse-quantized signal block under a control of the inverse transform mode control means; an adder for receiving the inverse-orthogonal-transformed signal block from the inverse orthogonal transform means while receiving an image signal block previously recovered, and adding the received signal blocks, thereby outputting a recovered image signal block; and a memory for storing the recovered image signal block outputted from the adder, and outputting the stored imaged signal block to the adder for an prediction.

In accordance with another aspect, the present invention provides an image compression-encoding and decoding system using an adaptive transform method comprising:

an encoding unit comprising a subtractor for conducting a subtraction between an input image signal block, to be encoded, and a image signal block, previously recovered, thereby outputting an residual signal block, an overhead information encoder for outputting shape information to be used in an encoding procedure, along with a variable-length-encoded shape information signal;

mode control means for receiving the residual signal block, to be encoded, from the subtractor while receiving the shape information signal from the overhead information encoder, thereby outputting an associated transform direction control signal, orthogonal transform means for receiving the residual signal block from the subtractor while selectively receiving the variable-length-encoded shape information from the overhead information encoder, and performing an orthogonal transform for the residual signal block while being controlled in transform direction by the mode control means, thereby outputting a transform coefficient, a quantizer for receiving the transform coefficient from the orthogonal transform means, and quantizing the received transform coefficient, thereby outputting a quantized transform coefficient, a variable-length encoder for receiving the quantized transform coefficient from the quantizer, and transforming the received transform coefficient into a variable-length-coded signal, a control signal encoder for receiving the transform direction control signal from the mode control means, and encoding the received transform direction control signal, and a multiplexer for receiving the variable-length-coded signal from the variable-length encoder and the transform direction control signal from the control signal encoder while selectively receiving the shape information from the overhead information encoder, multiplexing the received signals together, and transmitting the resultant signal to a transmission medium; and a decoding unit comprising a demultiplexer for demultiplexing the signal received from the encoding unit via the transmission medium, thereby outputting the variable-length-coded shape information, the variable-length-coded quantized transform coefficient block, and the encoded transform direction control signal, an overhead information decoder for selectively receiving the encoded shape information from the demultiplexer, and recovering original shape information from the received shape information, a decoder for receiving the variable-length-encoded quantized transform coefficient from the decoder, and variable-length-decoding the received transform coefficient, thereby outputting a variable-length-decoded quantized transform coefficient block, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, a first adder for receiving the inverse-orthogonal-transformed signal block from the inverse orthogonal transform means while receiving an image signal block previously recovered, and adding the received signal blocks, thereby outputting a recovered image signal block, and a first memory for storing the recovered image signal block outputted from the first adder, and outputting the stored imaged signal block to the adder for an prediction.

In accordance with another aspect, the present invention provides an image compression-encoding and decoding system using an adaptive transform method comprising:

an encoding unit comprising a subtractor for conducting a subtraction between an input image signal block, to be encoded, and a image signal block, previously recovered, thereby outputting an residual signal block, an overhead information encoder for outputting shape information to be used in an encoding procedure, along with a variable-length-encoded shape information signal;

mode control means for receiving the residual signal block, to be encoded, from the subtractor while receiving the shape information signal from the overhead information encoder, thereby outputting an associated transform direction control signal, orthogonal transform means for receiving the residual signal block from the subtractor while selectively receiving the shape information from the overhead information encoder, and performing an orthogonal transform for the residual signal block while being controlled in transform direction by the mode control means, thereby outputting a transform coefficient, a quantizer for receiving the transform coefficient from the orthogonal transform means, and quantizing the received transform coefficient, thereby outputting a quantized transform coefficient, a variable-length encoder for receiving the quantized transform coefficient from the quantizer, and transforming the received transform coefficient into a variable-length-coded signal, a control signal encoder for receiving the transform direction control signal from the mode control means, and encoding the received transform direction control signal, mode controller control signal generating means adapted to generate a mode controller control signal for controlling respective ON/OFF operations of the mode control means and the control signal encoder in accordance with whether or not the transform direction control signal is used in the orthogonal transform or inverse orthogonal transform, a mode controller control signal encoder for receiving the mode controller control signal from the mode controller control signal generating means, and encoding the received signal, and a multiplexer for receiving the variable-length-coded signal from the variable-length encoder, the encoded transform direction control signal from the control signal encoder, and the encoded mode controller control signal from the mode controller control signal encoder while selectively receiving the shape information from the overhead information encoder, multiplexing the received signals together, and transmitting the resultant signal to a transmission medium; and a decoding unit comprising a demultiplexer for demultiplexing the signal received from the encoding unit via the transmission medium, thereby outputting the variable-length-coded shape information, the variable-length-coded quantized transform coefficient, the variable-length-encoded transform direction control signal, and the encoded mode controller control signal, an overhead information decoder for selectively receiving the encoded shape information from the demultiplexer, and recovering original shape information from the received shape information, a decoder for receiving the variable-length-encoded quantized transform coefficient from the decoder, and variable-length-decoding the received transform coefficient, thereby outputting a variable-length-decoded quantized transform coefficient block, control signal decoder for receiving the variable-length-encoded transform direction control signal from the demultiplexer, and decoding the received transform direction control signal, mode controller control signal decoder for receiving the encoded mode controller control signal from the demultiplexer, and decoding the received control signal, thereby controlling an ON/OFF mode of the control signal decoder, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, an adder for receiving the inverse-orthogonal-transformed signal block from the inverse orthogonal transform means while receiving an image signal block previously recovered, and adding the received signal blocks, thereby outputting a recovered image signal block, and a memory for storing the recovered image signal block outputted from the adder, and outputting the stored imaged signal block to the adder for an prediction.

In accordance with another aspect, the present invention provides an image compression-encoding method for performing an orthogonal transform for blocks of an input image signal in accordance with an adaptive transform method, thereby compressing the input image signal blocks, comprising: a transform direction control signal generating step for selectively receiving transform coefficients, obtained after an orthogonal transform for blocks of an input image signal, and an image signal block to be currently encoded, determining correlations of the input values in horizontal and vertical directions, and generating, based on the determined correlations, a transform direction control signal adapted to control an orthogonal transform for the current image signal block in such a fashion that the current image signal block is orthogonal-transformed in a direction involving a higher correlation, and then in a inverse direction; and an orthogonal-transforming step for receiving the transform direction control signal, and performing an orthogonal transform, in a sequential fashion, based on the received transform direction control signal.

In accordance with another aspect, the present invention provides an image compression-encoding method for decoding a compression-encoded image signal, transmitted, using an adaptive transform method comprising: a inverse transform direction control signal generating step for selectively receiving a signal block, currently variable-length-encoded, and signal blocks already encoded, determining correlations of the received blocks in horizontal and vertical directions, and generating, based on the determined correlations, a inverse transform direction control signal adapted to control a inverse orthogonal transform for the current signal block in such a fashion that the current signal block is inverse-orthogonal-transformed in a direction involving a lower correlation, and then in a inverse direction; and a inverse-orthogonal-transforming step for receiving the inverse transform direction control signal, and performing a inverse orthogonal transform, in a sequential fashion, based on the received inverse transform direction control signal.

In accordance with another aspect, the present invention provides an image compression-encoding and decoding method for encoding and decoding input image signal blocks, comprising: a transform direction control signal generating step for generating a transform direction control signal adapted to determine respective direction orders of an orthogonal transform and a inverse orthogonal transform, based on an image signal block, to be encoded, and shape information; an encoding step for encoding the transform direction control signal generated at the transform direction control signal generating step while orthogonal-transforming the image signal block, to be encoded, based on the transform direction control signal, quantizing the orthogonal-transformed signal, and variable-length-encoding the quantized signal; a transmitting step for multiplexing the encoded transform direction control signal and the variable-length-encoded signal block, and transmitting the resultant signal; a signal separating step for receiving the encoded signal transmitted at the transmitting step, and demultiplexing the received signal into the encoded transform direction control signal and the variable-length-encoded image signal block; decoding the encoded transform direction control signal separated at the signal separating step, variable-length-decoding the variable-length-encoded image signal block, and inverse-quantizing the decoded image signal block; and a signal recovering step for inverse-orthogonal-transforming the inverse-quantized signal block in a state in which the inverse orthogonal transform is determined in direction order, based on the decoded transform direction control signal, and recovering the inverse-orthogonal-transformed signal block into the initially inputted image signal block, based on an image signal block previously recovered.

BRIEF DESCRIPTION OF THE DRAWINGS

Other objects and aspects of the invention will become apparent from the following description of embodiments with reference to the accompanying drawings in which:

FIG. 1 is a block diagram illustrating a conventional image compression encoding and decoding system;

FIGS. 2a to 2e are views illustrating an orthogonal transform procedure conduced in an orthogonal transform unit of FIG. 1, based on shape information;

FIGS. 3a to 3c are views illustrating a transform conducted in the orthogonal transform unit of FIG. 1 for an input image signal block, in order to explain different transform coefficients depending on different orthogonal transform directions;

FIG. 7 is a block diagram illustrating a mode controller according to an embodiment of the present invention;

FIG. 9 is a view illustrating an input image having star-shaped shape information;

FIG. 10 is a view illustrating blocks to be used for encoding of the input image having The shape information of FIG. 9;

FIG. 14 is a block diagram illustrating a mode control means of FIG. 12 in accordance with another embodiment of the present invention;

FIG. 15 is a block diagram illustrating a mode control means of FIG. 12 in accordance with another embodiment of the present invention.

DESCRIPTION OF THE PREFERRED EMBODIMENTS

Now, preferred embodiments of the present invention will be described with reference to the annexed drawings.

Figure 2C:
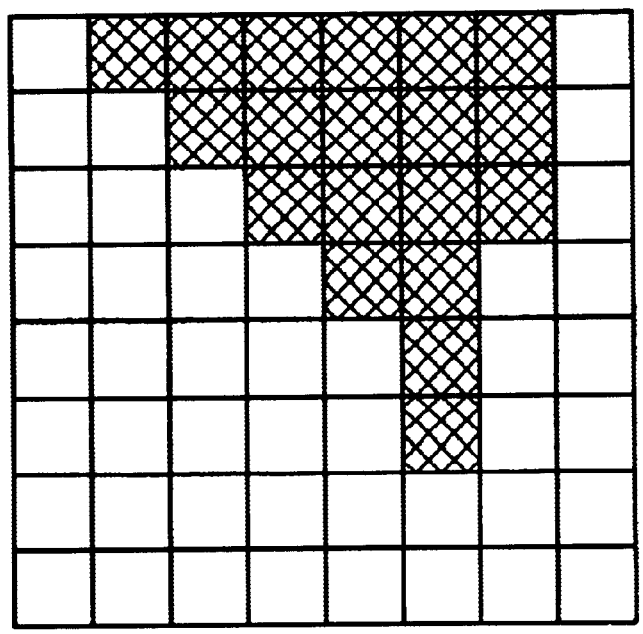
Figure 2D:
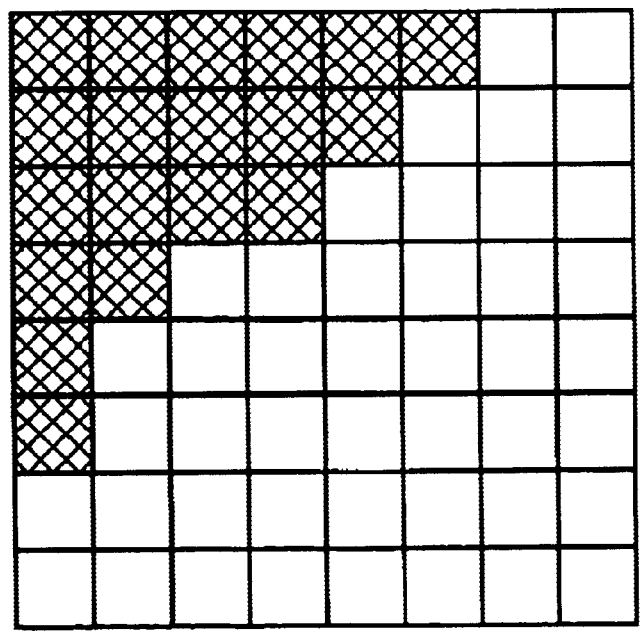
Figure 4A:
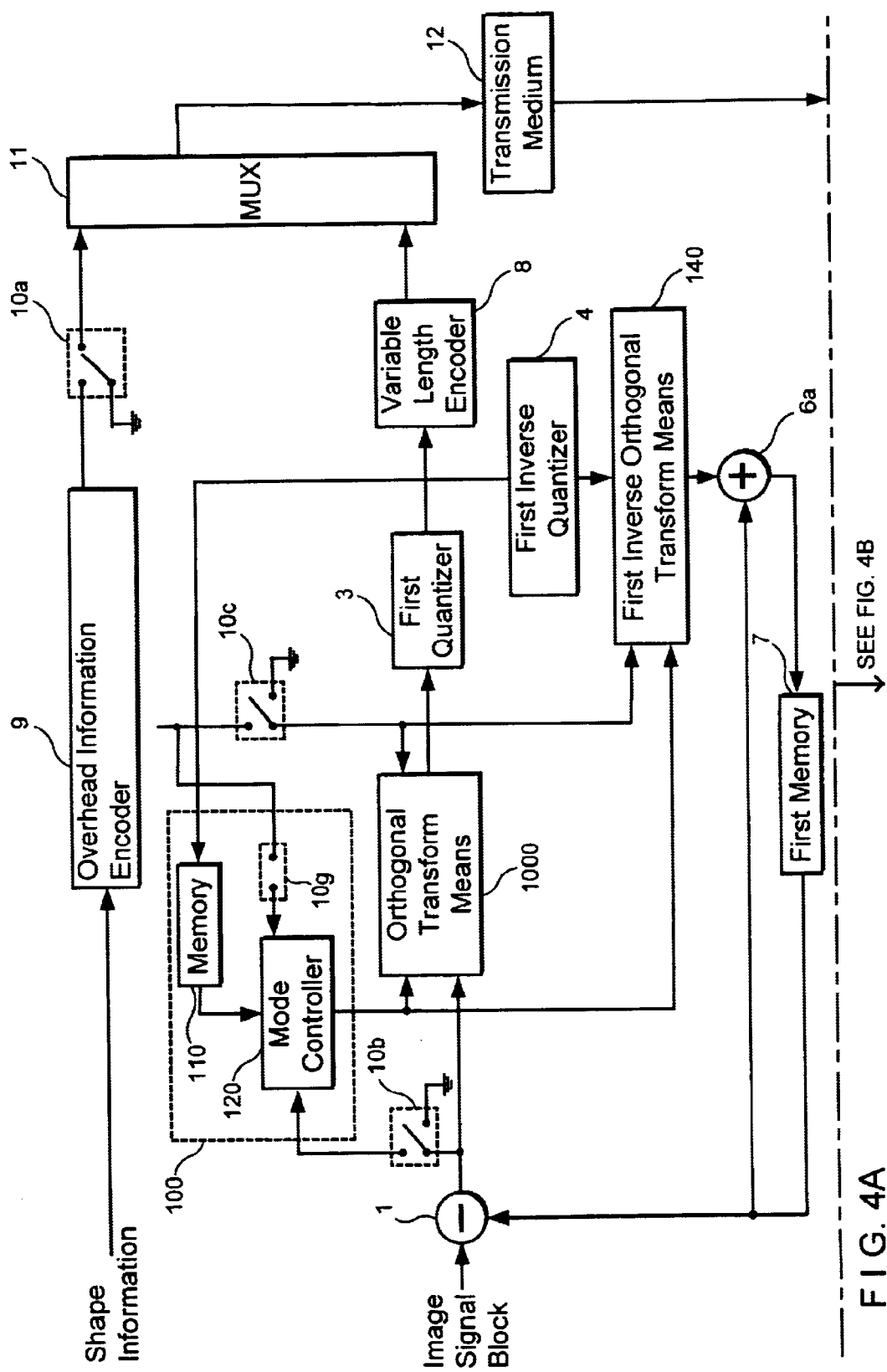
FIG. 4 is a block diagram illustrating an image compression-encoding and decoding system using an adaptive transform scheme in accordance with a first embodiment of the present invention.
Figure 4B:
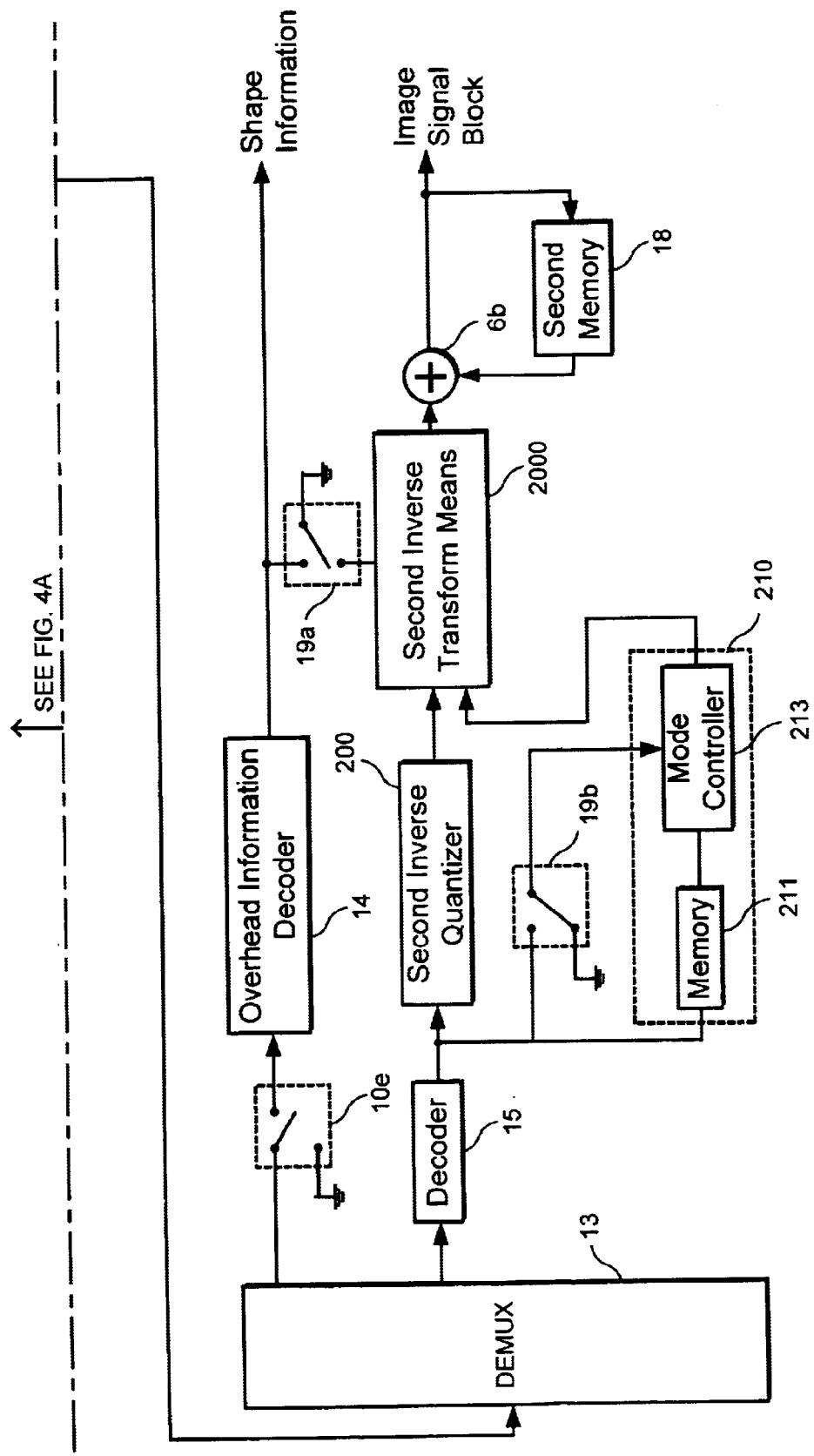

FIG. 4 is a block diagram illustrating an image compression-encoding and decoding system using an adaptive transform scheme in accordance with a first embodiment of the present invention.

First, an encoding configuration of the image compression-encoding and decoding system shown in FIG. 4 will be described. In FIG. 4, elements respectively corresponding to those in FIG. 1 will be denoted by the same reference numerals.

Referring to FIG. 4, a subtractor 1 serves to conduct a subtraction between an input image signal block and an image signal block previously recovered, thereby outputting an residual signal block. An overhead information encoder 9 serves to output an overhead information signal to be used in an encoding procedure. The subtractor 1 may output the same signal as the input image signal, instead of the residual between the current input signal and an predicted signal outputted from a first memory 7. In other words, the subtractor 1 may output the current input signal, as it is, without any prediction based on the output signal from the first memory 7. This may be achieved by initializing the value stored in the first memory 7 in such a fashion that it corresponds to "0".

In FIG. 4, the reference numeral 1000 denotes an orthogonal transform means for receiving the residual signal block from the subtractor 1 while selectively receiving shape information from the overhead information encoder 9 in accordance with a switching operation conducted by a switch 10c. The orthogonal transform means 1000 serves to carry out a transform for the residual signal block based on the shape information while being controlled in its orthogonal transform mode by a transform mode control means 100, thereby outputting a transform coefficient block.

Figure 5A:
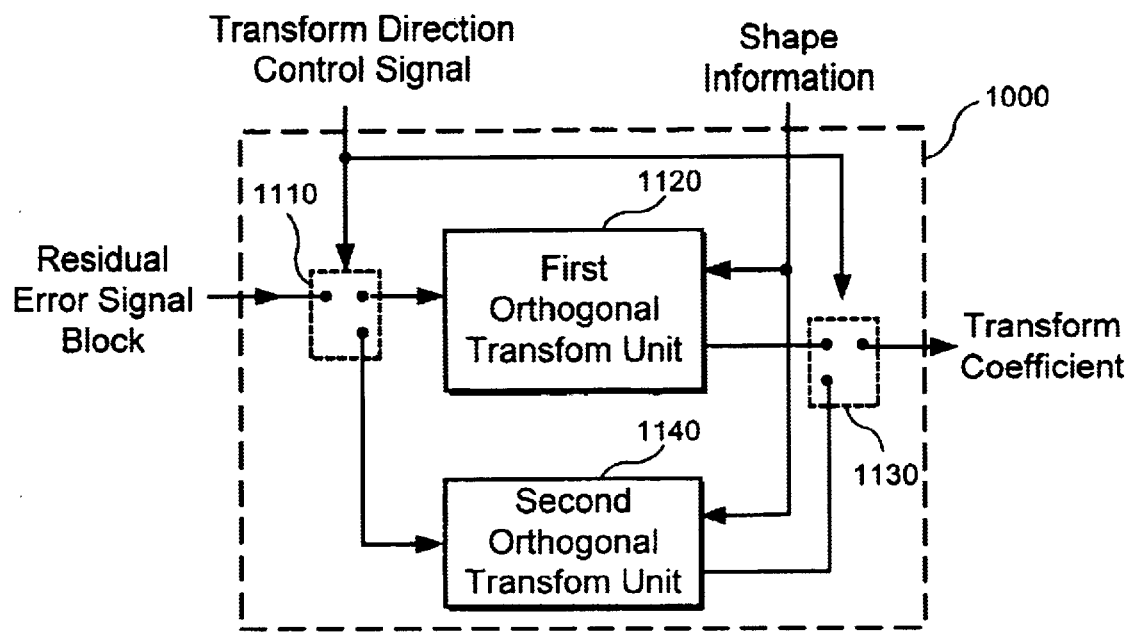
FIGS. 5a and 5b are block diagrams respectively illustrating an orthogonal transform means and first and inverse orthogonal transform means in accordance with an embodiment of the present invention.

Referring to FIG. 5a, an embodiment of the orthogonal transform means 1000 is illustrated. As shown in FIG. 5a, the orthogonal transform means 1000 includes a first orthogonal transform unit 1120 for selectively receiving the residual signal block from the subtractor 1 while selectively receiving the shape information from the overhead information encoder 9. The first orthogonal transform unit 1120 DCT-transforms the residual signal block in a vertical direction and then in a horizontal direction, based on the shape information. The orthogonal transform means 1000 also includes a second orthogonal transform unit 1140 for selectively receiving the residual signal block from the subtractor 1 while selectively receiving the shape information from the overhead information encoder 9. The second orthogonal transform unit 1140 DCT-transforms the residual signal block in a horizontal direction and then in a vertical direction, based on the shape information. The residual signal block may also be identical to the input image signal block by initializing the value stored in the first memory 7 in such a fashion that it corresponds to "0".

The orthogonal transform means 1000 further includes a first switch 1110 for conducting a switching operation in response to a transform direction control signal received from the transform mode control means 100, thereby selectively coupling the residual signal block outputted from the subtractor 1 to the first orthogonal transform unit 1120 or the second orthogonal transform unit 1140, and a second switch 1130 for conducting a switching operation in response to the transform direction control signal received from the transform mode control means 100, thereby selectively coupling the transform coefficient block outputted from the first orthogonal transform unit 1120 or the transform coefficient block outputted from the second orthogonal transform unit 1140 to a first quantizer 3.

Figure 6A:
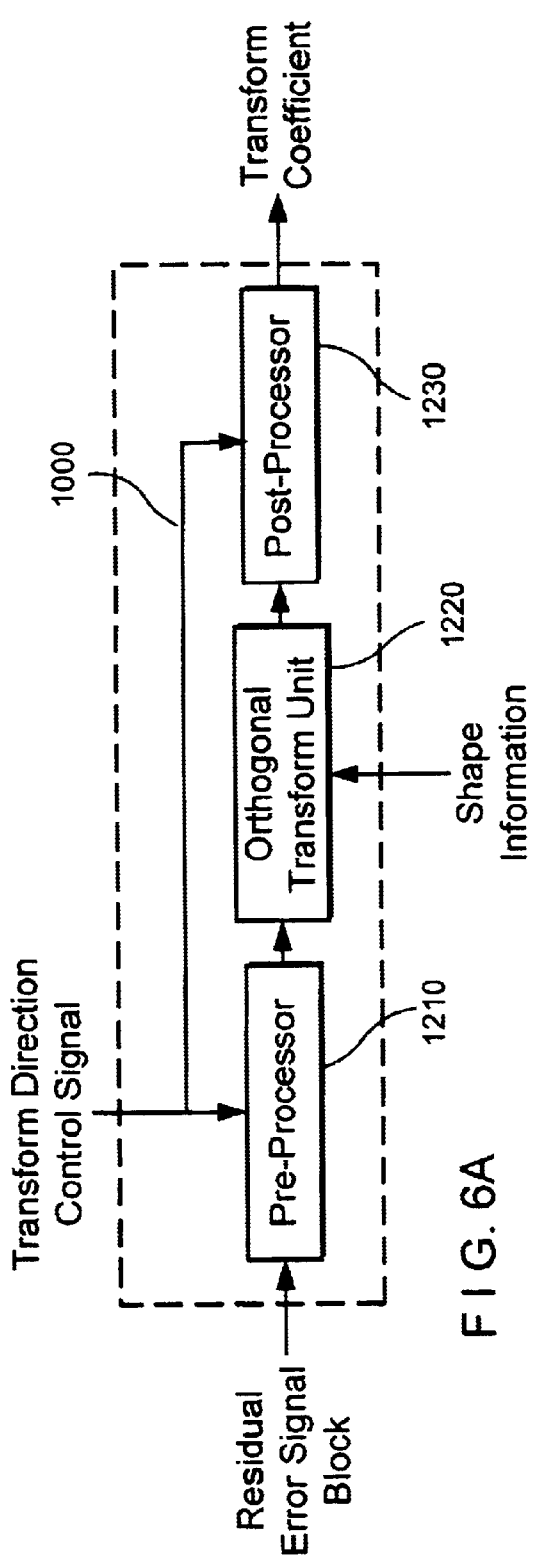
FIGS. 6a and 6b are block diagrams respectively illustrating an orthogonal transform means and first and inverse orthogonal transform means in accordance with another embodiment of the present invention.

Another embodiment of the orthogonal transform means 1000 is illustrated in FIG. 6a. As shown in FIG. 6a, the orthogonal transform means 1000 includes a pre-processor 1210 controlled to be switched between ON and OFF modes by the transform direction control signal from the transform mode control means 100. In the ON mode, the pre-processor 1210 rotates the residual signal block received from the subtractor 1 in a counter-clockwise direction by 90°. In the OFF mode, the pre-processor 1210 outputs the residual signal block as it is. The orthogonal transform means 1000 also includes an orthogonal transform unit 1220 for receiving the residual signal block outputted from the pre-processor 1210 while selectively receiving the shape information from the overhead information encoder 9, and DCT-transforming the residual signal block based on the shape information in vertical and horizontal directions, in this order, and then DCT-transforming the resultant residual signal block based on the shape information in horizontal and vertical directions, in this order. The orthogonal transform means 1000 further includes a post-processor 1230 controlled to be switched between ON and OFF modes by the transform direction control signal from the transform mode control means 100. In the ON mode, the post-processor 1230 rotates a transform coefficient block outputted from the orthogonal transform unit 1220 by 180° with respect to an axis connecting the left upper corner and right lower corner of the block to each other. In the OFF mode, the post-processor 1230 outputs the transform coefficient block as it is. The residual signal block may also be identical to the input image signal block by initializing the value stored in the first memory 7 in such a fashion that it corresponds to "0".

The first quantizer 3 receives the transform coefficient block from the orthogonal transform means 1000, and transforms the transform coefficient block into a quantized transform coefficient block. A variable-length encoder 8 receives the quantized transform coefficient block from the first quantizer 3. The variable-length encoder 8 transforms the received quantized transform coefficient block into a variable-length-coded transform coefficient signal. This variable-length-coded transform coefficient signal is applied to a multiplexer 11 which also selectively receives the shape information from the overhead information encoder 9 in accordance with a switching operation conducted by a switch 10a. The multiplexer 11 serves to multiplex the received signals together, and transmits the resultant signal to a transmission medium 12.

In accordance with an embodiment of the present invention, the transform mode control means 100 receives the quantized transform coefficient block from the first quantizer 3 while selectively receiving the residual signal block from the subtractor 1, thereby outputting an associated transform mode control signal. In this case, the residual signal block may also be identical to the input image signal block by initializing the value stored in the first memory 7 in such a fashion that it corresponds to "0".

The transform mode control means 100 includes a memory 110 for receiving the quantized transform coefficient block from the first quantizer 3, and storing it therein, and a mode controller 120 for receiving the quantized transform coefficient block from the memory 110 while selectively receiving the residual signal block from the subtractor 1, thereby outputting an associated transform direction control signal. In this case, the residual signal block may also be identical to the input image signal block by initializing the value stored in the first memory 7 in such a fashion that it corresponds to "0".

Instead of the above mentioned configuration in which the quantized transform coefficient block outputted from the first quantizer 3 is applied to the memory 110, the transform mode control means 100 may be configured, in accordance with another embodiment, in such a fashion that it selectively receives the recovered image signal block from the first memory 7 and the residual signal block, to be encoded by the subtractor 1, while selectively receiving the shape information from the overhead information encoder 9, in accordance with a switching operation conducted by a switch 10g, in association with the recovered image signal block and the residual signal block to be encoded, so as to use only the residual signal included in the shape information, thereby outputting an associated transform direction control signal. In this case, the residual signal block may also be identical to the input image signal block by initializing the value stored in the first memory 7 in such a fashion that it corresponds to "0".

The quantized transform coefficient block from the first quantizer 3 is also applied to a first inverse quantizer 4 which serves to transform the quantized transform coefficient block into a inverse-quantized transform coefficient block. A first inverse orthogonal transform means 140 receives the inverse-quantized transform coefficient block from the first inverse quantizer 3. The first inverse orthogonal transform means 140 also selectively receives the shape information from the overhead information encoder 9. Based on the received blocks, the first inverse orthogonal transform means 140 outputs a inverse transform coefficient block under the condition in which its inverse transform mode is controlled by the transform mode control means 100.

Figure 5B:
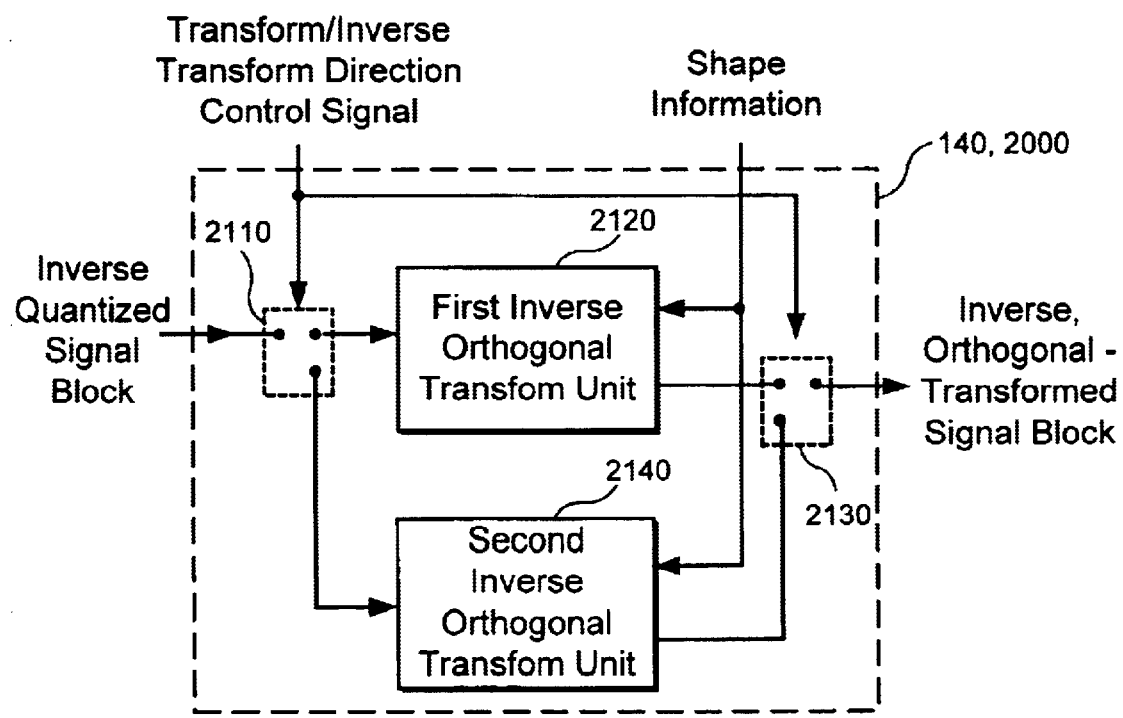

Referring to FIG. 5b, an embodiment of the inverse orthogonal transform means 140 is illustrated. As shown in FIG. 5b, the inverse orthogonal transform means 140 includes a first inverse orthogonal transform unit 2120 for selectively receiving the inverse-quantized transform coefficient block from the first inverse quantizer 4 while selectively receiving the shape information from the overhead information encoder 9. The first inverse orthogonal transform unit 2120 inverse-DCT-transforms the inverse-quantized transform coefficient block in a vertical direction and then in a horizontal direction, based on the shape information. The inverse orthogonal transform means 140 also includes a second inverse orthogonal transform unit 2140 for selectively receiving the inverse-quantized transform coefficient block from the first inverse quantizer 4 while selectively receiving the shape information from the overhead information encoder 9. The second inverse orthogonal transform unit 2140 inverse-DCT-transforms the received inverse-quantized transform coefficient block in a horizontal direction and then in a vertical direction, based on the shape information.

The inverse orthogonal transform means 140 further includes a first switch 2110 for conducting a switching operation in response to a transform direction control signal received from the transform mode control means 100, thereby selectively coupling the inverse-quantized transform coefficient block outputted from the first inverse quantizer 4 to the first inverse orthogonal transform unit 2120 or the second inverse orthogonal transform unit 2140, and a second switch 2130 for conducting a switching operation in response to the transform direction control signal received from the transform mode control means 100, thereby selectively coupling the inverse transform coefficient block outputted from the first inverse orthogonal transform unit 2120 or the inverse transform coefficient block outputted from the second inverse orthogonal transform unit 2140 to a first adder 6a.

Figure 6B:
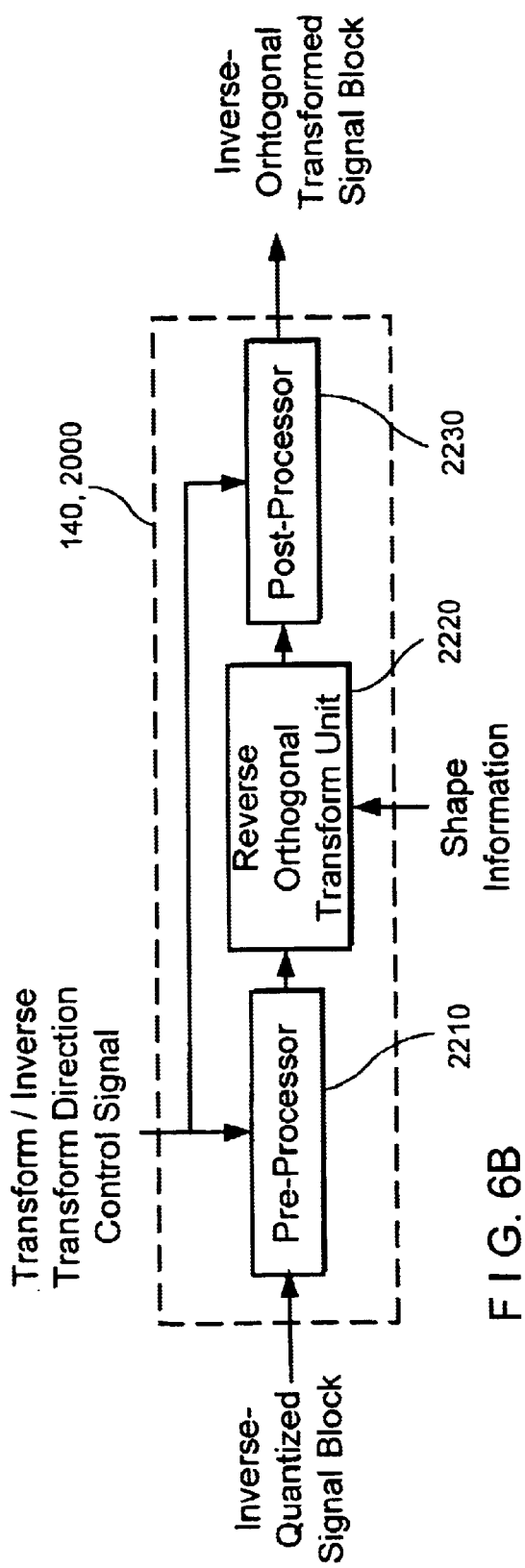

Another embodiment of the inverse orthogonal transform means 140 is illustrated in FIG. 6b. As shown in FIG. 6b, the inverse orthogonal transform means 140 includes a pre-processor 2210 controlled to be switched between ON and OFF modes by the transform direction control signal from the transform mode control means 100. In the ON mode, the pre-processor 2210 rotates a inverse-quantized transform coefficient block outputted from the first inverse quantizer 4 by 180° with respect to an axis connecting the left upper corner and right lower corner of the block to each other. In the OFF mode, the pre-processor 2210 outputs the inverse-quantized transform coefficient block as it is. The inverse orthogonal transform means 140 also includes a inverse orthogonal transform unit 2220 for receiving the inverse-quantized transform coefficient block outputted from the pre-processor 2210 while selectively receiving the shape information from the overhead information encoder 9, and inverse-DCT-transforming the inverse-quantized transform coefficient block based on the shape information in vertical and horizontal directions, in this order, and then inverse-DCT-transforming the resultant inverse-quantized transform coefficient block based on the shape information in horizontal and vertical directions, in this order. The inverse orthogonal transform means 140 further includes a post-processor 2230 controlled to be switched between ON and OFF modes by the transform direction control signal from the transform mode control means 100. In the ON mode, the post-processor 1230 rotates a inverse transform coefficient block outputted from the inverse orthogonal transform unit 2220 in a clockwise direction by 90°, thereby outputting a rotated inverse transform coefficient block. In the OFF mode, the post-processor 2230 outputs the inverse transform coefficient block as it is.

The inverse transform coefficient block outputted from the first inverse orthogonal transform means 140 is applied to the first adder 6a which also receives the image signal block, previously recovered, stored in the first memory 7. The first adder 6a adds the received signals to each other, thereby recovering the input image signal block. The first memory 7 receives the recovered image signal block from the first adder 6a, and stores it therein for a next prediction. In response to a next input image signal block, the first memory 7 subsequently supplies the stored image signal block to the subtractor 1 as a previously recovered image signal block.

A switch 10b is coupled between the subtractor 1 and the mode controller 120 in order to selectively couple the residual signal block outputted from the subtractor 1 to the mode controller 120. Also, a switch 10c is coupled between the overhead information encoder 9 and the orthogonal transform means 1000 and first inverse orthogonal transform means 140 in order to selectively couple the shape information outputted from the overhead information encoder 9 to both the orthogonal transform means 1000 and first inverse orthogonal transform means 140.

A switch 10a is coupled between the overhead information encoder 9 and the multiplexer 11 in order to selectively couple the shape information outputted from the overhead information encoder 9 to the multiplexer 11.

A decoding configuration of the image compression-encoding and decoding system shown in FIG. 4 will now be described.

Referring to FIG. 4, a demultiplexer (DEMUX) 13 receives an output signal from the multiplexer 11 via the transmission medium 12. The demultiplexer 13 demultiplexes the received signal, thereby outputting an encoded shape information signal and an encoded image signal. The encoded image signal from the demultiplexer 13 is applied to a decoder 15 which, in turn, transforms the encoded image signal into a variable-length-decoded image signal.

A second inverse quantizer 200 receives the variable-length-decoded image signal from the decoder 15, and transforms the received signal into a inverse-quantized transform coefficient block. The encoded shape information from the demultiplexer 13 is selectively applied to an overhead information decoder 14 in accordance with a switching operation conducted by a switch 10e, thereby outputting recovered shape information.

In FIG. 4, the reference numeral 2000 denotes a second inverse orthogonal transform means for receiving the inverse-quantized transform coefficient block from the second inverse quantizer 200 while selectively receiving the recovered shape information from the overhead information decoder 14. The second inverse orthogonal transform means 2000 serves to carry out a transform for the inverse-quantized transform coefficient block based on the recovered shape information while being controlled in its inverse orthogonal transform mode by a inverse transform mode control means 210, thereby outputting a inverse transform coefficient block.

Referring to FIG. 5b, an embodiment of the second inverse orthogonal transform means 2000 is illustrated. As shown in FIG. 5b, the second inverse orthogonal transform means 2000 includes a first inverse orthogonal transform unit 2120 for selectively receiving the inverse-quantized transform coefficient block from the second inverse quantizer 200 while selectively receiving the recovered shape information from the overhead information decoder 14. The first inverse orthogonal transform unit 2120 inverse-DCT-transforms the inverse-quantized transform coefficient block in a vertical direction and then in a horizontal direction, based on the recovered shape information. The inverse orthogonal transform means 2000 also includes a second inverse orthogonal transform unit 2140 for selectively receiving the inverse-quantized transform coefficient block from the second inverse quantizer 200 while selectively receiving the recovered shape information from the overhead information decoder 14. The second inverse orthogonal transform unit 2140 inverse-DCT-transforms the inverse-quantized transform coefficient block in a horizontal direction and then in a vertical direction, based on the recovered shape information.

The inverse orthogonal transform means 2000 further includes a first switch 2110 for conducting a switching operation in response to a inverse transform direction control signal received from the inverse transform mode control means 210, thereby selectively coupling the inverse-quantized transform coefficient block outputted from the second inverse quantizer 200 to the first inverse orthogonal transform unit 2120 or the second inverse orthogonal transform unit 2140, and a second switch 2130 for conducting a switching operation in response to the inverse transform direction control signal received from the inverse transform mode control means 210, thereby selectively coupling the inverse transform coefficient block outputted from the first inverse orthogonal transform unit 2120 or the inverse transform coefficient block outputted from the second inverse orthogonal transform unit 2140 to the second adder 6b.

Another embodiment of the inverse orthogonal transform means 2000 is illustrated in FIG. 6b. As shown in FIG. 6b, the inverse orthogonal transform means 2000 includes a pre-processor 2210 controlled to be switched between ON and OFF modes by the inverse transform direction control signal from the inverse transform mode control means 210. In the ON mode, the pre-processor 2210 rotates the inverse-quantized transform coefficient block received from the second inverse quantizer 200 by 180° with respect to an axis connecting the left upper corner and right lower corner of the block to each other. In the OFF mode, the pre-processor 2210 outputs the inverse-quantized transform coefficient block as it is. The inverse orthogonal transform means 2000 also includes a inverse orthogonal transform unit 2220 for receiving the inverse-quantized transform coefficient block from the pre-processor 1210 while selectively receiving the currently recovered shape information from the inverse overhead information decoder 14, and inverse-DCT-transforming the inverse-quantized transform coefficient block based on the recovered shape information in vertical and horizontal directions, in this order, and then DCT-transforming the resultant inverse-quantized transform coefficient block based on the shape information in horizontal and vertical directions, in this order. The inverse orthogonal transform means 2000 further includes a post-processor 2230 controlled to be switched between ON and OFF modes by the inverse transform direction control signal from the inverse transform mode control means 210. In the ON mode, the post-processor 2230 rotates a inverse transform coefficient block outputted from the inverse orthogonal transform unit 2220 in a clockwise direction by 90°. In the OFF mode, the post-processor 2230 outputs the inverse transform coefficient block as it is.

The inverse transform coefficient block outputted from the second inverse orthogonal transform means 2000 is applied to the second adder 6b which also receives the image signal block previously recovered. The second adder 6b adds the received signals to each other, thereby outputting a recovered image signal block. The second memory 18 receives the recovered image signal block from the second adder 6b, and stores it therein for a next prediction. In response to a next input image signal block, the second memory 18 subsequently supplies the stored image signal block to the second adder 6b as a previously recovered image signal block.

The inverse transform mode control means 210 is configured to receive the variable-length-decoded signal from the decoder 15, thereby outputting an associated inverse transform direction control signal. This inverse transform mode control means 210 includes a memory 211 for receiving the variable-length-decoded signal from the decoder 15, and storing it therein, and a mode controller 120 for receiving the previous variable-length-decoded signal from the memory 211 while selectively receiving the current variable-length-decoded signal from the decoder 15, thereby outputting an associated inverse transform mode control signal.

Instead of the above mentioned configuration in which the previous variable-length-decoded signal from the memory 211 is used, the inverse transform mode control means 210 may be configured, in accordance with another embodiment, in such a fashion that it receives the recovered shape information from the overhead information decoder 14 while selectively receiving the current variable-length-decoded signal from the decoder 15, thereby outputting a inverse transform mode control signal. This embodiment is adapted to use only the recovered image signal block outputted from the second memory 18 and the residual signal included in the shape information.

A switch 19a is coupled between the overhead information decoder 14 and the second inverse orthogonal transform means 2000 in order to selectively couple the shape information outputted from the overhead information decoder 14 to the second inverse orthogonal transform means 2000.

Also, a switch 19b is coupled between the decoder 15 and the mode controller 213 in order to selectively couple the variable-length-decoded signal outputted from the decoder 15 to the mode controller 213. A switch 10e is coupled between the demultiplexer 13 and the overhead information decoder 14 in order to selectively couple the decoded shape information outputted from the demultiplexer 13 to the overhead information decoder 9.

Now, encoding and decoding methods of the present invention, which are conducted using the above mentioned image compression-encoding and decoding system in accordance with an adaptive transform scheme, will be described.

First, the encoding method will be described.

An input image signal block and shape information are applied to the subtractor 1 and overhead information encoder 9, respectively. The subtractor 1 performs a subtraction between the input image signal block and the recovered image signal block outputted from the first memory 7, thereby deriving an residual signal block. The residual signal block is applied to the orthogonal transform means 1000. The subtractor 1 may output the same signal as the input image signal, instead of the residual between the predicted signal outputted from the first memory 7 and the current input signal. In other words, the subtractor 1 may output the current input signal, as it is, without any prediction based on the output signal from the first memory 7. This may be achieved by initializing the value stored in the first memory 7 in such a fashion that it corresponds to "0".

The orthogonal transform means 1000, which receives the residual signal block from the subtractor 1, also selectively receives the shape information from the overhead information encoder 9. The orthogonal transform means 1000 carries out a transform for the residual signal block based on the shape information while being controlled in its orthogonal transform mode by the transform mode control means 100, thereby outputting a transform coefficient block.

The transform coefficient block outputted from the orthogonal transform means 1000 is applied to the first quantizer 3 which, in turn, transforms the transform coefficient block into a quantized transform coefficient block. The variable-length encoder 8 receives the quantized transform coefficient block from the first quantizer 3, and transforms it into a variable-length-coded transform coefficient signal. This variable-length-coded transform coefficient signal is applied to the multiplexer 11 which also selectively receives the shape information from the overhead information encoder 9. The multiplexer 11 multiplexes the received signals together, and transmits the resultant signal to a transmission medium 12.

The quantized transform coefficient block from the first quantizer 3 is also applied to the first inverse quantizer 4 which, in turn, transforms the quantized transform coefficient block into a inverse-quantized transform coefficient block. The first inverse orthogonal transform means 140 receives the inverse-quantized transform coefficient block from the first inverse quantizer 3 while selectively receiving the shape information from the overhead information encoder 9. Based on the received blocks, the first inverse orthogonal transform means 140 outputs a inverse transform coefficient block under the condition in which its inverse transform mode is controlled by the transform mode control means 100.

The inverse transform coefficient block from the first inverse orthogonal transform means 140 is applied to the first adder 6a which also receives the image signal block, previously recovered, stored in the first memory 7. The first adder 6a adds the received signals to each other, thereby recovering the input image signal block. The first memory 7 receives the recovered image signal block from the first adder 6a, and stores it therein. The first memory 7 subsequently supplies the stored image signal block to the subtractor 1.

The mode controller 120 of the transform mode control means 100 can generate a transform direction control signal using two methods, respectively.

The first method is associated with the case in which a block encoding method shown in FIG. 7 is used.

The block encoding method is an encoding method in which an input signal is divided into blocks each having a desired size, so that each of those blocks is transform-encoded.

In FIG. 7, "X" represents an input block to be currently encoded. This block X does not participate in the generation of the transform direction control signal associated therewith. "A", "B", and "C" represent respective quantized transform coefficient blocks which are outputted from the first quantizer 3, stored in the memory 10, and then applied from the memory 10 to the mode controller 120. The block A is arranged at the left side of the block X. The block B is arranged above the block X at the left side of the block X. On the other hand, the block C is arranged over the block X.

For a mode determination, a variation in DC value among the transform coefficients of the blocks should be used. The DC value variations in horizontal and vertical directions can be derived using the following Expression 1:

$$\text{Grad\_Vert}=\text{ABS}(DC\_A-DC\_B)$$

$$\text{Grad\_Hori}=\text{ABS}(DC\_B-DC\_C) \quad \text{[Expression 1]}$$

where, "Grad_Vert" represents a variation in DC value in a vertical direction, and "Grad_Hori" represents a variation in DC value in a horizontal direction.

In association with Expression 1, "ABS(a)" represents an absolute value of "a".

Based on the values derived using Expression 1, the mode controller 120 generates a transform direction control signal associated with a transform direction involving a lesser variation in DC value.

That is, when "Grad_Vert" is less than or equal to "Grad_Hori", a transform direction control signal is gen-erated which serves to control the orthogonal transform in such a fashion that it is conducted in a vertical direction and then in a horizontal direction. On the other hand, when "Grad_Vert" is more than "Grad_Hori", a transform direction control signal is generated which serves to control the orthogonal transform in such a fashion that it is conducted in a horizontal direction and then in a vertical direction.

In accordance with this method, the DC value of each block is indicative of a mean value of the block. Accordingly, the variation among the mean values of the blocks arranged around the block to be currently encoded is information indicative of the property of the current block, that is, indicative of whether signals within the current block have a high correlation in a horizontal direction or in a vertical direction. In accordance with this method, therefore, it is possible to efficiently determine a desired mode associated with the transform direction only using information about peripheral blocks.

In accordance with this method, there is an advantage in that the transform direction control signal for the block to be currently encoded can be derived using a very simple computation. This is because only the information about the blocks already encoded is used in accordance with the above mentioned method.

Since only the information about the blocks already encoded is used, the decoder can use the transform direction control signal determined by the encoder, as it is, without a reception of any control signal.

Figure 8:
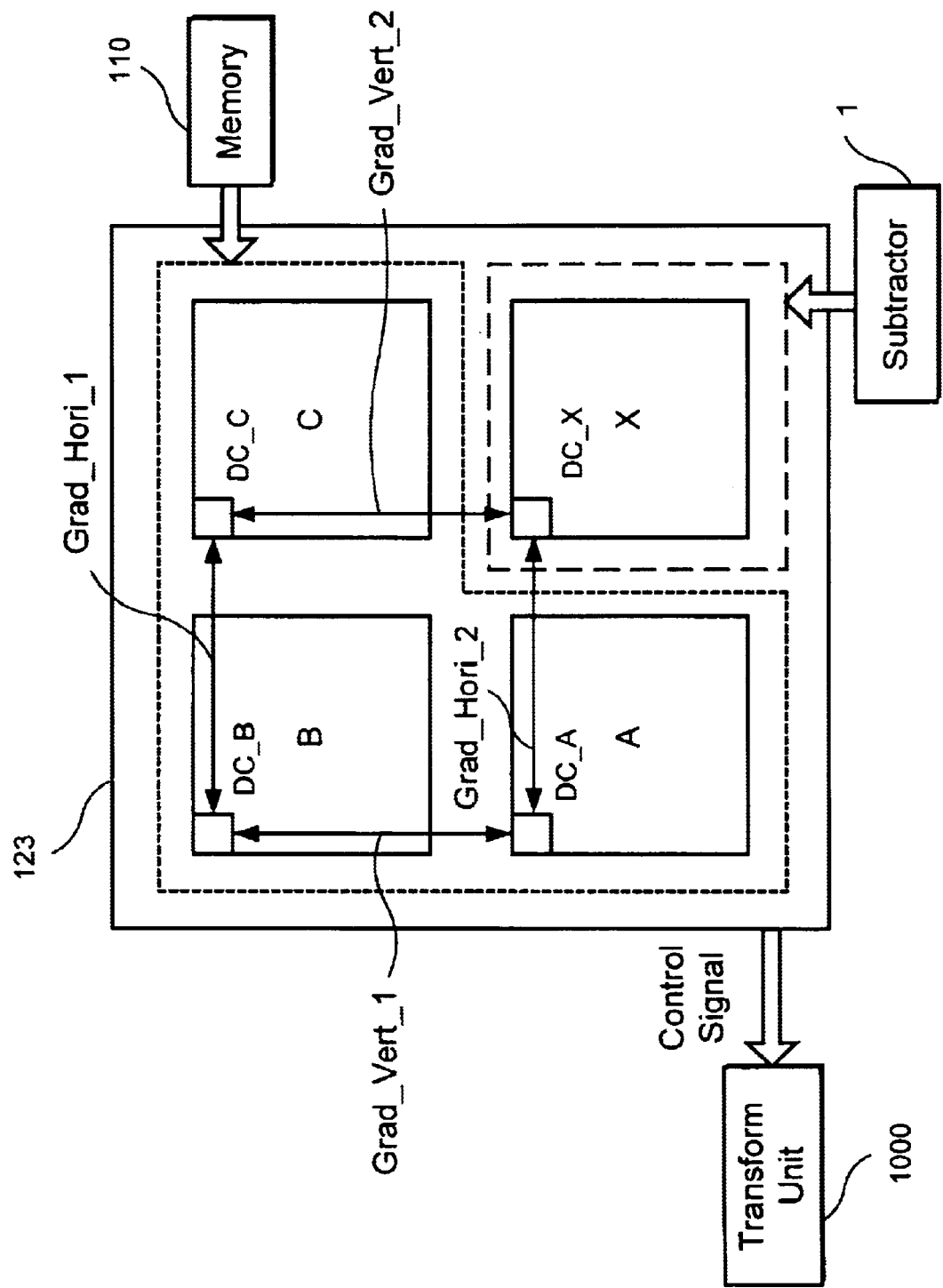
FIG. 8 is a block diagram illustrating a mode controller according to another embodiment of the present invention.

The other method is illustrated in FIG. 8. The method of FIG. 8 not only uses the transform coefficient blocks already quantized and arranged around the block to be currently encoded, but also uses information about the current block, in order to more accurately determine a desired control mode, as compared to the method of FIG. 7 using only the information about the already quantized transform coefficients.

In accordance with this method, the quantized DC value of the block to be currently encoded is used in order to prevent any control signal from being transmitted to the decoder.

In FIG. 8, "X" represents an input block, to be currently encoded, generated from the subtractor 1. "A", "B", and "C" represent respective quantized transform coefficient blocks which are outputted from the first quantizer 3, stored in the memory 10, and then applied from the memory 10 to the mode controller 120. The block A is arranged at the left side of the block X. The block B is arranged above the block X at the left side of the block X. On the other hand, the block C is arranged over the block X.

For a mode determination, variations in DC value among the transform coefficients of the blocks, which are expressed by the following Expression 2, are used.

$$\text{Grad\_Vert\_1}=\text{ABS}(DC\_A-DC\_B)$$

$$\text{Grad\_Vert\_2}=\text{ABS}(DC\_C-DC\_X)$$

$$\text{Grad\_Hori\_1}=\text{ABS}(DC\_B-DC\_C)$$

$$\text{Grad\_Hori\_2}=\text{ABS}(DC\_A-DC\_X) \quad \text{[Expression 1]}$$

In association with Expression 1, "ABS(a)" represents an absolute value of "a". in order to determine a desired mode, it is necessary to derive variations in DC value in horizontal and vertical directions, using the following Expression 3:

$$\text{Grad\_Vert}=\text{Grad\_Vert\_1}+\text{Grad\_Vert\_2}$$

$$\text{Grad\_Hori}=\text{Grad\_Hori\_1}+\text{Grad\_Hori\_2} \quad \text{[Expression 3]}$$

where, "Grad_Vert" represents a variation in DC value in a vertical direction, and "Grad_Hori" represents a variation in DC value in a horizontal direction.

Based on the values derived using Expression 2, the mode controller 120 generates a transform direction control signal associated with a transform direction involving a lesser variation in DC value.

That is, when "Grad_Vert" is less than or equal to "Grad_Hori", a transform direction control signal is generated which serves to control the orthogonal transform in such a fashion that it is conducted in a vertical direction and then in a horizontal direction. On the other hand, when "Grad_Vert" is more than "Grad_Hori", a transform direction control signal is generated which serves to control the orthogonal transform in such a fashion that it is conducted in a horizontal direction and then in a vertical direction.

In accordance with this method, there is an advantage in that a transform direction control signal having an increased accuracy is obtained because the information about the current block is used along with the information about the peripheral blocks, as compared to the method of FIG. 7. However, this method has a drawback in that it requires an increased amount of computation by virtue of the requirement to additionally derive the DC value of the current block and an increased number of variations in DC value to be derived. Although an addition computation is used to derive variations in DC value in the illustrated case, a variety of other methods may be used. For example, a maximum value computation or a subtraction computation may be used.

As mentioned above, the orthogonal transform means 1000 can be implemented in accordance with two embodiments, respectively. The orthogonal transform carried out in the orthogonal transform means 1000 will now be described in conjunction with each embodiment associated with the orthogonal transform means 1000.

First, the orthogonal transform conducted in the orthogonal transform means according to the embodiment of FIG. 5a will be described.

The transform mode of the orthogonal transform means 1000 is determined by the transform direction control signal from the transform mode control means 100 applied to the first and second switches 1110 and 1130. That is, when the transform direction control signal has information for controlling orthogonal transform to be conducted in vertical and horizontal directions, in this order, the first and second switches 1110 and 1130 switch on the input and output terminals of the first orthogonal transform unit 1120, respectively. In this case, accordingly, the first orthogonal transform unit 1120 receives the residual signal block from the subtractor 1 while selectively receiving the shape information from the overhead information encoder 9. The first orthogonal transform unit 1120 outputs a transform coefficient signal obtained after orthogonal-transforming the residual signal block in a vertical direction and then in a horizontal direction, based on the shape information. The residual signal block may also be identical to the input image signal block by initializing the value stored in the first memory 7 in such a fashion that it corresponds to "0".

On the other hand, when the transform direction control signal has information for controlling orthogonal transform to be conducted in horizontal and vertical directions, in this order, the first and second switches 1110 and 1130 switch on the input and output terminals of the second orthogonal transform unit 1140, respectively. In this case, accordingly, the second orthogonal transform unit 1140 receives the residual signal block from the subtractor 1 while selectively receiving the shape information from the overhead information encoder 9. The first orthogonal transform unit 1120 outputs a transform coefficient block obtained after orthogonal-transforming the residual signal block in a horizontal direction and then in a vertical direction, based on the shape information.

The orthogonal transform conducted in the orthogonal transform means according to the embodiment of FIG. 6a will now be described.

In accordance with this embodiment, when the pre-processor 1210 of the orthogonal transform means 1000 receives, from the transform mode control means 100, a transform direction control signal having information for controlling orthogonal transform to be conducted in horizontal and vertical directions, in this order, it is switched to its ON mode to rotate the residual signal block received from the subtractor 1 in a counter-clockwise direction by 90°. The rotated block from the pre-processor 1210 is applied to the orthogonal transform unit 1220 which also selectively receives the shape information from the overhead information encoder 9. The orthogonal transform unit 1220 orthogonal-transforms the residual signal block based on the shape information in vertical and horizontal directions, in this order. The resultant block is then applied to the post-processor 1230.

The post-processor 1230 rotates the received block by 180° with respect to an axis connecting the left upper corner and right lower corner of the block to each other, thereby outputting a transform coefficient block.

On the other hand, when the transform direction control signal has information for controlling orthogonal transform to be conducted in vertical and horizontal directions, in this order, both the pre-processor 1210 and post-processor 1230 are switched to their OFF modes, respectively. In this case, the pre-processor 1210 and post-processor 1230 output respective input signals applied thereto, as they are, without any processing. In this case, only the orthogonal transform unit 1220 performs a desired signal processing. That is, the orthogonal transform unit 1220 outputs a transform coefficient block obtained after orthogonal-transforming the residual signal block in a vertical direction and then in a horizontal direction, based on the shape information applied thereto. The subtractor 1 may output the same signal as the current input signal, instead of the residual between the predicted signal outputted from the first memory 7 and the current input signal. In other words, the subtractor 1 may output the current input signal, as it is, without any prediction based on the output signal from the first memory 7. This may be achieved by initializing the value stored in the first memory 7 in such a fashion that it corresponds to "0".

The inverse orthogonal transform means 140 can also be implemented in accordance with two embodiments, respectively. The inverse orthogonal transform carried out in the inverse orthogonal transform means 140 will now be described in conjunction with each embodiment associated with the inverse orthogonal transform means 140.

First, the inverse orthogonal transform conducted in the inverse orthogonal transform means according to the embodiment of FIG. 5b will be described.

When the transform direction control signal from the transform mode control means 100 applied to the first and second switches 2110 and 2130 has information for controlling inverse orthogonal transform to be conducted in horizontal and vertical directions, in this order, the first and second switches 2110 and 2130 switch on the input and output terminals of the first inverse orthogonal transform unit 2120, respectively. In this case, accordingly, the first inverse orthogonal transform unit 2120 receives the inverse-quantized transform coefficient block from the first inverse quantizer 4 while selectively receiving the shape information from the overhead information encoder 9. The first inverse orthogonal transform unit 2120 inverse-orthogonal-transforms the inverse-quantized transform coefficient block in a vertical direction and then in a horizontal direction, based on the shape information, and outputs the resultant inverse transform coefficient block.

On the other hand, when the transform direction control signal has information for controlling inverse orthogonal transform to be conducted in vertical and horizontal directions, in this order, the first and second switches 2110 and 2130 switch on the input and output terminals of the second inverse orthogonal transform unit 2140, respectively. In this case, accordingly, the second inverse orthogonal transform unit 2140 receives the inverse-quantized transform coefficient block from the first inverse quantizer 4 while selectively receiving the shape information from the overhead information encoder 9. The first inverse orthogonal transform unit 2120 inverse-orthogonal-transforms the inverse-quantized transform coefficient block in a horizontal direction and then in a vertical direction, based on the shape information, and outputs the resultant inverse transform coefficient block.

The inverse orthogonal transform conducted in the inverse orthogonal transform. means according to the embodiment of FIG. 6b will now be described.

In accordance with this embodiment, when the pre-processor 2210 of the inverse orthogonal transform means 140 receives, from the transform mode control means 100, a transform direction control signal having information for controlling inverse orthogonal transform to be conducted in horizontal and vertical directions, in this order, it is switched to its ON mode to rotate the inverse-quantized transform coefficient block received from the first inverse quantizer 4 by 180° with respect to an axis connecting the left upper corner and right lower corner of the block to each other. The rotated block from the pre-processor 2210 is applied to the inverse orthogonal transform unit 2220 which also selectively receives the shape information from the overhead information encoder 9. The inverse orthogonal transform unit 2220 inverse-orthogonal-transforms the received block based on the shape information in horizontal and vertical directions, in this order. The resultant block is then applied to the post-processor 2230.

The post-processor 2230 rotates the received block in a clockwise direction by 90°, thereby outputting resultant inverse transform coefficient block.

On the other hand, when the transform direction control signal has information for controlling inverse orthogonal transform to be conducted in vertical and horizontal directions, in this order, both the pre-processor 2210 and post-processor 2230 are switched to their OFF modes, respectively. In this case, the pre-processor 2210 and post-processor 2230 output respective input signals applied thereto, as they are, without any processing. In this case, only the inverse orthogonal transform unit 2220 performs a desired signal processing. That is, the orthogonal transform unit 1220 outputs a inverse transform coefficient block obtained after inverse-orthogonal-transforming the inverse-quantized transform coefficient block in a horizontal direction and then in a vertical direction, based on the shape information applied thereto.

Now, the decoding method of the present invention will be described.

When the demultiplexer 13 receives an output signal from the multiplexer 11 via the transmission medium 12, it demultiplexes the received signal, thereby outputting a variable-length-encoded shape information signal and a variable-length-encoded image signal. The variable-length-encoded image signal from the demultiplexer 13 is applied to the decoder 15 which, in turn, transforms the received image signal into a quantized transform coefficient signal. On the other hand, the overhead information decoder 14 selectively receives the variable-length-encoded shape information, thereby recovering original shape information.

The second inverse quantizer 200 receives the quantized transform coefficient signal from the decoder 15, and transforms the received signal into a inverse-quantized transform coefficient block. This inverse-quantized transform coefficient block is applied to the second inverse-orthogonal transform means 2000 which also selectively receives the recovered shape information from the overhead information decoder 14. The second inverse orthogonal transform means 2000 carries out a inverse orthogonal transform for the inverse-quantized transform coefficient block based on the recovered shape information while being controlled in its inverse orthogonal transform mode by a inverse transform mode control means 210, thereby outputting a inverse transform coefficient block.

The inverse transform coefficient block outputted from the second inverse orthogonal transform means 2000 is applied to the second adder 6b which also receives the image signal block, previously recovered, from the second memory 18. The second adder 6b adds the received signals to each other, thereby outputting a recovered image signal block.

The second memory 18 receives the recovered image signal block from the second adder 6b, and stores it therein. This second memory 18 subsequently supplies the stored image signal block to the second adder 6b as a previously recovered image signal block.

The generation of the inverse transform direction control signal from the inverse transform mode control means 210 is achieved in the same manner as that of the transform mode control means 100. Of course, where the transform mode control means 100 generates a transform direction control signal using a DC value, the inverse transform mode control means 210 should generate a inverse transform direction control signal using the DC value, as in the transform mode control means 100. Where the transform mode control means 100 uses the recovered image signal block and shape information, the inverse transform mode control means 210 should those recovered image signal block and shape information.

Also, the inverse orthogonal transform of the second inverse orthogonal transform means 200 is conducted in the same manner as that of the first inverse orthogonal transform means 140.

FIG. 9 is a view illustrating an input image having star-shaped shape information. In FIG. 9, the shaded portion corresponds to the object portion of the input image whereas the remaining portion corresponds to the background portion of the input image.

On the other hand, FIG. 10 is a view illustrating blocks to be used for encoding of the input image having the shape information of FIG. 9. Only the shaded blocks are to be encoded. The remaining blocks are not to be encoded.

In order to select a desired transform method for a block to be encoded while avoiding information about this selection from being transmitted to the decoder, it is necessary to select a desired transform method only using information associated with the blocks previously encoded.

In other words, the selection of a desired transform method for a block to be currently encoded should be achieved only using blocks arranged above the block, to be encoded, while being arranged at the left side of the block to be encoded.

Figure 11:
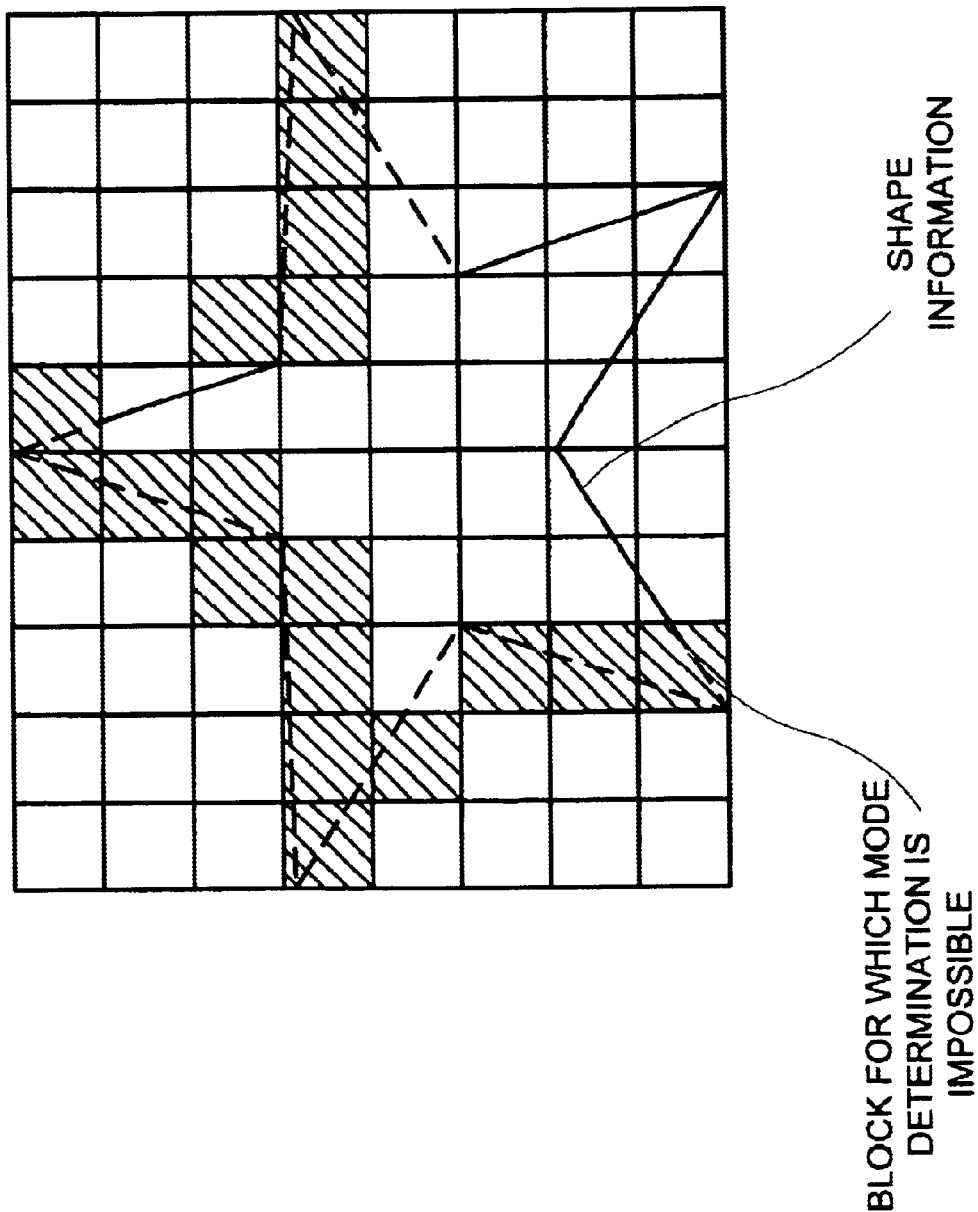
FIG. 11 is a view illustrating an example in which where the shape information of FIG. 9 is used, and a block-based encoding method is used, it is impossible to select a desired transform method for the block to be encoded when there are no or few blocks previously encoded.

In this case, when there are no or few blocks previously encoded, that is, shaded blocks in FIG. 11, it is impossible to select a desired transform method for the block to be encoded. In this case, it is assumed that the encoding of blocks is carried out in the order starting from the left upper block to the right lower block in the right direction.

On the other hand, where a desired transform method is selected directly using the signal to be currently encoded, a higher accuracy in the selection of a desired transform method can be obtained because the signal to be currently encoded is directly analyzed, as compared to the case in which the selection of a desired transform method is achieved only using peripheral signals. Accordingly, the direct use of the signal to be currently encoded provides an increase in encoding efficiency in spite of the fact that additional bits are generated due to the transmission of the mode control signal as mentioned above. On the other hand, where the selection of a desired transform method is achieved using peripheral signals, there is an advantage in that problems associated with bit stream editability can be solved. This will be described hereinafter.

Figure 12B:
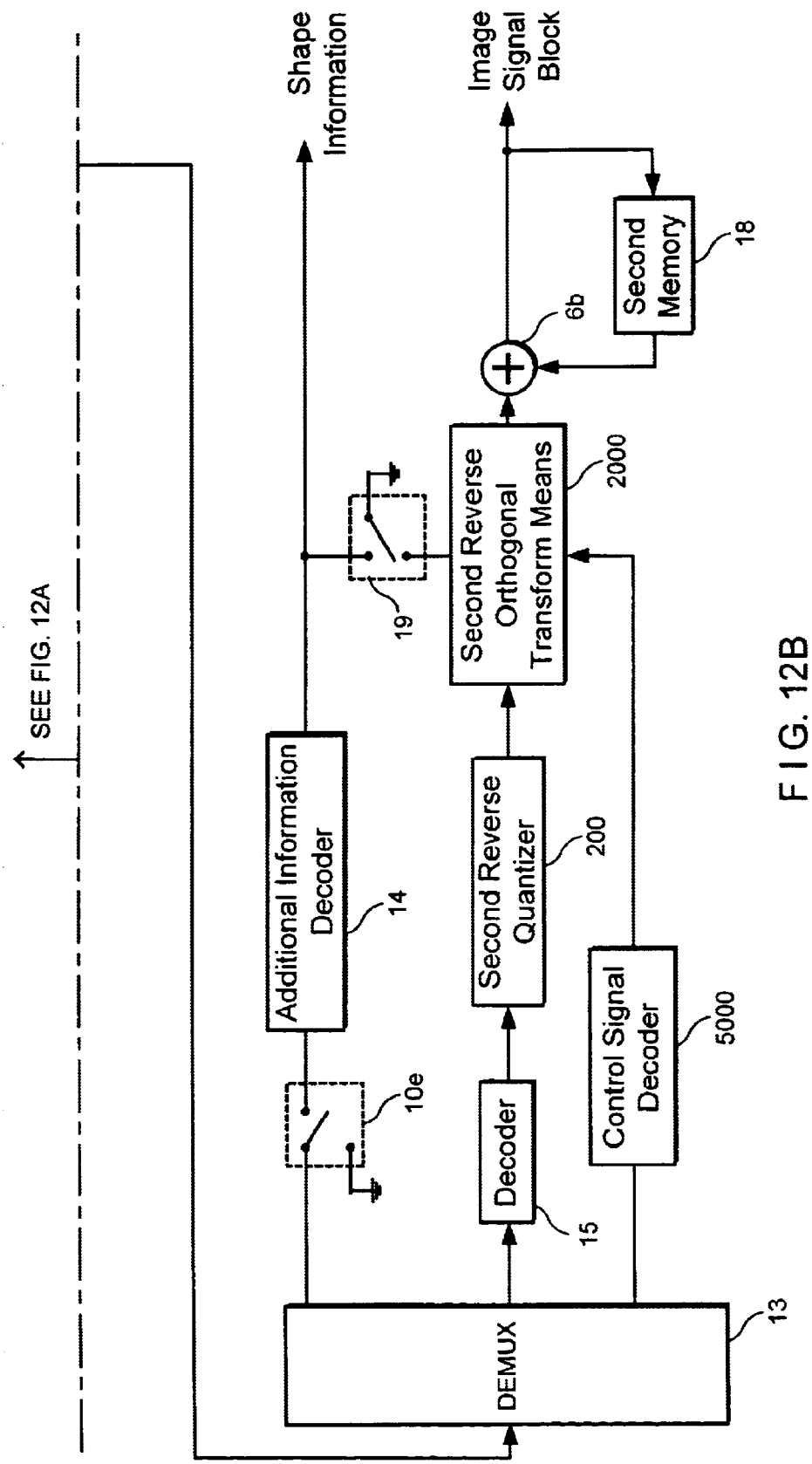
FIG. 12 is a block diagram illustrating an image compression-encoding and decoding system using an adaptive transform scheme in accordance with a second embodiment of the present invention.

FIG. 12 is a block diagram illustrating an image compression-encoding and decoding system using an adaptive transform scheme in accordance with a second embodiment of the present invention. In FIG. 12, elements respectively corresponding to those in FIG. 4 are denoted by the same reference numerals.

The system of the second embodiment eliminates use of the transform mode control means 100 adapted to generate a transform direction control signal, the switch 10b adapted to selectively apply an residual signal block to the transform mode control means 100, the inverse transform mode control means 210 adapted to generate a inverse transform directional control signal, and the switch 19b adapted to selectively apply the variable-length-decoded signal from the decoder 15 to the inverse transform mode control means 210, which are used in the system of first embodiment. Instead of these elements, the system of the second embodiment additionally use the following elements.

That is, the system of FIG. 12 additionally includes a mode control means 3000 for selectively receiving the shape information outputted from the overhead information encoder 9 while receiving the residual signal block outputted from the subtractor 1 in order to use only the residual signal included in the shape information. Based on the received signals, the mode control means 300 generates a transform direction control signal for determining the orthogonal transform direction order. The system also includes a control signal encoder 4000 for receiving the transform direction control signal from the mode control means 3000, and encoding it, and a control signal decoder 5000 for receiving the encoded transform direction control signal from the control signal encoder 400 via the multiplexer 11, transform medium 12 and demultiplexer 13, variable-length-decoding the received signal, and outputting the resultant transform direction control signal to the second inverse orthogonal transform means 200.

In accordance with this embodiment, the subtractor 1 may also output the same signal as the current input image signal, instead of the residual between the current input signal and an predicted signal outputted from a first memory 7. In other words, the subtractor 1 may output the current input signal, as it is, without any prediction based on the output signal from the first memory 7. This may be achieved by initializing the value stored in the first memory 7 in such a fashion that it corresponds to "0".

The mode control means 3000 can be implemented in accordance with three embodiments, respectively. Respective embodiments of the mode control means 3000 will be described in conjunction with FIGS. 13, 14 and 15.

Figure 13:
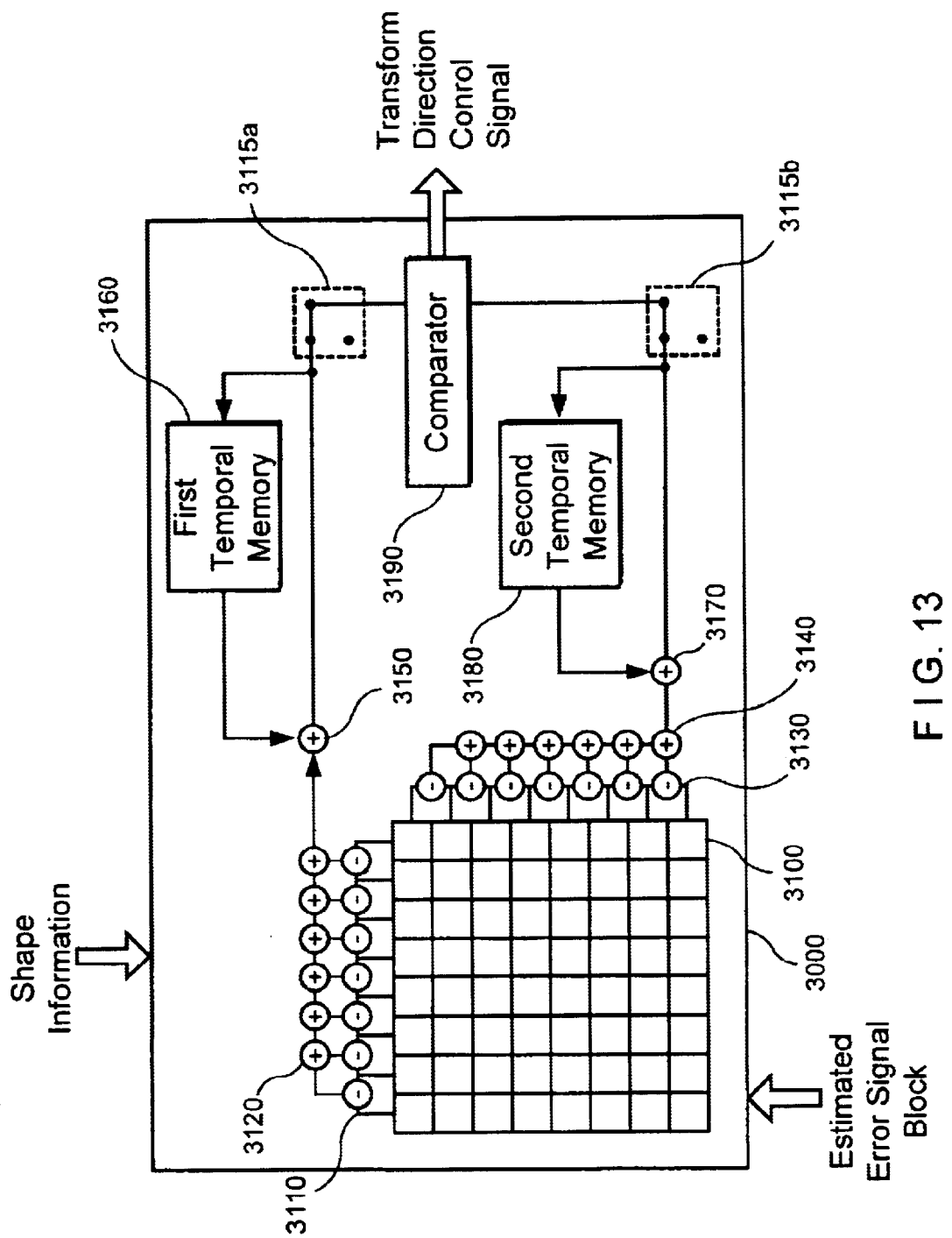
FIG. 13 is a block diagram illustrating a mode control means of FIG. 12 in accordance with an embodiment of the present invention.

FIG. 13 illustrates a first embodiment of the mode control means 3000. As shown in FIG. 13, the mode control means 3000 includes a two-dimensional memory 3100 for receiving an residual signal block, to be currently encoded, from the subtractor 1, and storing it therein, a plurality of horizontal subtractors 3110 each adapted to derive a difference between the values of associated ones of pixels existing on each of the rows in the residual signal block stored in the two-dimensional memory 3100 in a fashion repeated for all rows, a plurality of horizontal adders 3120 each adapted to drive a sum of the difference values outputted from associated ones of the horizontal subtractors 3110, a final horizontal adder 3150 for adding the sum of the summed difference values outputted from the horizontal adders 3120 for the current row to the sum of the summed difference values derived for previous rows, a first temporal memory 3160 for temporarily storing the sum outputted from the final horizontal adder 3150, and a switch 3115a adapted to perform a switching operation for applying the output from the final horizontal adder 3150 for the last row to a comparator 3190.

The mode control means 3000 of the first embodiment also includes a plurality of vertical subtractors 3130 each adapted to derive a difference between the values of associated ones of pixels existing on each of the columns in the residual signal block stored in the two-dimensional memory 3100 in a fashion repeated for all columns, a plurality of vertical adders 3140 each adapted to drive a sum of the difference values outputted from associated ones of the vertical subtractors 3130, a final vertical adder 3170 for adding the sum of the summed difference values outputted from the vertical adders 3140 for the current column to the sum of the summed difference values derived for previous columns, a second temporal memory 3180 for temporarily storing the sum outputted from the final vertical adder 3170, and a switch 3115b, adapted to perform a switching operation for applying the output from the final vertical adder 3170 for the last column to a comparator 3190. The comparator 3190, which is also included in the mode control means 3000, serves to compare the row sum outputted from the first temporal memory 3160 with the column sum outputted from the second temporal memory 3180. When the row sum is less than the column sum, the comparator 3190 generates a transform direction control signal for controlling the orthogonal transform to be conducted in a horizontal direction, and then in a vertical direction while controlling the inverse orthogonal transform to be conducted in the order inverse to that of the orthogonal transform. On the other hand, when the row sum is not less than the column sum, the comparator 3190 generates a transform direction control signal for controlling the orthogonal transform to be conducted in a vertical direction, and then in a horizontal direction while controlling the inverse orthogonal transform to be conducted in the order inverse to that of the orthogonal transform.

The horizontal subtractors 3110 and vertical subtractors 3130 selectively receive the shape information outputted from the overhead information encoder 9 so that each of them derives a difference between the values of associated ones of pixels to be encoded, that is, object pixels, based on the received shape information.

FIG. 14 illustrates a second embodiment of the mode control means 3000. As shown in FIG. 14, the mode control means 3000 includes a first orthogonal transform unit 3200 for receiving an residual signal block, to be currently encoded, from the subtractor 1 while selectively receiving shape information from the overhead information encoder 9, and performing an orthogonal transform for the residual signal block based on the shape information in a horizontal direction and then in a vertical direction, thereby outputting an associated transform coefficient block, and a first bit stream counter 3220 for receiving the transform coefficient block from the first orthogonal transform unit 3200, thereby estimating the amount of codes to be generated upon quantizing and variable-length-coding the transform coefficient block. The mode control means 3000 also includes a second orthogonal transform unit 3210 for receiving the residual signal block from the subtractor 1 while selectively receiving the shape information from the overhead information encoder 9, and performing an orthogonal transform for the residual signal block based on the shape information in a vertical direction and then in a horizontal direction, thereby outputting an associated transform coefficient block, a second bit stream counter 3230 for receiving the transform coefficient block from the second orthogonal transform unit 3210, thereby estimating the amount of codes to be generated upon quantizing and variable-length-coding the transform coefficient block outputted from the second orthogonal transform unit 3210, and a comparator 3240 for comparing the estimated code amounts outputted from the first and second bit stream counters 3220 and 3230 with each other, thereby outputting a transform direction control signal adapted to enable the orthogonal transform associated with the less code amount. In accordance with this embodiment, the subtractor 1 may also output the same signal as the current input image signal, instead of the residual between the current input signal and the predicted signal outputted from the first memory 7. In other words, the subtractor 1 may output the current input signal, as it is, without any prediction based on the output signal from the first memory 7. This may be achieved by initializing the value stored in the first memory 7 in such a fashion that it corresponds to "0".

FIG. 15 illustrates a third embodiment of the mode control means 3000. As shown in FIG. 15, the mode control means 3000 includes a first orthogonal transform unit 3300 for receiving an residual signal block, to be currently encoded, from the subtractor 1 while selectively receiving shape information from the overhead information encoder 9, and performing an orthogonal transform for the residual signal block based on the shape information in a vertical direction and then in a horizontal direction, thereby outputting an associated transform coefficient block, a first quantizer 3310 for receiving the transform coefficient block from the first orthogonal transform unit 3300, and quantizing the received transform coefficient block, a first inverse quantizer 3320 for receiving the quantized transform coefficient block from the first quantizer 3310, and inverse-quantizing the received transform coefficient block, a first inverse orthogonal transform unit 3330 for receiving the inverse-quantized transform coefficient block from the first inverse quantizer 3320 while selectively receiving the shape information from the overhead information encoder 9, performing a inverse orthogonal transform for the received transform coefficient block based on the shape information in a horizontal direction and then in a vertical direction, thereby outputting a recovered image signal block, and a first error detector 3340 for receiving the recovered image signal block from the first inverse orthogonal transform unit 3330 along with the residual signal block, to be encoded, from the subtractor 1, which is applied to the first orthogonal transform unit 3300, and detecting an error between the received blocks. The residual signal block may also be identical to the input image signal block. This can be achieved by initializing the value stored in the first memory 7 in such a fashion that it corresponds to "0".

The mode control means 3000 of the third embodiment also includes a second orthogonal transform unit 3350 for receiving the residual signal block, to be currently encoded, from the subtractor 1 while selectively receiving shape information from the overhead information encoder 9, and performing an orthogonal transform for the residual signal block based on the shape information in a horizontal direction and then in a vertical direction, thereby outputting an associated transform coefficient block, a second quantizer 3360 for receiving the transform coefficient block from the second orthogonal transform unit 3360, and quantizing the received transform coefficient block, a second inverse quantizer 3370 for receiving the quantized transform coefficient block from the second quantizer 3360, and inverse-quantizing the received transform coefficient block, a second inverse orthogonal transform unit 3380 for receiving the inverse-quantized transform coefficient block from the second inverse quantizer 3370 while selectively receiving the shape information from the overhead information encoder 9, performing a inverse orthogonal transform for the received transform coefficient block based on the shape information in a vertical direction and then in a horizontal direction, thereby outputting a recovered image signal block, a second error detector 3390 for receiving the recovered image signal block from the second inverse orthogonal transform unit 3380 along with the residual signal block, to be encoded, from the subtractor 1, which is applied to the second orthogonal transform unit 3350, and detecting an error between the received blocks, and a comparator 3400 for comparing the errors outputted from the first and second error detectors 3340 and 3390 with each other, thereby outputting a transform direction control signal adapted to enable the orthogonal transform and inverse orthogonal transform associated with the less error amount. In accordance with this embodiment, the subtractor 1 may also output the same signal as the current input image signal, instead of the residual between the current input signal and the predicted signal outputted from the first memory 7. In other words, the subtractor 1 may output the current input signal, as it is, without any prediction based on the output signal from the first memory 7. This may be achieved by initializing the value stored in the first memory 7 in such a fashion that it corresponds to "0".

Now, encoding and decoding methods of the present invention, which are conducted using the above mentioned image compression-encoding and decoding system of the second embodiment in accordance with an adaptive transform scheme, will be described.

First, the encoding method will be described.

An input image signal block and shape information are applied to the subtractor 1 and overhead information encoder 9, respectively. The subtractor 1 performs a subtraction between the input image signal block and the recovered image signal block outputted from the first memory 7, thereby deriving an residual signal block. The residual signal block is applied to the orthogonal transform means 1000.

The subtractor 1 may output the same signal as the input image signal, instead of the residual between the predicted signal outputted from the first memory 7 and the current input signal. In other words, the subtractor 1 may output the current input signal, as it is, without any prediction based on the output signal from the first memory 7. This may be achieved by initializing the value stored in the first memory 7 in such a fashion that it corresponds to "0".

The residual signal block from the subtractor 1 is also applied to the mode control means 3000 which, in turn, a transform direction control signal adapted to determine the orthogonal transform order and the inverse orthogonal transform order, based on the received residual signal block. The control signal encoder 4000 receives the transform direction control signal from the mode control means 3000, and encodes it. The resultant encoded transform direction control signal is outputted to the multiplexer 11.

The orthogonal transform means 1000, which receives the residual signal block from the subtractor 1, also selectively receives the shape information from the overhead information encoder 9. The orthogonal transform means 1000 carries out a transform for the residual signal block based on the shape information while being controlled in its orthogonal transform direction by the transform mode control means 100, thereby outputting a transform coefficient block.

The transform coefficient block outputted from the orthogonal transform means 1000 is applied to the first quantizer 3 which, in turn, transforms the transform coefficient block into a quantized transform coefficient block. The variable-length encoder 8 receives the quantized transform coefficient block from the first quantizer 3, and transforms it into a variable-length-coded transform coefficient signal.

The variable-length-coded transform coefficient signal is applied to the multiplexer 11 which also selectively receives the shape information from the overhead information encoder 9. The encoded transform direction control signal from the control signal encoder 4000 is also applied to the multiplexer 11. This multiplexer 11 multiplexes the received signals together, and transmits the resultant signal to a transmission medium 12.

The quantized transform coefficient block from the first quantizer 3 is also applied to the first inverse quantizer 4 which, in turn, transforms the quantized transform coefficient block into a inverse-quantized transform coefficient block. The first inverse orthogonal transform means 140 receives the inverse-quantized transform coefficient block from the first inverse quantizer 3 while selectively receiving the shape information from the overhead information encoder 9. Based on the received blocks, the first inverse orthogonal transform means 140 outputs a inverse transform coefficient block under the condition in which its inverse transform mode is controlled by the transform mode control means 100.

The inverse transform coefficient block from the first inverse orthogonal transform means 140 is applied to the first adder 6a which also receives the image signal block, previously recovered, stored in the first memory 7. The first adder 6a adds the received signals to each other, thereby recovering the input image signal block. The first memory 7 receives the recovered image signal block from the first adder 6a, and stores it therein. The first memory 7 subsequently supplies the stored image signal block to the subtractor 1.

A method for generating the transform direction control signal from the mode control means 3000 will now be described in conjunction with the above mentioned embodiments of the mode control means 3000, respectively.

First, the method of generating the transform direction control signal in accordance with the first embodiment will be described in conjunction with FIG. 13.

In accordance with this method, the two-dimensional memory 3100 receives an residual signal block, to be currently encoded, from the subtractor 1, and stores it therein. In this state, both the first and second switches 3115a and 3115b are in their OFF states with respect to the comparator 3190, respectively. Also, the first and second temporal memories 3160 and 3180 are in their initialized state to have a stored value of 0.

For the residual signal block stored in the two-dimensional memory 3100, the horizontal and vertical subtractors 3110 and 3130 perform a subtraction among pixel values in horizontal and vertical directions, respectively. Each horizontal adder 3120 receives the difference values respectively outputted from associated ones of the horizontal subtractors 3110, so that it sums the received difference values. Also, Each vertical adder 3140 receives the difference values respectively outputted from associated ones of the vertical subtractors 3130, so that it sums the received difference values.

The difference value sums respectively outputted from the horizontal adders 3120 are applied to the final horizontal adder 3150 which, in turn, sums the received difference value sums, and then adds the resultant sum, which is derived for the current row, to the sum of the summed difference values derived for previous rows. The resultant sum is then stored in the first temporal memory 3160. Similarly, the difference value sums respectively outputted from the vertical adders 3140 are applied to the final horizontal adder 3170 which, in turn, sums the received difference value sums, and then adds the resultant sum, which is derived for the current column, to the sum of the summed difference values derived for previous columns. The resultant sum is then stored in the second temporal memory 3180.

For the remaining rows and columns of the residual signal block, the same procedures as mentioned above are conducted to derive the sum of difference values among pixels for all rows and the sum of difference values among pixels for all columns. After deriving these sums, the first and second switches 3115a and 3115b are switched on, so that the comparator 3190 receives respective outputs from the final horizontal and vertical adders 3150 and 3170. The comparator 3190 compares the sum of difference values among pixels for all rows with the sum of difference values among pixels for all columns. In this case, the comparator 3190 determines that the orthogonal transform direction associated with the lesser difference value sum has a higher similarity. Accordingly, the comparator 3190 generates a transform direction control signal for controlling the orthogonal transform to be conducted in the direction associated with a higher similarity, and then in the direction associated with a lower similarity while controlling the inverse orthogonal transform to be conducted in the order inverse to that of the orthogonal transform.

The method of generating the transform direction control signal in accordance with the second embodiment will be described in conjunction with FIG. 14.

In accordance with this method, when the mode control means 3000 receives an residual signal block from the subtractor 1, the first orthogonal transform unit 3200 performs an orthogonal transform for the residual signal block in a horizontal direction and then in a vertical direction, thereby outputting a transform coefficient block. Simultaneously, the second orthogonal transform unit 3210 performs an orthogonal transform for the residual signal block in a vertical direction and then in a horizontal direction, thereby outputting a transform coefficient block.

The transform coefficient blocks outputted from the first and second orthogonal transform units 3200 and 3210 are applied to the first and second bit stream counters 3220 and 3230 which, in turn, calculate the amounts of code based on the received transform coefficient blocks, respectively.

The second comparator 3240 compares the amounts of code outputted from the first and second bit stream counters 3220 with each other, thereby outputting a transform direction control signal for allowing an orthogonal transform to be conducted by the orthogonal transform unit associated with the orthogonal transform direction involving the lesser code amount while allowing a inverse orthogonal transform to be conducted by the orthogonal transform unit associated with the orthogonal transform direction inverse to that of the orthogonal transform.

The method of generating the transform direction control signal in accordance with the third embodiment will be described in conjunction with FIG. 15.

In accordance with this method, when the mode control means 3000 receives an residual signal block from the subtractor 1, the first orthogonal transform unit 3300, which is coupled to one node of the mode control means 3000, performs an orthogonal transform for the residual signal block in a vertical direction and then in a horizontal direction, thereby outputting a transform coefficient block. The subtractor 1 may output the same signal as the input image signal, instead of the residual between the predicted signal outputted from the first memory 7 and the current input signal. In other words, the subtractor 1 may output the current input signal, as it is, without any prediction based on the output signal from the first memory 7. This may be achieved by initializing the value stored in the first memory 7 in such a fashion that it corresponds to "0".

The first quantizer 3310 receives the transform coefficient block from the first orthogonal transform unit 3300, and quantizes the received transform coefficient block. The quantized transform coefficient block from the first quantizer 3310 is applied to the first inverse quantizer 3320 which, in turn, inverse-quantizes the received transform coefficient block. The first inverse orthogonal transform unit 3330 receives the inverse-quantized transform coefficient block from the first inverse quantizer 3320, and performs a inverse orthogonal transform for the received transform coefficient block in a transform direction inverse to that of the first orthogonal transform unit 3300, thereby outputting a recovered image signal block.

The first error detector 3340 calculates an error between the recovered image signal block from the first inverse orthogonal transform unit 3330 and the residual signal block applied to the first orthogonal transform unit 3300, and applies the calculated error to the comparator 3400.

On the other hand, the second orthogonal transform unit 3350, which is coupled to the other node of the mode control means 3000, performs an orthogonal transform for the residual signal block in a horizontal direction and then in a vertical direction, thereby outputting a transform coefficient block. The second quantizer 3360 receives the transform coefficient block from the second orthogonal transform unit 3350, and quantizes the received transform coefficient block. The quantized transform coefficient block from the second quantizer 3360 is applied to the second inverse quantizer 3370 which, in turn, inverse-quantizes the received transform coefficient block. The second inverse orthogonal transform unit 3380 receives the inverse-quantized transform coefficient block from the second inverse quantizer 3370, and performs a inverse orthogonal transform for the received transform coefficient block in a transform direction inverse to that of the second orthogonal transform unit 3350, thereby outputting a recovered image signal block.

The second error detector 3390 calculates an error between the recovered image signal block from the second inverse orthogonal transform unit 3380 and the residual signal block applied to the second orthogonal transform unit 3350, and applies the calculated error to the comparator 3400.

The comparator 3400 receives the error values outputted from the first and second error detectors 3340 and 3390, and compares those error values with each other, thereby outputting a transform direction control signal adapted to allow an orthogonal transform and a inverse orthogonal transform to be conducted by the orthogonal transform unit and inverse orthogonal transform unit coupled to the node associated with the less error value.

Now, the decoding method of the present invention using the encoding and decoding system according to the second embodiment will be described.

When the demultiplexer 13 receives an encoded signal from the multiplexer 11 via the transmission medium 12, it demultiplexes the received signal, thereby outputting a variable-length-encoded shape information signal, a variable-length-encoded image signal, and a transform direction control signal. The variable-length-encoded image signal from the demultiplexer 13 is applied to the decoder 15 which, in turn, transforms the received image signal into a quantized transform coefficient signal. On the other hand, the overhead information decoder 14 selectively receives the variable-length-encoded shape information, thereby recovering original shape information.

The control signal decoder 5000 receives the encoded transform direction control signal, and recovers it into the original transform direction control signal.

The second inverse quantizer 200 receives the quantized transform coefficient signal from the decoder 15, and transforms the received signal into a inverse-quantized transform coefficient block. This inverse-quantized transform coefficient block is applied to the second inverse-orthogonal transform means 2000 which also selectively receives the recovered shape information from the overhead information decoder 14. The second inverse-orthogonal transform means 2000 also receives the recovered transform direction control signal from the control signal decoder 5000. The second inverse orthogonal transform means 2000 carries out a inverse orthogonal transform in a transform direction inverse to that of the orthogonal transform means 1000, thereby outputting a inverse-orthogonal-transformed signal block.

The inverse-orthogonal-transformed signal block outputted from the second inverse orthogonal transform means 2000 is applied to the second adder 6b which also receives the image signal block, previously recovered, from the second memory 18. The second adder 6b adds the received signals to each other, thereby outputting a recovered image signal block.

The second memory 18 receives the recovered image signal block from the second adder 6b, and stores it therein. This second memory 18 subsequently supplies the stored image signal block to the second adder 6b as a previously recovered image signal block.

The inverse orthogonal transform of the second inverse orthogonal transform means 200 controlled by the transform direction control signal outputted from the control signal decoder 5000 is carried out as follows. When the transform direction control signal has information for controlling orthogonal transform to be conducted in horizontal and vertical directions, in this order, the second inverse orthogonal transform means 200 performs a inverse orthogonal transform in a vertical direction and then in a horizontal direction. On the other hand, the transform direction control signal has information for controlling orthogonal transform to be conducted in vertical and horizontal directions, in this order, the second inverse orthogonal transform means 200 performs a inverse orthogonal transform in a horizontal direction and then in a vertical direction.

The mode controller, which is used to determine a desired transform direction, may be limitedly used, taking into consideration the characteristics of signals used or the complexity of hardware implemented. In the former case, for example, where a signal used has a very uniform component distribution, no or very low gain is obtained in association with the encoding efficiency obtained by virtue of a change of transform direction. In this case, generation of additional codes occurs due to transmission of control signals, thereby resulting in a degradation in encoding efficiency. In the latter case, the complexity of hardware implemented in, for example, a portable terminal, may cause more serious problems, as compared to the degradation in encoding efficiency. In some cases, it may be necessary to simplify the hardware implemented while sacrificing an enhancement in encoding efficiency which can be obtained in accordance with an adaptive setting for a desired transform direction. However, even in the case in which the encoder is not configured to achieve an adaptive setting for a desired transform direction, the decoder, which is configured to decode a bit stream containing a control signal associated with a desired transform direction, should have an ability to decode a bit stream encoded by the encoder. To this end, the bit stream to be decoded should contain information indicative of whether or not the control signal associated with a desired transform direction is to be used.

Figure 16A:
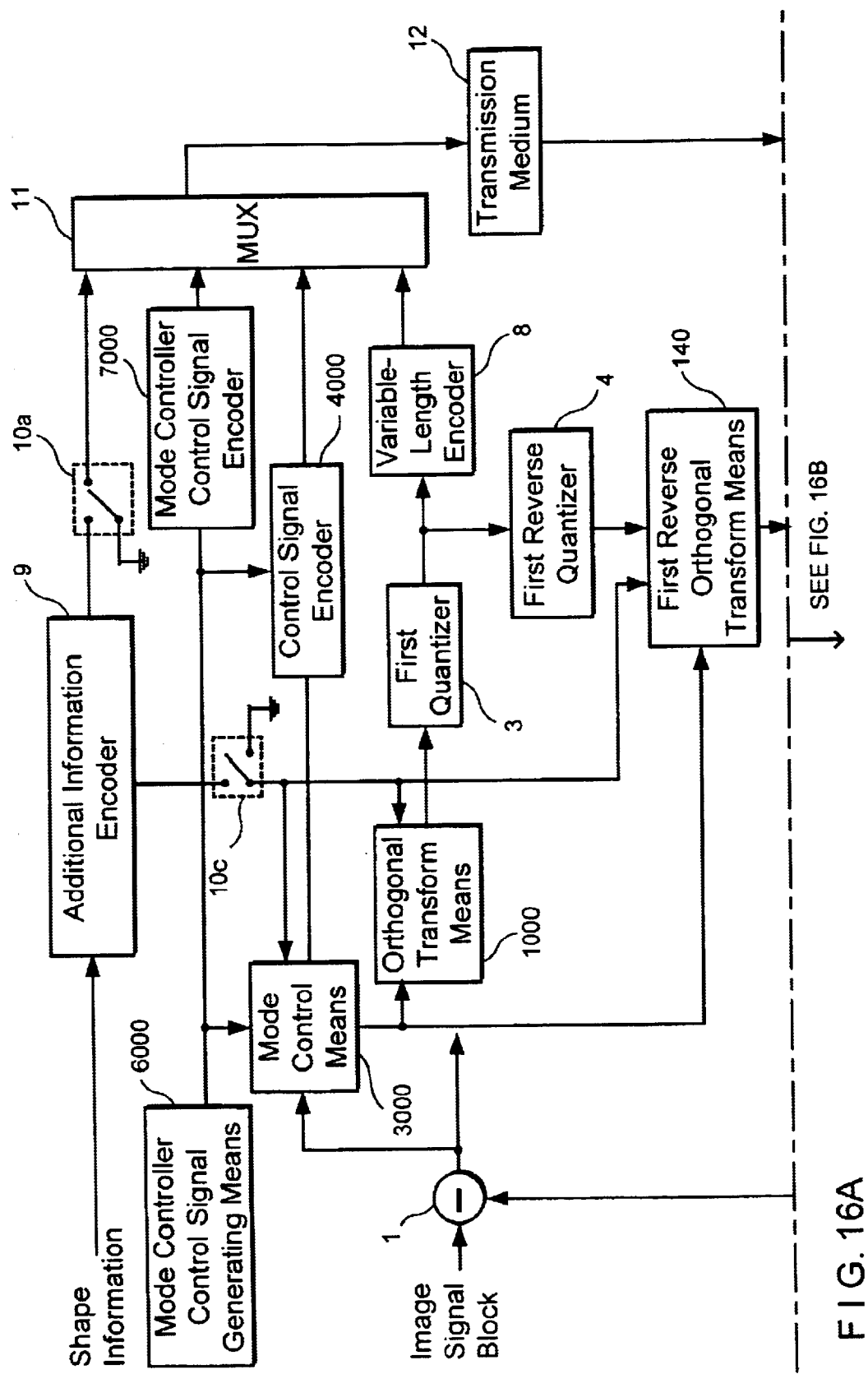
FIG. 16 is a block diagram illustrating an image compression-encoding and decoding system using an adaptive transform scheme in accordance with a third embodiment of the present invention
Figure 16B:
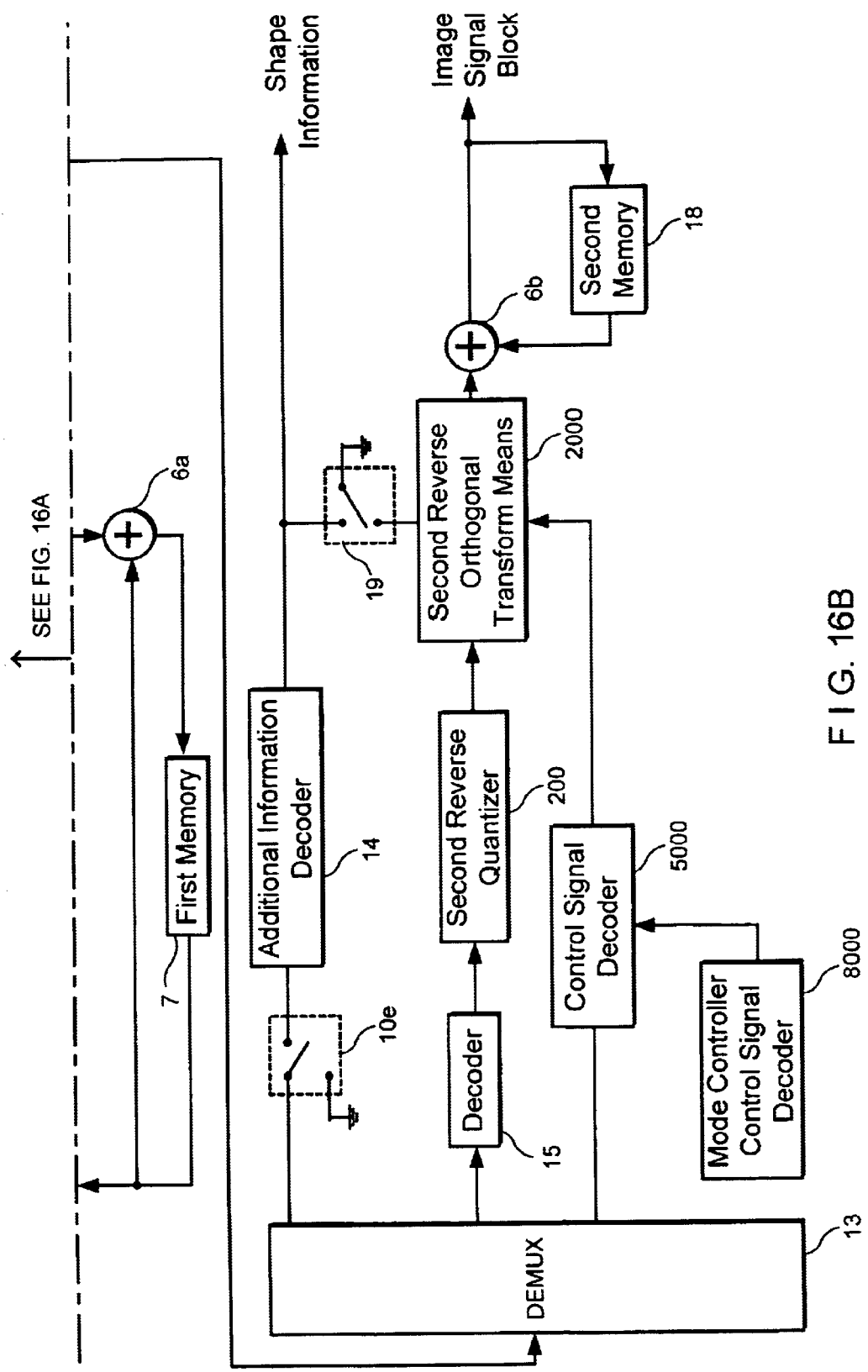

FIG. 16 is a block diagram illustrating an image compression-encoding and decoding system using an adaptive transform scheme in accordance with a third embodiment of the present invention adapted to limit the use of the mode controller as mentioned above.

The system of the third embodiment is configured by adding a mode controller control signal generating means 6000, a mode controller control signal encoder 7000, and a mode controller control signal decoder 8000 to the encoding and decoding configuration of FIG. 12.

The mode controller control signal generating means 6000 serves to generate a mode controller control signal for controlling respective ON/OFF operations of the mode control means 300, control signal encoder 4000, and control signal decoder 500 in accordance with whether or not the transform direction control signal is used in the orthogonal transform means 1000 and the first and second inverse orthogonal transform means 140.

The ON/OFF operations of the mode control means 300, control signal encoder 4000, and control signal decoder 500 are controlled in the same fashion by the mode controller control signal generated from the mode controller control signal generating means 6000.

The mode controller control signal encoder 4000 receives the mode controller control signal from the mode controller control signal generating means 6000, and encodes the received signal. The encoded signal from the mode controller control signal encoder 4000 is applied to the multiplexer 11 so that it is multiplexed with other signals.

The mode controller control signal decoder 8000 receives the encoded mode controller control signal via the multiplexer 11, transmission medium 12 and demultiplexer 13, and decodes it. The decoded mode controller control signal is used to control the operation of the control signal decoder 5000.

Encoding and decoding methods of the present invention, which are conducted using the above mentioned image compression-encoding and decoding system of FIG. 16, will now be described.

The operation of this system is determined depending on whether or not the orthogonal transform means 1000 and the first and second inverse orthogonal transform means 140 and 200 use a transform direction control signal.

The mode controller control signal, which is information about whether or not the transform direction control signal is used for setting of a transform direction, contains information about whether or not the transform direction control signal is used for setting of a transform direction at the starting position of a macro block, the starting position of a frame, the starting position of a scene, or the starting position of a video image. Although transmission of the mode controller control signal causes an increase in the amount of code, the increased amount of code can be negligible because it is very little, as compared to the entire amount of code.

Where such a transform direction control signal is used, the mode controller control signal generating means 6000 outputs a mode controller control signal corresponding to the transform direction control signal. In response to the mode controller control signal, both the mode control means 3000 and control signal encoder 4000 operate. In this case, the mode controller control signal encoder 7000 encodes the mode controller control signal. The encoded mode controller control signal from the mode controller control signal encoder 7000 is applied to the mode controller control signal decoder 8000 via the multiplexer 11, transmission medium 12, and demultiplexer 13. The mode controller control signal decoder 8000 decodes the received control signal. The decoded mode controller control signal serves to operate the control signal decoder 5000.

The subsequent encoding and decoding procedures are carried out in the same fashion as those of the encoding and decoding methods using the system of FIG. 12.

Where no transform direction control signal is used, the mode controller control signal generating means 6000 outputs a mode controller control signal corresponding to the transform direction control signal. In response to the mode controller control signal, both the mode control means 3000 and control signal encoder 4000 stop their operations. In this case, the mode controller control signal encoder 7000 encodes the mode controller control signal. The encoded mode controller control signal from the mode controller control signal encoder 7000 is applied to the mode controller control signal decoder 8000 via the multiplexer 11, transmission medium 12, and demultiplexer 13. The mode controller control signal decoder 8000 decodes the received control signal. The decoded mode controller control signal serves to stop the operation of the control signal decoder 5000.

Where no transform direction control signal is used, the orthogonal transform means 1000 performs an orthogonal transform procedure set for this case. The set orthogonal transform procedure is an orthogonal transform procedure for performing an orthogonal transform in a horizontal direction and then in a vertical direction or an orthogonal transform procedure for performing an orthogonal transform in a vertical direction and then in a horizontal direction. In this case, the inverse orthogonal transform means performs a inverse transform procedure inverse to that of the orthogonal transform means 1000. For example, where the orthogonal transform means 1000 performs an orthogonal transform for an input residual signal block in a vertical direction and then in a horizontal direction in response to no use of the transform direction control signal, the inverse orthogonal transform means a inverse orthogonal transform for an input inverse-quantized transform coefficient block in a horizontal direction and then in a vertical direction.

The second inverse orthogonal transform means 200, which receives a inverse-quantized transform coefficient block from the second inverse quantizer 200, conducts a inverse orthogonal transform for the received block in a transform direction inverse to that of the orthogonal transform means 1000. The subsequent procedures are the same as those of the decoding method using the system of FIG. 12.

On the other hand, the mode controller may be configured using a variety of methods other than those illustrated in association with the above mentioned embodiments. These methods may include a method using a variation in mean value among blocks arranged around a current block, along with the current block, a method using a variation in values respectively obtained by scanning a block, to be encoded, in horizontal and vertical directions, and a method using values of a part of a block to be encoded, that is, the peripheral portion or central portion of the block, to determine a transform mode.

The transform method to be used can be very flexibly determined in accordance with a transform direction control signal additionally transmitted.

By virtue of the transmitted transform direction control signal, the determination of a transform method to be used can be achieved only in the encoder. In this case, the decoder only performs a change of transform method, based on the control signal transmitted thereto. Accordingly, there is no increase in the complexity of the decoder.

As apparent from the above description, the present invention provides an image compression-coding and decoding system and method using an adaptive transform in which an orthogonal transform and a inverse orthogonal transform for blocks are controlled, based on a determination made about whether signals within a block, to be currently encoded, have a higher correlation in a vertical direction or in a horizontal direction, using information about blocks encoded or both information about blocks encoded and information about the current block. In accordance with the present invention, the orthogonal transform is conducted in a direction associated with a higher correlation and then in a direction associated with a lower correlation. The inverse orthogonal transform is conducted in the order inverse to that of the orthogonal transform. Accordingly, the present invention provides an enhancement in compression coding efficiency.

The method, in which the transform direction for the block to be currently encoded is determined using the current block, is advantageous in that it not only provides a further enhanced compression coding efficiency, but also provides an editability for bit streams of code, as compared to the method in which the transform direction for the current block is determined using the blocks already encoded. The editability for bit streams of code is an ability to easily vary properties of an image such as texture or color in accordance with a manipulation for bit streams of code.

In other words, this ability is to replace the bit stream of a portion of an image, to be varied in properties, with a new bit stream reflecting the varied properties while still using bit streams produced by virtue of an encoding procedure conducted for the remaining image portion. In the case of a method in which no information about transform direction is transmitted, the information about the image portions already encoded should be always used to the image portion to be currently encoded. For this reason, each of bit streams produced is not independent, but always has a relation with the bit stream spatially previous thereto. As a result, there is a problem in that when an optional portion of an image is varied in properties, it is necessary to produce again the bit streams of all signals spatially following the image portion varied in properties. However, where information about transform direction is additionally transmitted, as in the present invention, it is possible to independently produce respective bit streams of the signal to be encoded and the signals already encoded. Accordingly, where a portion of an image is varied in properties, it is only necessary to encode again the bit stream associated with the image portion varied in properties, and to replace the bit streams, positioned at the same position as the encoded bit stream, with the encoded bit stream.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image compression-encoding apparatus for performing an orthogonal transform for blocks of an input image signal in accordance with an adaptive transform method, thereby compressing the input image signal blocks, comprising:

transform mode control means for generating a transform direction control signal to perform an orthogonal transform after said transform mode control means selectively receives transform coefficients, obtained after an orthogonal transform for blocks of an input image signal, and an image signal block to be currently encoded, determining correlations of the input values in horizontal and vertical directions, and generating a transform direction control signal based on the determined correlations, the transform direction control signal being adapted to control an orthogonal transform for the current image signal block in such a fashion that the current image signal block is orthogonal-transformed in a direction involving a higher correlation, and then in a inverse direction; and orthogonal transform means for receiving the transform direction control signal from the transform mode control means, and performing an orthogonal transform based on the received transform direction control signal.

2. The image compression-encoding apparatus according to claim 1, wherein the transform mode control means comprises:

a memory for storing the transform coefficients obtained after the orthogonal transform; and a mode controller for receiving the transform coefficients from the memory while selectively receiving the image signal block to be currently encoded, thereby outputting a transform direction control signal adapted to control the transform direction order of the orthogonal transform means, the transform direction control signal outputted from the mode controller corresponding to the transform direction control signal outputted from the transform mode control means.

3. The image compression-encoding apparatus according to claim 2, wherein the mode controller is adapted to derive respective mean values of transform coefficient blocks already orthogonal-transformed and arranged around the image signal block, to be currently encoded, deriving a variation among the mean values in a vertical direction and a variation among the mean values in a horizontal direction, comparing absolute values of the derived mean value variations with each other, and outputting a value associated with a transform direction involving the lesser one of the absolute values, thereby allowing the current image signal block to be orthogonal-transformed in the transform direction involving the lesser absolute value and then in a inverse transform direction.

4. The image compression-encoding apparatus according to claim 2, wherein the mode controller is adapted to derive respective mean values of the image signal block, to be current encoded, and the transform coefficient blocks already orthogonal-transformed and arranged around the current image signal block, sorting absolute values of the mean values into those of a horizontal direction and those of a vertical direction, summing the absolute values associated with each of the horizontal and vertical directions, thereby deriving two absolute value sums, comparing the sums with each other, and outputting a value associated with a transform direction involving the lesser one of the sums, thereby allowing the current image signal block to be orthogonal-transformed in the transform direction involving the lesser sum and then in a inverse transform direction.

5. The image compression-encoding apparatus according to claim 1, wherein the orthogonal transform means comprises:

a first orthogonal transform unit for receiving the image signal block, to be encoded, while selectively receiving shape information, and performing an orthogonal transform for the image signal block, to be encoded, in a vertical direction and then in a horizontal direction;

a second orthogonal transform unit for receiving the image signal block, to be encoded, while selectively receiving the shape information, and performing an orthogonal transform for the image signal block, to be encoded, in a horizontal direction and then in a vertical direction;

a first switch for receiving the transform direction control signal from the transform mode control means, and conducting a switching operation in response to the transform direction control signal, thereby selectively coupling the image signal block, to be encoded, to the first orthogonal transform unit or the second orthogonal transform unit; and a second switch for receiving the transform direction control signal from the transform mode control means, and conducting a switching operation in response to the transform direction control signal, thereby selectively outputting a transform coefficient from the first orthogonal transform unit or from the second orthogonal transform unit.

6. An image compression-encoding apparatus for performing an orthogonal transform for blocks of an input image signal in accordance with an adaptive transform method, thereby compressing the input image signal blocks, comprising:

transform mode control means for receiving a recovered image signal block while selectively receiving an image signal block to be currently encoded and selectively receiving shape information associated with the image signal blocks, determining correlations of the input values in horizontal and vertical directions, and generating a transform direction control signal based on the determined correlations, the transform direction control signal being adapted to control an orthogonal transform for the current image signal block in such a fashion that the current image signal block is orthogonal-transformed in a direction involving a higher correlation, and then in a inverse direction; and orthogonal transform means for receiving the transform direction control signal from the transform mode control means, and performing an orthogonal transform based on the received transform direction control signal.

7. An image compression-encoding apparatus using an adaptive transform method comprising:

a subtractor for conducting a subtraction between an input image signal block, to be encoded, and an image signal block, previously recovered, thereby outputting an residual signal block;

an overhead information encoder for outputting shape information to be used in an encoding procedure;

transform mode control means for receiving a quantized transform coefficient while selectively receiving the residual signal block from the subtractor, thereby outputting an associated transform direction control signal;

orthogonal transform means for receiving the residual signal block from the subtractor while selectively receiving the shape information from the overhead information encoder, and performing an orthogonal transform for the residual signal block while being controlled in transform direction by the transform mode control means, thereby outputting a transform coefficient;

a quantizer for receiving the transform coefficient from the orthogonal transform means, quantizing the received transform coefficient, and outputting the quantized transform coefficient to the transform mode control means and other elements of the apparatus;

a variable-length encoder for receiving the quantized transform coefficient from the quantizer, and transforming the received quantized transform coefficient into a variable-length-coded signal; and a multiplexer for receiving the variable-length-coded signal from the variable-length encoder while selectively receiving the shape information from the overhead information encoder, multiplexing the received signals together, and transmitting the resultant signal to a transmission medium.

8. The image compression-encoding apparatus according to claim 7, further comprising:

a inverse quantizer for receiving the quantized transform coefficient from the quantizer, and conducting a inverse quantization for the received block;

a inverse orthogonal transform unit for receiving a inverse-quantized transform coefficient block from the first inverse quantizer while selectively receiving the shape information from the overhead information encoder, and transforming the received block into a inverse-orthogonal-transformed signal block;

an adder for adding the previously recovered image signal block to the inverse-orthogonal-transformed signal block outputted from the inverse orthogonal transform unit, thereby recovering the input image signal block; and a memory for receiving the recovered image signal block outputted from the adder, and outputting it to the subtractor.

9. The image compression-encoding apparatus according to claim 7, further comprising:
a switch coupled between the subtractor and the mode controller and adapted to selectively couple the residual signal block outputted from the subtractor to the transform mode control means.

10. The image compression-encoding apparatus according to claim 7, further comprising:
a switch coupled between the overhead information encoder and the orthogonal transform means and between the overhead information encoder and the inverse orthogonal transform means and adapted to selectively couple the shape information outputted from the overhead information encoder to both the orthogonal transform means and the inverse orthogonal transform means.

11. The image compression-encoding apparatus according to claim 8, wherein the inverse orthogonal transform means comprises:
a first inverse orthogonal transform unit for receiving the inverse-quantized transform coefficient block from the inverse quantizer while selectively receiving the shape information from the overhead information encoder, the first inverse orthogonal transform unit performing a inverse orthogonal transform for the inverse-quantized transform coefficient block in a vertical direction and then in a horizontal direction;
a second inverse orthogonal transform unit for receiving the inverse-quantized transform coefficient block from the inverse quantizer while selectively receiving the shape information from the overhead information encoder, the second inverse orthogonal transform unit performing a inverse orthogonal transform the received inverse-quantized transform coefficient block in a horizontal direction and then in a vertical direction;
a first switch for receiving the transform direction control signal received from the transform mode control means, and conducting a switching operation based on the received transform direction control signal, thereby selectively coupling the inverse-quantized transform coefficient block outputted from the first inverse quantizer to the first inverse orthogonal transform unit or the second inverse orthogonal transform unit; and
a second switch for receiving the transform direction control signal received from the transform mode control means, and conducting a switching operation based on the transform direction control signal, thereby selectively outputting the inverse transform coefficient block generated from the first inverse orthogonal transform unit or the inverse transform coefficient block generated from the second inverse orthogonal transform unit.

12. The image compression-encoding apparatus according to claim 8, wherein the inverse orthogonal transform means comprises:
a pre-processor for receiving the transform direction control signal from the transform mode control means, the pre-processor being controlled, based on the received transform direction control signal, to be switched between ON and OFF modes in such a fashion that it receives the inverse-quantized transform coefficient block from the inverse quantizer in the ON mode, and rotates the received block by 180° with respect to an axis connecting the left upper corner and right lower corner of the block to each other;
a inverse orthogonal transform unit for receiving the 180°-rotated, inverse-quantized transform coefficient block outputted from the pre-processor while selectively receiving the shape information from the overhead information encoder, the inverse orthogonal transform unit performing a inverse orthogonal transform for the received transform coefficient block in vertical and horizontal directions, in this order, and then in horizontal and vertical directions, in this order; and
a post-processor for receiving the transform direction control signal from the transform mode control means, the post processor being controlled, based on the received transform direction control signal, to be switched between ON and OFF modes in such a fashion that it receives the inverse-orthogonal-transformed transform coefficient block from the inverse orthogonal transform unit in the ON mode, and rotates the received block in a clockwise direction by 90°.

13. An image compression-decoding apparatus for decoding a compression-encoded image signal transmitted thereto comprising:
inverse transform mode control means for selectively receiving a signal block currently processed by a variable length decoding procedure after being transmitted while receiving a signal block previously variable-length-decoded, determining correlations of the received blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction;
inverse orthogonal transform means for receiving the inverse transform direction control signal from the inverse transform mode control means, and performing a inverse orthogonal transform for the currently-variable-length-decoded signal block based on the received inverse transform direction control signal; and
said inverse transform mode control means comprises:
a memory for storing the currently-variable-length-decoded signal block therein; and
a mode controller for receiving the previously-variable-length-decoded signal block from the memory while selectively receiving the currently-variable-length-decoded signal block, thereby outputting an inverse transform direction control signal adapted to control an inverse orthogonal transform mode of the inverse orthogonal transform means the inverse transform direction control signal outputted from the mode controller corresponding to the inverse transform direction control signal outputted from the inverse transform mode control means.

14. The image compression-decoding apparatus according to claim 13, wherein the mode controller is adapted to derive respective mean values of signal blocks already variable-length-decoded and arranged around the currently-variable-length-decoded signal block, deriving a variation among the mean values in a vertical direction and a variation among the mean values in a horizontal direction, comparing absolute values of the derived mean value variations with each other, and outputting the inverse orthogonal transform direction control signal to control the inverse orthogonal transform for currently-variable-length-decoded signal block in such a fashion that the currently-variable-length-decoded signal block is inverse-orthogonal-transformed in a transform direction involving the greater one of the absolute values and then in an inverse transform direction.

15. The image compression-decoding apparatus according to claim 13, wherein the mode controller is adapted to derive respective mean values of the currently-variable-length-decoded signal block and the signal blocks previously variable-length-decoded and arranged around the current signal block, sorting absolute values of the mean values into those of a horizontal direction and those of a vertical direction, summing the absolute values associated with each of the horizontal and vertical directions, thereby deriving two absolute value sums, comparing the sums with each other, and outputting the inverse transform direction control signal to control the inverse orthogonal transform for the current signal block in such a fashion that the current signal block is inverse-orthogonal-transformed in a transform direction involving the greater one of the sums and then in an inverse transform direction.

16. An image compression-decoding apparatus using an adaptive transform method comprising:
    a demultiplexer for demultiplexing an input encoded signal received from an encoding unit, thereby outputting an encoded image signal block and encoded shape information;
    a decoder for receiving the encoded image signal block from the decoder, and variable-length-decoding the received image signal block;
    a inverse quantizer for receiving the variable-length-decoded signal block from the decoder, and inverse-quantizing the received signal block;
    an overhead information decoder for selectively receiving the encoded shape information from the demultiplexer, and recovering original shape information from the received shape information;
    inverse transform mode control means for selectively receiving a current variable-length-decoded signal block from the decoder while receiving a previous variable-length-decoded signal block, determining correlations of the received signal blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction;
    inverse orthogonal transform means for receiving the inverse-quantized signal from the inverse quantized while selectively receiving the recovered shape information from the overhead information decoder, and performing a inverse orthogonal transform for the inverse-quantized signal block under a control of the inverse transform mode control means;
    an adder for receiving the inverse-orthogonal-transformed signal block from the inverse orthogonal transform means while receiving an image signal block previously recovered, and adding the received signal blocks, thereby outputting a recovered image signal block; and
    a memory for storing the recovered image signal block outputted from the adder, and outputting the stored imaged signal block to the adder for an prediction.

17. The image compression-decoding apparatus according to claim 16, further comprising:
    a switch coupled between the overhead information decoder and the inverse orthogonal transform means and adapted to conduct a switching operation for selectively coupling the shape information from the overhead information decoder to the inverse orthogonal transform means.

18. The image compression-decoding apparatus according to claim 16, further comprising:
    a switch coupled between the decoder and the inverse transform mode control means and adapted to conduct a switching operation for selectively coupling the variable-length-decoded signal from the decoder to the inverse transform mode control means.

19. An image compression-encoding and decoding system using an adaptive transform method comprising:
    an encoding unit comprising
        a subtractor for conducting a subtraction between an input image signal block, to be encoded, and a image signal block, previously recovered, thereby outputting an residual signal block,
        an overhead information encoder for outputting shape information to be used in an encoding procedure, along with a variable-length-encoded shape information signal;
        mode control means for receiving the residual signal block, to be encoded, from the subtractor while receiving the shape information signal from the overhead information encoder, thereby outputting an associated transform direction control signal,
        orthogonal transform means for receiving the residual signal block from the subtractor while selectively receiving the variable-length-encoded shape information from the overhead information encoder, and performing an orthogonal transform for the residual signal block while being controlled in transform direction by the mode control means, thereby outputting a transform coefficient,
        a quantizer for receiving the transform coefficient from the orthogonal transform means, and quantizing the received transform coefficient, thereby outputting a quantized transform coefficient,
        a variable-length encoder for receiving the quantized transform coefficient from the quantizer, and transforming the received transform coefficient into a variable-length-coded signal,
        a control signal encoder for receiving the transform direction control signal from the mode control means, and encoding the received transform direction control signal, and
        a multiplexer for receiving the variable-length-coded signal from the variable-length encoder and the transform direction control signal from the control signal encoder while selectively receiving the shape information from the overhead information encoder, multiplexing the received signals together, and transmitting the resultant signal to a transmission medium; and
    a decoding unit comprising
        a demultiplexer for demultiplexing the signal received from the encoding unit via the transmission medium, thereby outputting the variable-length-coded shape information, the variable-length-coded quantized transform coefficient block, and the encoded transform direction control signal,
        an overhead information decoder for selectively receiving the encoded shape information from the demultiplexer, and recovering original shape information from the received shape information,
        a decoder for receiving the variable-length-encoded quantized transform coefficient from the decoder, and variable-length-decoding the received transform coefficient, thereby outputting a variable-length-decoded quantized transform coefficient block, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, first adder for receiving the inverse-orthogonal-transformed signal block from the inverse orthogonal transform means while receiving an image signal block previously recovered, and adding the received signal blocks, thereby outputting a recovered image signal block, and a first memory for storing the recovered image signal block outputted from the first adder, and outputting the stored imaged signal block to the adder for an prediction.

20. The image compression-encoding and decoding system according to claim 19, further comprising:

a second inverse quantizer for receiving the quantized transform coefficient from the quantizer, and inverse-quantizing the received transform coefficient, thereby outputting a inverse-quantized transform coefficient;

a second inverse orthogonal transform means for receiving the inverse-quantized transform coefficient from the second inverse quantizer while selectively receiving the shape information from the overhead information encoder, and performing a inverse orthogonal transform for the inverse-quantized transform coefficient block in a direction inverse to that of the orthogonal transform means while being controlled in transform direction by the mode control means, thereby outputting a transform coefficient;

a second adder for receiving the inverse-orthogonal-transformed signal block from the second inverse orthogonal transform means while receiving the previously recovered image signal block, and adding the input blocks to each other, thereby recovering the original image signal block; and a second memory for receiving the recovered image signal block from the second adder, and outputting the received image signal block to the subtractor.

21. An image compression-encoding and decoding system using an adaptive transform method comprising:

an encoding unit comprising a subtractor for conducting a subtraction between an input image signal block, to be encoded, and a image signal block, previously recovered, thereby outputting an residual signal block, an overhead information encoder for outputting shape information to be used in an encoding procedure, along with a variable-length-encoded shape information signal;

mode control means for receiving the residual signal block, to be encoded, from the subtractor while receiving the shape information signal from the overhead information encoder, thereby outputting an associated transform direction control signal, orthogonal transform means for receiving the residual signal block from the subtractor while selectively receiving the shape information from the overhead information encoder, and performing an orthogonal transform for the residual signal block while being controlled in transform direction by the mode control means, thereby outputting a transform coefficient, a quantizer for receiving the transform coefficient from the orthogonal transform means, and quantizing the received transform coefficient, thereby outputting a quantized transform coefficient, a variable-length encoder for receiving the quantized transform coefficient from the quantizer, and transforming the received transform coefficient into a variable-length-coded signal, a control signal encoder for receiving the transform direction control signal from the mode control means, and encoding the received transform direction control signal, mode controller control signal generating means adapted to generate a mode controller control signal for controlling respective ON/OFF operations of the mode control means and the control signal encoder in accordance with whether or not the transform direction control signal is used in the orthogonal transform or inverse orthogonal transform, a mode controller control signal encoder for receiving the mode controller control signal from the mode controller control signal generating means, and encoding the received signal, and a multiplexer for receiving the variable-length-coded signal from the variable-length encoder, the encoded transform direction control signal from the control signal encoder, and the encoded mode controller control signal from the mode controller control signal encoder while selectively receiving the shape information from the overhead information encoder, multiplexing the received signals together, and transmitting the resultant signal to a transmission medium; and a decoding unit comprising a demultiplexer for demultiplexing the signal received from the encoding unit via the transmission medium, thereby outputting the variable-length-coded shape information, the variable-length-coded quantized transform coefficient, the variable-length-encoded transform direction control signal, and the encoded mode controller control signal, an overhead information decoder for selectively receiving the encoded shape information from the demultiplexer, and recovering original shape information from the received shape information, a decoder for receiving the variable-length-encoded quantized transform coefficient from the decoder, and variable-length-decoding the received transform coefficient, thereby outputting a variable-length-decoded quantized transform coefficient block, control signal decoder for receiving the variable-length-encoded transform direction control signal from the demultiplexer, and decoding the received transform direction control signal, mode controller control signal decoder for receiving the encoded mode controller control signal from the demultiplexer, and decoding the received control signal, thereby controlling an ON/OFF mode of the control signal decoder, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, an adder for receiving the inverse-orthogonal-transformed signal block from the inverse orthogonal transform means while receiving an image signal block previously recovered, and adding the received signal blocks, thereby outputting a recovered image signal block, and a memory for storing the recovered image signal block outputted from the adder, and outputting the stored imaged signal block to the adder for an prediction.

22. The image compression-encoding and decoding system according to claim 21, wherein the mode control means, the control signal encoder, and the control signal decoder are controlled in their ON/OFF modes based on the mode controller control signal outputted from the mode controller control signal generating means while operating in the same mode.

23. The image compression-encoding and decoding system according to claim 21, wherein:

the orthogonal transform means conducts an orthogonal transform for the input signal in horizontal and vertical directions, in this order, or vertical and horizontal directions, in this order; and the first and second inverse orthogonal transform means conduct a inverse orthogonal transform for the input signal in the order inverse to that of the orthogonal transform means, respectively.

24. An image compression-encoding method for performing an orthogonal transform for blocks of an input image signal in accordance with an adaptive transform method, thereby compressing the input image signal blocks, comprising:

a transform direction control signal generating step for generating a transform direction control signal to perform an orthogonal transform after said transform directional control signal selectively receives transform coefficients, obtained after an orthogonal transform for blocks of an input image signal, and an image signal block to be currently encoded, determining correlations of the input values in horizontal and vertical directions, and generating, based on the determined correlations, a transform direction control signal adapted to control an orthogonal transform for the current image signal block in such a fashion that the current image signal block is orthogonal-transformed in a direction involving a higher correlation, and then in an inverse direction; and an orthogonal-transforming step for receiving the transform direction control signal, and performing an orthogonal transform, in a sequential fashion, based on the received transform direction control signal.

25. The image compression-encoding method according to claim 24, wherein the transform direction control signal generating step comprises the steps of:

deriving respective mean values of transform coefficient blocks already encoded and arranged around the image signal block, to be currently encoded;

deriving a variation among the mean values in a vertical direction and a variation among the mean values in a horizontal direction;

comparing absolute values of the derived mean value variations with each other; and outputting a transform direction control signal adapted to control the orthogonal transform in such a fashion that the orthogonal transform is conducted in a direction involving the lesser one of the absolute values and then in a inverse direction.

26. The image compression-encoding method according to claim 24, wherein the transform direction control signal generating step comprises the steps of:

deriving respective mean values of the image signal block, to be current encoded, and transform coefficient blocks already encoded and arranged around the current image signal block;

deriving variations among associated ones of the mean values in a vertical direction and variations among associated ones of the mean values in a horizontal direction;

deriving absolute values of the derived variations, sorting the absolute values into those of a horizontal direction and those of a vertical direction, and summing the absolute values associated with each of the horizontal and vertical directions, thereby deriving two absolute value sums;

comparing the derived sums with each other; and outputting a transform direction control signal adapted to control the orthogonal transform in such a fashion that the orthogonal transform is conducted in a direction involving the lesser one of the sums and then in a inverse direction.

27. An image compression-decoding apparatus for decoding a compression-encoded image signal transmitted thereto comprising:

inverse transform mode control means for selectively receiving a signal block currently processed by a variable length decoding procedure after being transmitted while receiving a signal block previously variable-length-decoded, determining correlations of the received blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction;

inverse orthogonal transform means for receiving the inverse transform direction control signal from the inverse transform mode control means, and performing a inverse orthogonal transform for the currently-variable-length-decoded signal block based on the received inverse transform direction control signal;

said inverse orthogonal transform means comprises:

a first inverse orthogonal transform unit for receiving a variable-length-decoded image signal block while selectively receiving shape information, and performing an inverse orthogonal transform for the variable-length-decoded signal block in a vertical direction and then in a horizontal direction;

a second inverse orthogonal transform unit for receiving the variable-length-decoded signal block while selectively receiving the shape information, and performing an inverse orthogonal transform for the variable-length-decoded signal block in a horizontal direction and then in a vertical direction;

a first switch for receiving the inverse transform direction control signal from the inverse transform mode control means, and conducting a switching operation in response to the inverse transform direction control signal, thereby selectively coupling the variable-length-decoded signal block to the first inverse orthogonal transform unit or the second inverse orthogonal transform unit; and a second switch for receiving the inverse transform direction control signal from the inverse transform mode control means, and conducting a switching operation in response to the inverse transform direction control signal, thereby selectively outputting an inverse-orthogonal-transformed signal block from the first inverse orthogonal transform unit or from the second inverse orthogonal transform unit.

28. An image compression-decoding apparatus for decoding a compression-encoded image signal transmitted thereto comprising:

inverse transform mode control means for selectively receiving a signal block currently processed by a variable length decoding procedure after being transmitted while receiving a signal block previously variable-length-decoded, determining correlations of the received blocks in horizontal and vertical directions, and generating a inverse transform direction control signal based on the determined correlations, the inverse transform direction control signal being adapted to control a inverse orthogonal transform for the current signal block in such a fashion that the current signal block is inverse-orthogonal-transformed in a direction involving a lower correlation, and then in a inverse direction;

inverse orthogonal transform means for receiving the inverse transform direction control signal from the inverse transform mode control means, and performing a inverse orthogonal transform for the currently-variable-length-decoded signal block based on the received inverse transform direction control signal;

said inverse orthogonal transform means comprises:

a pre-processor for receiving the inverse transform direction control signal from the inverse transform mode control means, the pre-processor being controlled, based on the inverse transform direction control signal, to be switched between ON and OFF modes in such a fashion that it receives the variable-length-decoded signal block in the ON mode, and rotates the received signal block by 180° with respect to an axis connecting left upper and right lower corners of the block to each other;

an inverse orthogonal transform unit for receiving the 180°-rotated signal block from the pre-processor while selectively receiving shape information, the inverse orthogonal transform unit performing a inverse orthogonal transform for the received signal block in vertical and horizontal directions, in this order, and then in horizontal and vertical directions, in this order; and a post-processor for receiving the inverse transform direction control signal from the inverse transform mode control means, the pre-processor being controlled, based on the inverse transform direction control signal, to be switched between ON and OFF modes in such a fashion that it receives the inverse-orthogonal-transformed signal block from the inverse orthogonal transform unit in the ON mode, and rotates the received inverse-orthogonal-transformed signal block in a clockwise direction by 90°.

29. An image compression-encoding method for decoding a compression-encoded image signal, transmitted, using an adaptive transform method comprising:

an inverse transform direction control signal generating step for selectively receiving a signal block, currently variable-length-encoded, and signal blocks already encoded, determining correlations of the received blocks in horizontal and vertical directions, and generating, based on the determined correlations, an inverse transform direction control signal adapted to control a inverse orthogonal transform for the current signal block in such a fashion that the current signal block is inverse-orthogonal-transformed in a direction involving a lower correlation, and then in a inverse direction;

an inverse-orthogonal-transforming step for receiving the inverse transform direction control signal, and performing an inverse orthogonal transform, in a sequential fashion, based on the received inverse transform direction control signal;

said transform direction control signal generating step comprises the steps of:

deriving respective mean values of transform coefficient blocks already variable-length-decoded and arranged around the image signal block currently variable-length-decoded;

deriving a variation among the mean values in a vertical direction and a variation among the mean values in a horizontal direction;

comparing absolute values of the derived mean value variations with each other; and outputting a inverse transform direction control signal adapted to control the inverse orthogonal transform in such a fashion that the inverse orthogonal transform is conducted in a direction involving the greater one of the absolute values and then in an inverse direction.

30. An image compression-encoding method for decoding a compression-encoded image signal, transmitted, using an adaptive transform method comprising:

an inverse transform direction control signal generating step for selectively receiving a signal block, currently variable-length-encoded, and signal blocks already encoded, determining correlations of the received blocks in horizontal and vertical directions, and generating, based on the determined correlations, an inverse transform direction control signal adapted to control an inverse orthogonal transform for the current signal block in such a fashion that the current signal block is inverse-orthogonal-transformed in a direction involving a lower correlation, and then in a inverse direction;

an inverse-orthogonal-transforming step for receiving the inverse transform direction control signal, and performing an inverse orthogonal transform, in a sequential fashion, based on the received inverse transform direction control signal;

said inverse transform direction control signal generating step comprises the steps of:

deriving respective mean values of the currently-variable-length-decoded signal block and the signal blocks already variable-length-decoded and arranged around the current signal block;

deriving variations among associated ones of the mean values in a vertical direction and variations among associated ones of the mean values in a horizontal direction;

deriving absolute values of the derived variations, sorting the absolute values into those of a horizontal direction and those of a vertical direction, and summing the absolute values associated with each of the horizontal and vertical directions, thereby deriving two absolute value sums;

comparing the derived sums with each other; and outputting an inverse transform direction control signal adapted to control the inverse orthogonal transform in such a fashion that the inverse orthogonal transform is conducted in a direction involving the greater one of the sums and then in an inverse direction.

31. An image compression-encoding method for decoding a compression-encoded image signal, transmitted, using an adaptive transform method comprising:

an inverse transform direction control signal generating step for selectively receiving a signal block, currently variable-length-encoded, and signal blocks already encoded, determining correlations of the received blocks in horizontal and vertical directions, and generating, based on the determined correlations, an inverse transform direction control signal adapted to control an inverse orthogonal transform for the current signal block in such a fashion that the current signal block is inverse-orthogonal-transformed in a direction involving a lower correlation, and then in an inverse direction;

an inverse-orthogonal-transforming step for receiving the inverse transform direction control signal, and performing an inverse orthogonal transform, in a sequential fashion, based on the received inverse transform direction control signal;

said inverse-orthogonal-transforming step is controlled by the inverse transform direction control signal outputted from the inverse transform direction control signal generating step in such a fashion that:

when the inverse transform direction control signal contains mode information for controlling an inverse orthogonal transform to be conducted in vertical and horizontal directions, in this order, the inverse orthogonal transform is conducted in a vertical direction and then in a horizontal direction; and when the inverse transform direction control signal contains mode information for controlling an inverse orthogonal transform to be conducted in horizontal and directions, in this order, the inverse orthogonal transform is conducted by rotating the input encoded signal block by 180° with respect to an axis connecting the left upper corner and right lower corner of the block to each other, inverse-orthogonal-transforming the rotated image signal block in a horizontal direction and then in a vertical direction, and rotating the inverse-orthogonal-transformed signal block in a clockwise direction by 90°.

32. An image compression-encoding and decoding method for encoding and decoding input image signal blocks, comprising:

a transform direction control signal generating step for generating a transform direction control signal adapted to determine respective direction orders of an orthogonal transform and an inverse orthogonal transform, based on an image signal block, to be encoded, and shape information;

an encoding step for encoding the transform direction control signal generated at the transform direction control signal generating step while orthogonal-transforming the image signal block, to be encoded, based on the transform direction control signal, quantizing the orthogonal-transformed signal, and variable-length-encoding the quantized signal;

a transmitting step for multiplexing the encoded transform direction control signal and the variable-length-encoded signal block, and transmitting the resultant signal;

a signal separating step for receiving the encoded signal transmitted at the transmitting step, and demultiplexing the received signal into the encoded transform direction control signal and the variable-length-encoded image signal block;

decoding the encoded transform direction control signal separated at the signal separating step, variable-length-decoding the variable-length-encoded image signal block, and inverse-quantizing the decoded image signal block;

a signal recovering step for inverse-orthogonal-transforming the inverse-quantized signal block in a state in which the inverse orthogonal transform is determined in direction order, based on the decoded transform direction control signal, and recovering the inverse-orthogonal-transformed signal block into the initially inputted image signal block, based on an image signal block previously recovered.

said transform direction control signal generating step comprising:

a subtraction step for deriving a difference value between the values of associated ones of pixels existing on each of rows in the input image signal block, to be encoded, and a difference value between the values of associated ones of pixels existing on each of columns in the input image signal block in a fashion repeated for all rows and columns, respectively;

a primary addition step for summing the difference values derived for each row at the subtraction step and summing the difference values derived for each column at the subtraction step;

a secondary addition step for adding the sum of the summed difference values derived at the primary addition step for a current row to the sum of the summed difference values derived for previous rows, and adding the sum of the summed difference values derived at the primary addition step for a current column to the sum of the summed difference values derived for previous columns; and a control signal outputting step for comparing the row sum outputted at the secondary addition step with the column sum outputted at the secondary addition step, thereby outputting a transform direction control signal to control an orthogonal transform and an inverse orthogonal transform in such a fashion that the orthogonal transform is conducted in a direction associated with a lesser one of the compared sums and then in an inverse direction whereas the inverse orthogonal transform is conducted in the order inverse to that of the orthogonal transform.

33. An image compression-encoding and decoding method for encoding and decoding input image signal blocks, comprising:

a transform direction control signal generating step for generating a transform direction control signal adapted to determine respective direction orders of an orthogonal transform and an inverse orthogonal transform, based on an image signal block, to be encoded, and shape information;

an encoding step for encoding the transform direction control signal generated at the transform direction control signal generating step while orthogonal-transforming the image signal block, to be encoded, based on the transform direction control signal, quantizing the orthogonal-transformed signal, and variable-length-encoding the quantized signal;

a transmitting step for multiplexing the encoded transform direction control signal and the variable-length-encoded signal block, and transmitting the resultant signal;

a signal separating step for receiving the encoded signal transmitted at the transmitting step, and demultiplexing the received signal into the encoded transform direction control signal and the variable-length-encoded image signal block;

decoding the encoded transform direction control signal separated at the signal separating step, variable-length-decoding the variable-length-encoded image signal block, and inverse-quantizing the decoded image signal block;

a signal recovering step for inverse-orthogonal-transforming the inverse-quantized signal block in a state in which the inverse orthogonal transform is determined in direction order, based on the decoded transform direction control signal, and recovering the inverse-orthogonal-transformed signal block into the initially inputted image signal block, based on an image signal block previously recovered;

said transform direction control signal generating step comprising:

an orthogonal-transforming step for orthogonal-transforming the input image signal block, to be encoded, in horizontal and vertical directions, in this order, and then in vertical and horizontal directions, in this order, based on shape information;

a code amount checking step for estimating respective amounts of code generated upon variable-length-encoding two kinds of transform coefficients derived at the orthogonal-transforming step; and comparing the estimated code amounts outputted at the code amount checking step with each other, thereby outputting a transform direction control signal to control an orthogonal transform and a inverse orthogonal transform in such a fashion that the orthogonal transform is conducted in a direction associated with the lesser code amount whereas the inverse orthogonal transform is conducted in a fashion inverse to that of the orthogonal transform.

34. An image compression-encoding and decoding method for encoding and decoding input image signal blocks, comprising:

a transform direction control signal generating step for generating a transform direction control signal adapted to determine respective direction orders of an orthogonal transform and a inverse orthogonal transform, based on an image signal block, to be encoded, and shape information;

an encoding step for encoding the transform direction control signal generated at the transform direction control signal generating step while orthogonal-transforming the image signal block, to be encoded, based on the transform direction control signal, quantizing the orthogonal-transformed signal, and variable-length-encoding the quantized signal;

a transmitting step for multiplexing the encoded transform direction control signal and the variable-length-encoded signal block, and transmitting the resultant signal;

a signal separating step for receiving the encoded signal transmitted at the transmitting step, and demultiplexing the received signal into the encoded transform direction control signal and the variable-length-encoded image signal block;

decoding the encoded transform direction control signal separated at the signal separating step, variable-length-decoding the variable-length-encoded image signal block, and inverse-quantizing the decoded image signal block;

a signal recovering step for inverse-orthogonal-transforming the inverse-quantized signal block in a state in which the inverse orthogonal transform is determined in direction order, based on the decoded transform direction control signal, and recovering the inverse-orthogonal-transformed signal block into the initially inputted image signal block, based on an image signal block previously recovered;

said transform direction control signal generating step comprises:

an orthogonal-transforming step for orthogonal-transforming the input image signal block, to be encoded, in vertical and horizontal directions, in this order, and then in horizontal and vertical directions, in this order, based on shape information;

a quantizing step for receiving two kinds of transform coefficients derived at the orthogonal-transforming step, and quantizing the transform coefficients, respectively;

an inverse-quantizing step for inverse-quantizing the quantized transform coefficient outputted from the quantizing step;

an inverse-orthogonal-transforming step for inverse-orthogonal-transforming the inverse-quantized signal blocks derived at the inverse-quantizing step in a direction inverse to that of the orthogonal transform, based on the shape information;

an error detecting step for deriving respective errors between respective recovered image signal blocks derived at the inverse-orthogonal-transforming step and the image signal block initially inputted; and a transform direction control signal outputting step for comparing the errors derived at the error detecting step, thereby outputting a transform direction control signal to control an orthogonal transform and an inverse orthogonal transform in such a fashion that the orthogonal transform and inverse orthogonal transform associated with the lesser error are conducted.

35. An image compression-encoding apparatus for performing an orthogonal transform for blocks of an input image signal in accordance with an adaptive transform method, thereby compressing the input image signal blocks, comprising:

transform mode control means for selectively receiving transform coefficients, obtained after an orthogonal transform for blocks of an input image signal, and an image signal block to be currently encoded, determining correlations of the input values in horizontal and vertical directions, and generating a transform direction control signal based on the determined correlations, the transform direction control signal being adapted to control an orthogonal transform for the current image signal block in such a fashion that the current image signal block is orthogonal-transformed in a direction involving a higher correlation, and then in a inverse direction;

orthogonal transform means for receiving the transform direction control signal from the transform mode control means, and performing an orthogonal transform based on the received transform direction control signal;

said orthogonal transform means comprises:
- a pre-processor for receiving the transform direction control signal from the transform mode control means, the pre-processor being controlled, based on the transform direction control signal, to be switched between ON and OFF modes in such a fashion that it receives the image signal block, to be encoded, in the ON mode, and rotates the received image signal block in a clockwise direction by 90°;
- an orthogonal transform unit for receiving the 90°-rotated image signal block from the pre-processor while selectively receiving shape information, the orthogonal transform unit performing an orthogonal transform for the received image signal block in vertical and horizontal directions, in this order, and then in horizontal and vertical directions, in this order; and
- a post-processor for receiving the transform direction control signal from the transform mode control means, the pre-processor being controlled, based on the transform direction control signal, to be switched between ON and OFF modes in such a fashion that it receives a two-dimensional transform coefficient block from the orthogonal transform unit in the ON mode, and rotates the received transform coefficient block by 180° with respect to an axis connecting left upper and right lower corners of the transform coefficient block to each other.

36. An image compression-encoding and decoding system using an adaptive transform method comprising:

an encoding unit comprising:
- a subtractor for conducting a subtraction between an input image signal block, to be encoded, and a image signal block, previously recovered, thereby outputting an residual signal block,
- an overhead information encoder for outputting shape information to be used in an encoding procedure, along with a variable-length-encoded shape information signal;
- mode control means for receiving the residual signal block, to be encoded, from the subtractor while receiving the shape information signal from the overhead information encoder, thereby outputting an associated transform direction control signal,
- orthogonal transform means for receiving the residual signal block from the subtractor while selectively receiving the variable-length-encoded shape information from the overhead information encoder, and performing an orthogonal transform for the residual signal block while being controlled in transform direction by the mode control means, thereby outputting a transform coefficient,
- a quantizer for receiving the transform coefficient from the orthogonal transform means, and quantizing the received transform coefficient, thereby outputting a quantized transform coefficient,
- a variable-length encoder for receiving the quantized transform coefficient from the quantizer, and transforming the received transform coefficient into a variable-length-coded signal,
- a control signal encoder for receiving the transform direction control signal from the mode control means, and encoding the received transform direction control signal, and
- a multiplexer for receiving the variable-length-coded signal from the variable-length encoder and the transform direction control signal from the control signal encoder while selectively receiving the shape information from the overhead information encoder, multiplexing the received signals together, and transmitting the resultant signal to a transmission medium; and a decoding unit comprising
- a demultiplexer for demultiplexing the signal received from the encoding unit via the transmission medium, thereby outputting the variable-length-coded shape information, the variable-length-coded quantized transform coefficient block, and the encoded transform direction control signal,
- an overhead information decoder for selectively receiving the encoded shape information from the demultiplexer, and recovering original shape information from the received shape information,
- a decoder for receiving the variable-length-encoded quantized transform coefficient from the decoder, and variable-length-decoding the received transform coefficient, thereby outputting a variable-length-decoded quantized transform coefficient block,
- a first inverse quantizer for receiving the variable-length-decoded quantized transform coefficient block, and inverse-quantizing the received transform coefficient block,
- inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means,
- a first adder for receiving the inverse-orthogonal-transformed signal block from the inverse orthogonal transform means while receiving an image signal block previously recovered, and adding the received signal blocks, thereby outputting a recovered image signal block, and
- a first memory for storing the recovered image signal block outputted from the first adder, and outputting the stored imaged signal block to the adder for an prediction.

37. An image compression-encoding and decoding system using an adaptive transform method comprising:

an encoding unit comprising:
- a subtractor for conducting a subtraction between an input image signal block, to be encoded, and a image signal block, previously recovered, thereby outputting an residual signal block,
- an overhead information encoder for outputting shape information to be used in an encoding procedure, along with a variable-length-encoded shape information signal;

mode control means for receiving the residual signal block, to be encoded, from the subtractor while receiving the shape information signal from the overhead information encoder, thereby outputting an associated transform direction control signal, orthogonal transform means for receiving the residual signal block from the subtractor while selectively receiving the variable-length-encoded shape information from the overhead information encoder, and performing an orthogonal transform for the residual signal block while being controlled in transform direction by the mode control means, thereby outputting a transform coefficient, a quantizer for receiving the transform coefficient from the orthogonal transform means, and quantizing the received transform coefficient, thereby outputting a quantized transform coefficient, a variable-length encoder for receiving the quantized transform coefficient from the quantizer, and transforming the received transform coefficient into a variable-length-coded signal, a control signal encoder for receiving the transform direction control signal from the mode control means, and encoding the received transform direction control signal, and a multiplexer for receiving the variable-length-coded signal from the variable-length encoder and the transform direction control signal from the control signal encoder while selectively receiving the shape information from the overhead information encoder, multiplexing the received signals together, and transmitting the resultant signal to a transmission medium; and a decoding unit comprising:

a demultiplexer for demultiplexing the signal received from the encoding unit via the transmission medium, thereby outputting the variable-length-coded shape information, the variable-length-coded quantized transform coefficient block, and the encoded transform direction control signal, an overhead information decoder for selectively receiving the encoded shape information from the demultiplexer, and recovering original shape information from the received shape information, a decoder for receiving the variable-length-encoded quantized transform coefficient from the decoder, and variable-length-decoding the received transform coefficient, thereby outputting a variable-length-decoded quantized transform coefficient block, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, a first adder for receiving the inverse-orthogonal-transformed signal block from the inverse orthogonal transform means while receiving an image signal block previously recovered, and adding the received signal blocks, thereby outputting a recovered image signal block, and a first memory for storing the recovered image signal block outputted from the first adder, and outputting the stored imaged signal block to the adder for an prediction;

said mode control means comprises:

a first orthogonal transform unit for receiving the residual signal block from the subtractor, and performing an orthogonal transform for the residual signal block in a horizontal direction and then in a vertical direction, thereby outputting an associated transform coefficient;

a first bit stream counter for receiving the transform coefficient from the first orthogonal transform unit, thereby estimating an amount of code to be generated upon variable-length-coding the transform coefficient;

a second orthogonal transform unit for receiving the residual signal block from the subtractor, and performing an orthogonal transform for the residual signal block in a vertical direction and then in a horizontal direction, thereby outputting an associated transform coefficient;

a second bit stream counter for receiving the transform coefficient from the second orthogonal transform unit, thereby estimating an amount of code to be generated upon variable-length-coding the transform coefficient outputted from the second orthogonal transform unit; and a comparator for comparing the estimated code amounts outputted from the first and second bit stream counters with each other, thereby outputting a transform direction control signal to control an orthogonal transform and a inverse orthogonal transform in such a fashion that the orthogonal transform is conducted in one of the orthogonal transform units associated with the bit stream counter generating a lesser amount of code whereas the inverse orthogonal transform is conducted in a fashion inverse to that of the orthogonal transform.

38. An image compression-encoding and decoding system using an adaptive transform method comprising:

an encoding unit comprising:

a subtractor for conducting a subtraction between an input image signal block, to be encoded, and a image signal block, previously recovered, thereby outputting an residual signal block, an overhead information encoder for outputting shape information to be used in an encoding procedure, along with a variable-length-encoded shape information signal;

mode control means for receiving the residual signal block, to be encoded, from the subtractor while receiving the shape information signal from the overhead information encoder, thereby outputting an associated transform direction control signal, orthogonal transform means for receiving the residual signal block from the subtractor while selectively receiving the variable-length-encoded shape information from the overhead information encoder, and performing an orthogonal transform for the residual signal block while being controlled in transform direction by the mode control means, thereby outputting a transform coefficient, a quantizer for receiving the transform coefficient from the orthogonal transform means, and quantizing the received transform coefficient, thereby outputting a quantized transform coefficient, a variable-length encoder for receiving the quantized transform coefficient from the quantizer, and transforming the received transform coefficient into a variable-length-coded signal, a control signal encoder for receiving the transform direction control signal from the mode control means, and encoding the received transform direction control signal, and a multiplexer for receiving the variable-length-coded signal from the variable-length encoder and the transform direction control signal from the control signal encoder while selectively receiving the shape information from the overhead information encoder, multiplexing the received signals together, and transmitting the resultant signal to a transmission medium; and a decoding unit comprising:

a demultiplexer for demultiplexing the signal received from the encoding unit via the transmission medium, thereby outputting the variable-length-coded shape information, the variable-length-coded quantized transform coefficient block, and the encoded transform direction control signal, an overhead information decoder for selectively receiving the encoded shape information from the demultiplexer, and recovering original shape information from the received shape information, a decoder for receiving the variable-length-encoded quantized transform coefficient from the decoder, and variable-length-decoding the received transform coefficient, thereby outputting a variable-length-decoded quantized transform coefficient block, a first inverse quantizer for receiving the variable-length-decoded quantized transform coefficient block, and inverse-quantizing the received transform coefficient block, inverse orthogonal transform means for selectively receiving the inverse-quantized transform coefficient block from the first inverse quantizer while receiving the shape information from the overhead information decoder and the transform direction control signal from the control signal decoder, and inverse-orthogonal-transforming the inverse-quantized transform coefficient block in a direction inverse to that of the orthogonal transform means, a first adder for receiving the inverse-orthogonal-transformed signal block from the inverse orthogonal transform means while receiving an image signal block previously recovered, and adding the received signal blocks, thereby outputting a recovered image signal block, and a first memory for storing the recovered image signal block outputted from the first adder, and outputting the stored imaged signal block to the adder for an prediction;

said mode control means comprises:

a first orthogonal transform unit for receiving the residual signal block from the subtractor, and performing an orthogonal transform for the residual signal block in a vertical direction and then in a horizontal direction, thereby outputting an associated transform coefficient;

a first quantizer for receiving the transform coefficient from the first orthogonal transform unit, and quantizing the received transform coefficient;

a first inverse quantizer for receiving the quantized transform coefficient from the first quantizer, and inverse-quantizing the received transform coefficient;

a first inverse orthogonal transform unit for receiving the inverse-quantized transform coefficient from the first inverse quantizer, performing a inverse orthogonal transform for the received transform coefficient in a horizontal direction and then in a vertical direction, thereby outputting a recovered image signal block;

a first error detector for receiving the recovered image signal block from the first inverse orthogonal transform unit along with the residual signal block applied to the first orthogonal transform unit, and detecting an error between the received blocks;

a second orthogonal transform unit for receiving the residual signal block from the subtractor, and performing an orthogonal transform for the residual signal block in a horizontal direction and then in a vertical direction, thereby outputting an associated transform coefficient;

a second quantizer for receiving the transform coefficient from the second orthogonal transform unit, and quantizing the received transform coefficient;

a second inverse quantizer for receiving the quantized transform coefficient from the second quantizer, and inverse-quantizing the received transform coefficient;

a second inverse orthogonal transform unit for receiving the inverse-quantized transform coefficient from the second inverse quantizer, performing a inverse orthogonal transform for the received transform coefficient in a vertical direction and then in a horizontal direction, thereby outputting a recovered image signal block;

a second error detector for receiving the recovered image signal block from the second inverse orthogonal transform unit along with the residual signal block applied to the second orthogonal transform unit, and detecting an error between the received blocks; and a comparator for comparing the errors outputted from the first and second error detectors with each other, thereby outputting a transform direction control signal to control an orthogonal transform and a inverse orthogonal transform in such a fashion that the orthogonal transform is conducted in one of the orthogonal transform units associated with the error detector generating a lesser error amount whereas the inverse orthogonal transform is conducted in one of the inverse orthogonal transform units associated with the error detector generating a lesser error amount.

39. An image compression-encoding method for performing an orthogonal transform for blocks of an input image signal in accordance with an adaptive transform method, thereby compressing the input image signal blocks, comprising:

a transform direction control signal generating step for generating a transform direction control signal selectively receiving transform coefficients, obtained after an orthogonal transform for blocks of an input image signal, and an image signal block to be currently encoded, determining correlations of the input values in horizontal and vertical directions, and generating, based on the determined correlations, a transform direction control signal adapted to control an orthogonal transform for the current image signal block in such a fashion that the current image signal block is orthogonal-transformed in a direction involving a higher correlation, and then in an inverse direction;

an orthogonal-transforming step for receiving the transform direction control signal, and performing an orthogonal transform, in a sequential fashion, based on the received transform direction control signal;

said orthogonal-transforming step is controlled by the transform direction control signal outputted from the transform direction control signal generating step in such a fashion that:

when the transform direction control signal contains mode information for controlling an orthogonal transform to be conducted in vertical and horizontal directions, in this order, the orthogonal transform is conducted in a vertical direction and then in a horizontal direction; and when the transform direction control signal contains mode information for controlling an orthogonal transform to be conducted in horizontal and vertical directions, in this order, the orthogonal transform is conducted by rotating the input image signal block in a counter-clockwise direction by 90°, orthogonal-transforming the rotated image signal block in a vertical direction and then in a horizontal direction, thereby generating a two-dimensional transform coefficient block, and rotating the two-dimensional transform coefficient block by 180° with respect to an axis connecting the left upper corner and right lower corner of the block to each other.

* * * * *